United States Patent [19]
Iijima et al.

[11] Patent Number: 5,680,474
[45] Date of Patent: Oct. 21, 1997

[54] CORRESPONDING POINT EXTRACTION METHOD FOR A PLURALITY OF IMAGES

[75] Inventors: Katsumi Iijima, Hachioji; Katsuhiko Mori, Kawasaki, both of Japan

[73] Assignee: Canon Kabushiki Kaisha, Tokyo, Japan

[21] Appl. No.: 143,307

[22] Filed: Oct. 26, 1993

[30] Foreign Application Priority Data

Oct. 27, 1992 [JP] Japan .................... 4-288371
Dec. 24, 1992 [JP] Japan .................... 4-343994

[51] Int. Cl.⁶ .............................. G06K 9/00; G06F 15/00
[52] U.S. Cl. .............................. 382/154; 395/119
[58] Field of Search .............................. 382/154; 356/2; 359/462, 466; 395/119, 125; 250/558

[56] References Cited

U.S. PATENT DOCUMENTS

| | | | |
|---|---|---|---|
| 3,783,294 | 1/1974 | Koper | 250/558 |
| 3,901,595 | 8/1975 | Helava et al. | 356/2 |
| 4,825,393 | 4/1989 | Nishiya | 382/154 |
| 4,982,438 | 1/1991 | Vsami et al. | 382/154 |
| 5,317,140 | 5/1994 | Dunthorn | 250/221 |

OTHER PUBLICATIONS

Hartley, R. and Gupta, R., "Computing Matched–epipolar Projections", IEEE, Jun. 15, 1993, pp. 549–555.

*Primary Examiner*—Jose L. Couso
*Assistant Examiner*—Matthew C. Bella
*Attorney, Agent, or Firm*—Morgan & Finnegan LLP

[57] ABSTRACT

In order to assure sufficient precision for both binary image and variable density image, a corresponding point extraction method for a plurality of images includes the steps of taking in two binary images, then extracting an arbitrary set of epipolar lines, inserting a picture element having the picture element value of a virtual picture element between adjacent picture elements on said two epipolar lines as extracted, creating an initial screen having the initial values on a parallax screen, using two epipolar lines into which the picture element having the picture element value of virtual picture element is inserted, performing in parallel local calculation having excitatory combination and inhibitory combination based on actual picutre element and local calculation having excitatory combination and inhibitory combination based on virtual picture element for each black point on the created initial screen to create a new parallax screen.

19 Claims, 54 Drawing Sheets

FIG. 15
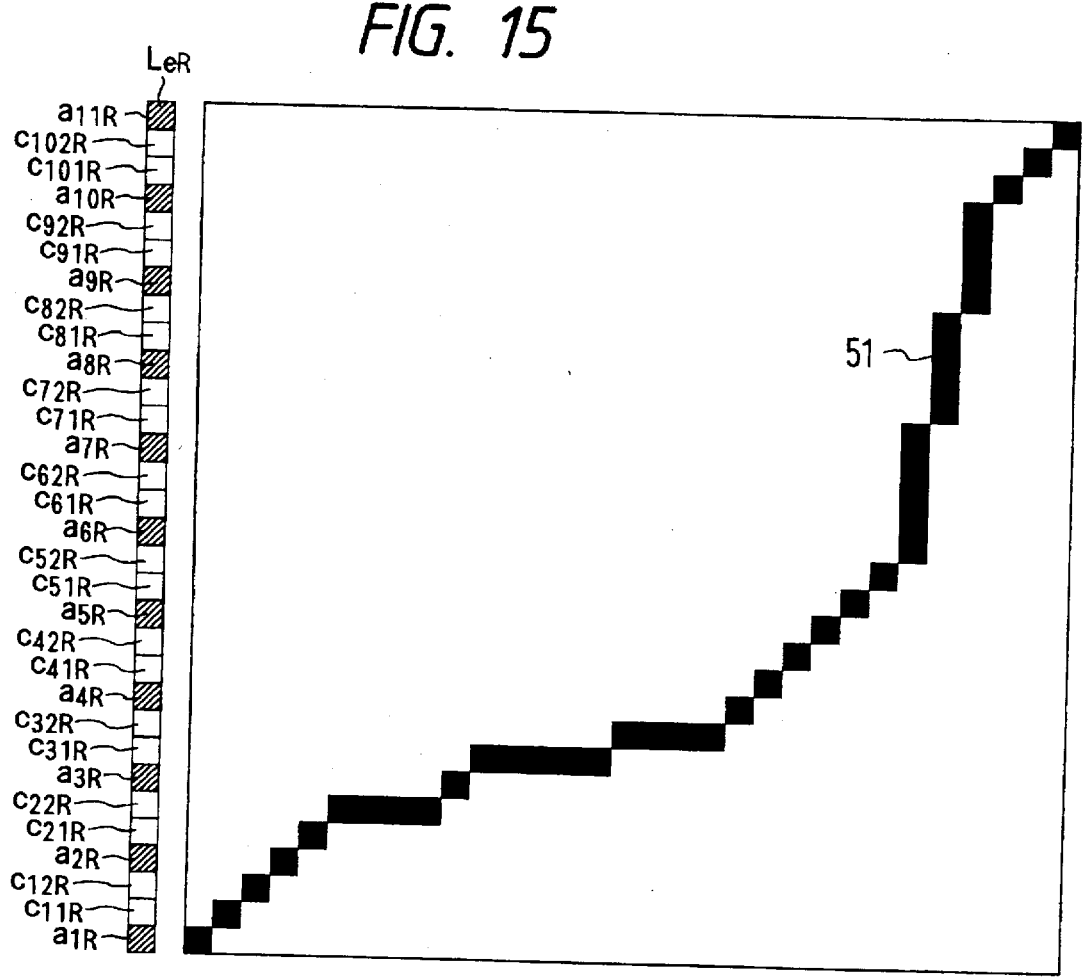
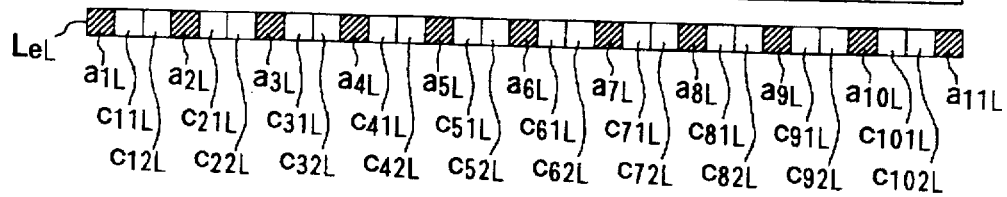
FIG. 16
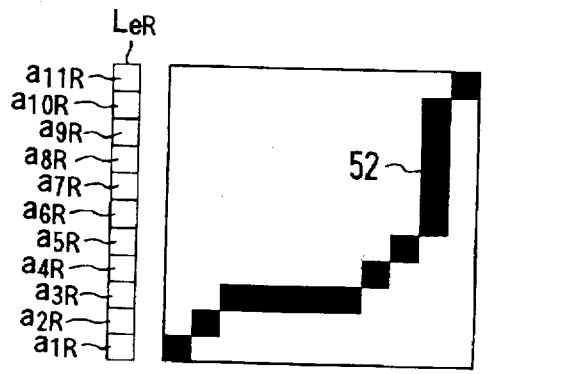
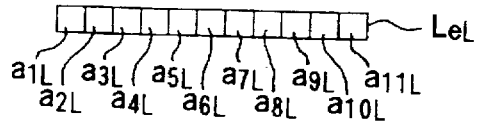

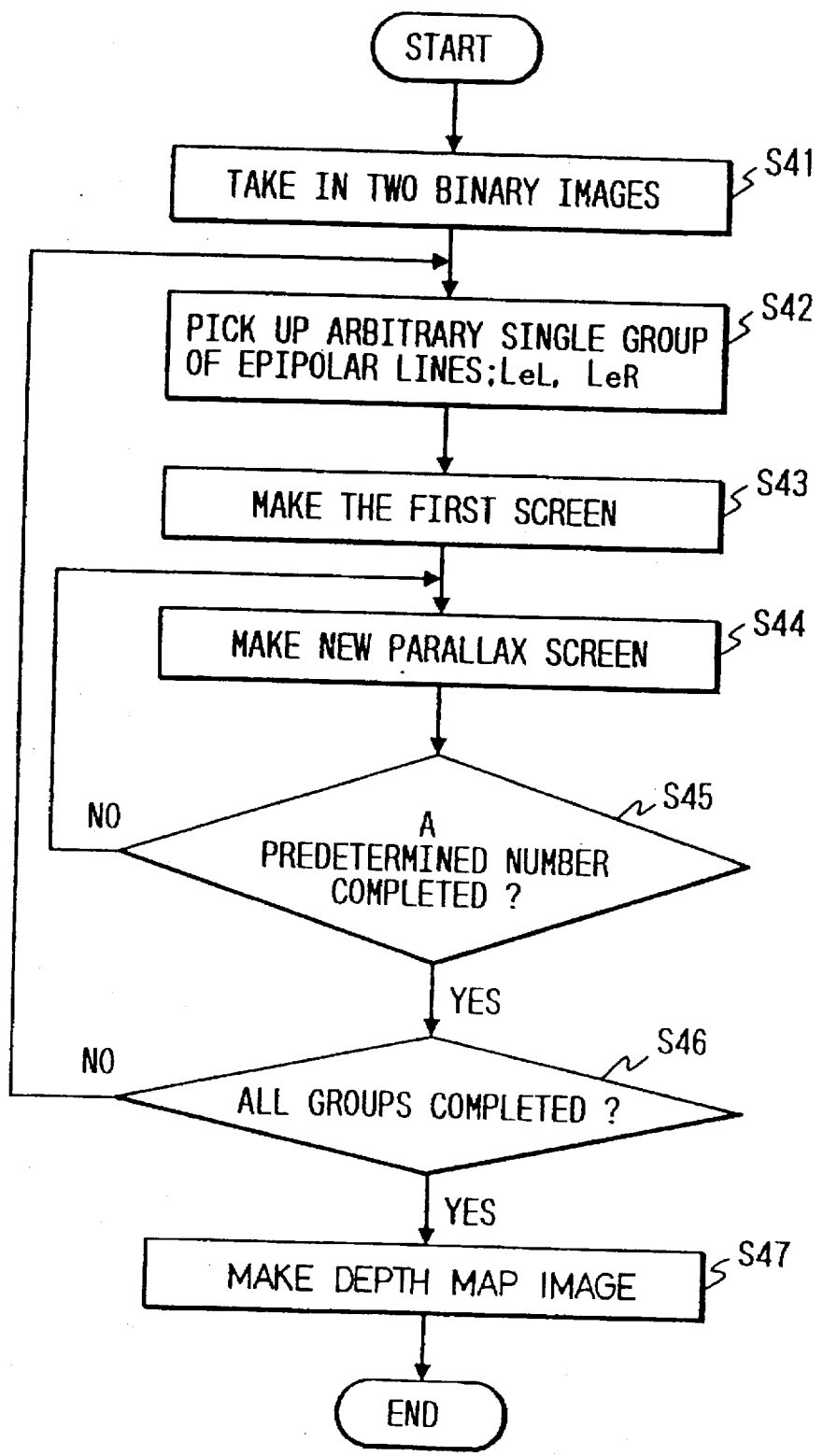

CORRESPONDING POINT EXTRACTION METHOD FOR A PLURALITY OF IMAGES

BACKGROUND OF THE INVENTION

1. Field of the Invention

The present invention relates to a corresponding point extraction method for a plurality of images, particularly for extracting corresponding points of said plurality of images by performing local calculation having excitatory combination and inhibitory combination based on actual picture element of said plurality of images at each point of intersection on a parallax screen formed of a plurality of epipolar lines respectively extracted from said plurality of images to obtain parallax lines.

2. Related Background Art

FIG. 53 is a view for explaining a triangulation for use in obtaining distance image. Note that the following description is given in a state where the sensors for a right camera and a left camera are placed on the respective positive planes, unless otherwise specified.

Triangulation is one method for obtaining three dimensional coordinates of a point P on a substance (object) placed in a three dimensional space when the image of the substance (object) is picked up using two cameras (a right camera and a left camera) in such a manner as to calculate such three dimensional coordinates from a projection point PR on a sensor plane $A_{SR}$ of the right camera and a projection point $P_L$ on a sensor plane $A_{SL}$ of the left camera, where the point P on the substance is projected to a central point $O_R$ of a lens of the right camera and a central point $O_L$ of a lens of the left camera. Herein, "baseline B", "baseline length $L_B$", "epipolar plane (parallax plane) $A_e$" and "epipolar line (parallax image) $L_{eR}$, $L_{eR}$" are defined as follows.

(1) "Baseline B" is defined as a line connecting between the central point $O_R$ of the lens of the right camera and the central point $O_L$ of the lens of the left camera.

(2) "Baseline length $L_B$" is defined as a length of the baseline B.

(3) "Epipolar plane $A_e$" is defined as a plane made by connecting three points of a point P on the substance, a projection point PR and a projecting point $P_L$.

(4) "Epipolar line (parallax image) $L_{eR}$" is defined as a line of intersection between the epipolar plane $A_e$ and the sensor plane $A_{SR}$ of the right camera, and "epipolar line $L_{eL}$" is defined as a line of intersection between the epipolar plane $A_e$ and the sensor plane $A_{SL}$ of the left camera.

As illustrated in FIG. 54, it is assumed that the middle point of the baseline B is an origin O (0, 0, 0), the x axis extends along the baseline B, the y axis (not shown) in a perpendicular direction to the paper face and the z axis in a perpendicular direction to the baseline B; the focal lengths of the lens of the right camera and the lens of the left camera are f, and the coordinates for a point P on the substance, a projection point $P_R$ and a projection point $P_L$ are $(x_p, y_p, z_p)$, $(x_{PR}, y_{PR}, z_{PR})$ and $(x_{PL}, y_{PL}, z_{PL})$, respectively. Then, when the optical axes of the right camera and the left camera are perpendicular to the baseline B (i.e., two optical axes are parallel to each other), as illustrated in FIG. 54, the following expressions hold.

$$(x_{PL}+L_B/2)/f=(x_p+L_B/2)/z_p \qquad (1.1)$$

$$(x_{PR}-L_B/2)/f=(x_p-L_B/2)/z_p \qquad (1.2)$$

$$y_L/f=y_R/f=y/z_p \qquad (1.3)$$

$$(L_B+x_{PL}-x_{PR})/f=L_B/z_P \qquad (1.4)$$

Hence, the coordinates $(x_p, y_p, z_p)$ for the point P on the substance can be obtained by the following expressions, $$x_p=L_B\cdot\{(x_{PL}+x_{PR})/2\}/(L_B+x_{PL}-x_{PR}) \qquad (2.1)$$

$$y_p=L_B\cdot\{(y_{PL}+y_{PR})/2\}/(L_B+x_{PL}-x_{PR}) \qquad (2.2)$$

$$z_p=L_B\cdot f/(L_B+x_{PL}-x_{PR}) \qquad (2.3)$$

Also, when the optical axes of the right camera and the left camera are respectively placed at a predetermined angle (convergence angle) $\theta$ relative to the baseline B, as illustrated in FIG. 55, the following expressions hold.

$$(x_{PL}+L_B/2)/z_{PL}=(x_p+L_B/2)/z_p \qquad (3.1)$$

$$(x_{PR}-L_B/2)/z_{PR}=(x_p-L_B/2)/z_p \qquad (3.2)$$

$$Y_{PL}/z_{PL}=Y_{PR}/z_{PR}=Y_p/z_p \qquad (3.3)$$

$$L_B/z_P=\{(x_{PL}+L_B/2)-(z_{PL}/z_{PR})(x_{PR}-L_B/2)\}/z_{PL} \qquad (3.4)$$

where $|x_{PR}| \geq |x_{PL}|$ $$L_B/z_P=\{-(x_{PR}-L_B/2)+(z_{PR}/z_{PL})(x_{PL}+L_B/2)\}/z_{PR} \qquad (3.5)$$

where $|x_{PR}| < |x_{PL}|$ $$z_{PR}=(x_{PR}-L_B/2)\cdot\tan(\theta)+f\cdot\cos(\theta) \qquad (3.6)$$

$$z_{PL}=-(x_{PL}+L_B/2)\cdot\tan(\theta)+f\cdot\cos(\theta) \qquad (3.7)$$

Accordingly, the coordinates $(x_p, y_p, z_p)$ for the point P on the object can be obtained from the above expressions (3.1) to (3.7).

With the triangulation as described above, the distance to the substance (object) can be obtained by using two images picked up by a compound image pickup system consisting of a right-hand image pickup system and a left-hand image pickup system. However, the triangulation premises that the projection point $P_R$ on the sensor plane $A_{SR}$ of the right camera and the projection point $P_L$ on the sensor plane $A_{SL}$ of the left camera are projected from the same point P for obtaining the distance to the substance. Accordingly, it is necessary to extract the projection point $P_R$ on the sensor plane $A_{SR}$ of the right camera corresponding to the projection point $P_L$ on the sensor plane $A_{SL}$ of the left camera, whereby it is a problem how to extract the corresponding point to obtain distance information using the compound image pickup system. Such typical corresponding point extraction methods include a template matching method which has been already in practice in plants or factories and a coordination algorithm based on the visual processing.

(1) Template Matching Method

Template matching method is that considering a template surrounding an arbitrary point of a left image formed on the sensor plane $A_{SL}$ of the left camera, the similarity of an image within the template versus a right image formed on the sensor plane $A_{SR}$ of the right camera is compared to determine the corresponding point. Note that there are two methods of comparing the similarity as follows.

(a) SSDA (Sequential Similarity Detection Algorithm) Method

SSDA method is that sum E(x, y) is calculated by adding the differences between the picture element value $E_L$ in the image within the template for the left image and the picture element value $E_R$ in the right image to be detected for all the picture elements on the epipolar line $L_{eL}$ of the left image and all the picture elements on the epipolar line $L_{eR}$ of the right image, as given below by expression (4.1), and the corresponding point is determined so that the sum E(x, y)

may be minimum to obtain the coordinates of the corresponding point.

$$E(x, y) = \sum_{i,j} |E_R(x-i, y-j) - E_L(x-i, y-j)| \quad (4.1)$$

In SSDA method, the calculation may be stopped and proceed to the next coordinates if the summation of differences between picture element values during calculation is greater than the minimum value in the other coordinates already calculated, so that the calculation time can be shortened by omitting further calculation.

(b) Correlation Method

Correlation method is that the correlation value ρ(x, y) is obtained by taking a cross-correlation between the picture element value $E_L$ in the image within the template for the left image and the picture element value $E_R$ in the right image to be detected, as given below by expression (4.2), and the corresponding point is determined so that the correlation value ρ(x, y) obtained may be maximum to obtain the coordinates for the corresponding point. Note that the normalized cross-correlation as given in expression (4.2) has a maximum value of "1".

$$\rho(x, y) = \frac{\Sigma(E_R(x-i, y-j) \cdot E_L(x-i, y-j))}{\sqrt{\Sigma E_R^2(x-i, y-j)} \cdot \sqrt{\Sigma E_L^2(x-i, y-j)}} \quad (4.2)$$

(2) Cooperative algorithm

"Cooperative algorithm" proposed by David Marr et al. is an algorithm for obtaining parallax line using the following three rules (D. Marr. Vision: A Computational Investigation into the Human Representation and Processing of Visual Information, W. H. Freeman & Co., San Francisco Calif., 1982).

Rule 1 (compatibility) ... Only black point for black point can be coordinated.

Rule 2 (uniqueness) ... Almost always, one black point in one image can be coordinated with a unique black point in the other image.

Rule 3 (continuity) ... Parallax of point to be coordinated will smoothly change over substantially the entire area.

A corresponding point extractor for implementing the cooperative algorithm consists of a network formed of various processors interconnected in parallel and to one another, wherein a small processor is disposed at each point of intersection or each nodal point as illustrated in FIG. 56A.

If one nodal point represents a correct pair of black points, the processor disposed at the nodal point finally has a value of "1", while if the nodal point represents an incorrect pair (false target), the processor has a value of "0".

According to rule 2, only one correspondence will be permitted along a horizontal or vertical line. Thus, all the processors disposed at nodal points along the horizontal or vertical line are caused to be inhibitory from one another. This is due to the concept that as a result of competition along each line, only one processor will survive as having a value of "1", and the other processors are all given a value of "0", so that the rule 2 is satisfied.

Since according to rule 3 the correct pair is likely to exist along the broken line, an excitatory combination is inserted between the processors arranged in this direction. This provides each local processor with a structure as shown in FIG. 56B. The processors along a horizontal line 101 and a vertical line 102 as illustrated in the figure corresponding to the line of sight from both lenses are subjected to inhibitory combination, while processors along a diagonal line 103 corresponding to the line of constant parallax are subjected to excitatory combination. The algorithm can be extended for two-dimensional image. In this case, the inhibitory combination remains unchanged, and the excitatory combination is made to cover a two-dimensional minute neighborhood 104 having constant parallax. This is illustrated in FIG. 56C.

In such a corresponding point extractor, a left image and a right image are picked up respectively, and a network of processors is loaded by giving "1" to the points where two black points are coordinated (including false targets) and "0" to the other points, and then is made to run. Each processor takes the sum of "1"s in the excitatory neighborhood and the sum of "1"s in the inhibitory neighborhood. And after appropriately weighting one of the summations, a resultant numerical value is subtracted therefrom. If the result exceeds a certain threshold value, the processor is set to a value of "1", or otherwise to a value of "0". Formally, this algorithm can be represented by the following repetitive relation of expression (5).

$$C_{x,y,d}^{t+1} = \sigma \left\{ \sum_{x'y'd' \in S(x,y,d)} C_{x'y'd'}^t - \epsilon \sum_{x'y'd' \in O(x,y,d)} C_{x'y'd'}^t + C_{x,y,d}^0 \right\} \quad (5)$$

Where $C_{x,y,d}^t$ indicates the state of a cell corresponding to position (x, y), parallax d and time t in the network as illustrated in FIG. 56A. S(x,y,d) is a local excitatory neighborhood and O(x,y,d) is an inhibitory neighborhood. ε is an inhibitory constant, and σ is a threshold function. The initial state $C^0$ contains all the possible pairs including false targets within a defined parallax range. Herein, note that it is added at each repetition (which is not necessarily required, but allows the algorithm to be converged more rapidly).

A corresponding point extraction method for a plurality of images will be hereinafter described in detail wherein local calculation having excitatory combination and inhibitory combination based on actual picture element of two binary images is repetitively performed on a parallax screen formed of two epipolar lines respectively extracted from the two binary images to thereby obtain parallax lines to extract the corresponding points from these two binary images.

First, the parallax line will be described below with reference to FIGS. 57 and 58. When the optical axes of the left camera and the right camera are respectively perpendicular to the baseline, a set of epipolar lines $L_{eL}$, $L_{eR}$ to which an object is projected are obtained as shown in FIG. 57. Thus, as shown in FIG. 58, a left epipolar line $L_{eL}$ obtained is arranged in a transverse direction as shown with a picture element $a_{1L}$ placed on the leftmost side and a picture element $a_{5L}$ on the rightmost side, as shown in the figure, and a right epipolar line $L_{eR}$ obtained is arranged in a longitudinal direction of the figure as shown with a picture element $a_{1R}$ placed on the bottom side and a picture element $a_{5R}$ on the top side, whereafter the points of intersection $b_1$ to $b_5$ of corresponding picture elements (e.g., picture element $a_{1L}$ and picture element $a_{1R}$) on the epipolar lines $L_{eL}$, $L_{eR}$ are respectively obtained. Herein, the line connecting the points of intersection $b_1$ to $b_5$ is referred to as a "parallax line 114", wherein if the parallax is constant, the parallax line 114 is a right-up line having an inclination of 45° as shown, whereby variations in parallax between left image and right image can be found by obtaining the parallax line 114. Note that the plane obtained by two epipolar lines $L_{eL}$, $L_{eR}$ is referred to as a "parallax screen 113".

The relation between parallax line and distance will be now described with reference to FIGS. 59A to 63B.

If parallax screen and parallax line are similarly obtained for points $a_{21}$ to $a_{25}$ of constant parallax located far away from the right and left cameras, as illustrated in FIG. 59A, a parallax screen 121 and a parallax line 131 are obtained as illustrated in FIG. 59B. If parallax screen and parallax line are similarly obtained for points $a_{31}$ to $a_{34}$ of constant parallax located closer to the right and left cameras than the points $a_{21}$ to $a_{25}$, as illustrated in FIG. 60A, a parallax screen 122 and a parallax line 132 are obtained as illustrated in FIG. 60B. If parallax screen and parallax line are similarly obtained for points $a_{41}$ to $a_{43}$ of constant parallax located further closer to the right and left cameras than the points $a_{31}$ to $a_{34}$ as illustrated in FIG. 61A, a parallax screen 123 and a parallax line 133 are obtained as illustrated in FIG. 61B. If parallax screen and parallax line are similarly obtained for points $a_{51}$ and $a_{52}$ of constant parallax located further closer to the right and left cameras than the points $a_{41}$ to $a_{43}$, as illustrated in FIG. 62A, a parallax screen 124 and a parallax line 134 are obtained as illustrated in FIG. 62B.

From the above explanation, when the optical axes of the left camera and the right camera are respectively perpendicular to the baseline, it will be understood that:

(1) When each point of constant parallax is located at infinite distance away from the right camera and the left camera, the parallax line obtained is a line having a slope of 45° and bisecting the parallax screen.

(2) While each point of constant parallax comes closer to the right camera and the left camera, the parallax line obtained is a line having a slope of 45° and closer to the right bottom corner on the parallax screen.

Also, if parallax screen and parallax line for the points $a_{61}$ to $a_{66}$ are similarly obtained as illustrated in FIG. 63A, a parallax screen 125 and a parallax line 135 can be obtained as illustrated in FIG. 63B. Herein, the parallax line 135 obtained starts from a left lower corner of the parallax screen 125 to proceed along the parallax line 131 as illustrated in FIG. 59B toward a right upper corner thereof, to transfer halfway to the parallax line 132 as illustrated in FIG. 60B, and to proceed again along the parallax line 131 as illustrated in FIG. 59B toward the right upper corner. Accordingly, it can be found that for an irregular substance (object), a parallax line according to the irregularity of the substance can be obtained.

Consequently, if the parallax screen has the coordinates holding distance data obtained by triangulation, the distance to the object can be obtained from the coordinates of the parallax line obtained.

Next, an example of extracting corresponding points in accordance with the cooperative algorithm for two binary images transformed to extremely similar images as represented by Julesz's random dot stereogram (see David Marr, "Vision: computational theory of vision and intracerebral representation", translated by Kan et al., Sangyo Tosho) will be described below with reference to a flowchart of FIG. 64.

Two binary images having a parallax such as a random dot stereogram are picked up using a composite image pickup system (step S1), and an arbitrary set of epipolar lines $L_{eL}$, $L_{eR}$ are extracted from two binary images picked up (step S2). A set of epipolar lines $L_{eL}$, $L_{eR}$ extracted are arranged as shown in FIG. 65 (step S3). That is, a left epipolar line $L_{eL}$ is arranged in a transverse direction as shown with its left end $141_L$ on the leftmost side and its right end $141_R$ on the rightmost side. Also, a right epipolar line $L_{eR}$ is arranged in a longitudinal direction as shown with its left end $142_L$ on the bottom side and its right end $14_{2R}$ on the top side. Subsequently, by making black all the points of intersection on the parallax screen 143 at which points picture elements indicating the picture element value "black" on the left epipolar line $L_{eL}$ and picture elements indicating the picture element value "black" on the right epipolar line $L_{eR}$ are intersected on the parallax screen 143, an initial screen 144 which has initial values of the parallax screen 143 is created (step S4) as illustrated in FIG. 66.

Thereafter, a local process having excitatory combination and inhibitory combination based on the actual picture element is performed for each black point in the initial screen 144 created (step S5). Herein, the excitatory combination based on the actual picture element is performed for each point of intersection residing within an ellipse 150 having a long axis 151 extending in a direction right upward with an inclination of 45° and a short axis 152 extending in a direction right downward with an inclination of –45° around an arbitrary black point Q in the initial screen 144, as illustrated in FIG. 67. Also, the inhibitory combination based on the actual picture element is performed for each point of intersection residing on an axis extending in a horizontal direction and an axis extending in a vertical direction for the black point Q, as illustrated. Subsequently, a new parallax screen is created by performing a predetermined processing using, for example, a threshold function 171 of binary output as shown in FIG. 68 (corresponding to a threshold function σ of the above expression (5)) for each point of intersection on the initial screen 144 to which the local process having the excitatory combination and the inhibitory combination based on the actual picture element is subjected (step S6). Then, a check is performed to determine whether or not the process of step S5 and step S6 is repeated by a predetermined number of times (step S7). If it is not performed by the predetermined number of times, the process of step S5 and step S6 is repeated with the new parallax screen created in the process of step S6 being the initial screen. As a result, finally, a parallax line is obtained on the new parallax screen created in the process of step S6, whereby the extraction of corresponding point is enabled based on this parallax line.

It should be noted that instead of making a check at step S7, the process of step S5 and step S6 may be repeated and thereafter ended, as the new parallax screen created in the process of step S6 as the initial screen, until the value of each point of intersection on the parallax screen is converged. Also, when the parallax line is obtained for the other set of epipolar lines $L_{eL}$, $L_{eR}$ in two binary images picked up at step S1, the parallax line can be similarly obtained by again repeating the process from step S2 to step S7.

Next, a method for extracting a set of epipolar lines at step S2 in FIG. 64 will be described with reference to FIG. 69.

The central points of the lenses of two cameras (left camera and right camera) are defined as $O_L$ and $O_R$, respectively, as illustrated in FIG. 69. Also, the coordinates on the sensor plane $A_{SL}$ of the left camera are defined as ($x_L$, $y_L$, $z_L$), and the coordinates on the sensor plane $A_{SR}$ of the right camera are defined as ($x_R$, $y_R$, $z_R$). Herein, the $z_L$ axis and the $z_R$ axis are made coincident with respective optical axes.

Provided that the unit vectors of $x_L$ axis, $y_L$ axis, $z_L$ axis, $x_R$ axis, $y_R$ axis and $z_R$ axis are defined as $i_L$, $j_L$, $k_L$, $i_R$, $j_R$ and $k_R$, the distance from the sensor plane $A_{SL}$ of the left camera to the central point $O_L$ of the lens of the left camera is $f_L$, and the distance from the sensor plane $A_{SR}$ of the right camera to the central point $O_R$ of the lens of the right camera is $f_R$, a vector $P_L$ of projection point $P_L$ on the sensor plane $A_{SL}$ of the left camera and a vector $P_R$ of projection point $P_R$ on the sensor plane $A_{SR}$ of the right camera as projected from a point p on the substance can be respectively represented as $$P_L = O_L + X_L i_L + Y_L j_L + f_L k_L \quad (6.1)$$

$$P_R = O_R + X_R i_R + Y_R j_R + f_R k_R \quad (6.2)$$

Relative positional vector $V_L$ between the projection point $P_L$ on the sensor plane $A_{SL}$ of the left camera and the central point $O_L$ of the lens of the left camera and relative positional vector $V_R$ between the projection point $P_R$ on the sensor plane $A_{SR}$ of the right camera and the central point $O_R$ of the lens of the right camera are respectively represented as $$V_L = P_L - O_L \tag{6.3}$$

$$V_R = P_R - O_R \tag{6.4}$$

Also, relative positional vector d (corresponding to the length of baseline) between the central point $O_L$ of the lens of the left camera and the central point $O_R$ of the lens of the right camera is represented as $$d = O_L - O_R \tag{6.5}$$

The unit normal vector $n_{Le}$ on the epipolar plane $A_e$ is represented as $$n_{Le} = -\frac{V_L \times d}{|V_L \times d|} \tag{6.6}$$

Assuming the unit normal vector on the sensor plane $A_{SR}$ of the right camera to be $k_R$, the unit vector ere in this direction is represented as, $$e_{Re} = n_{Le} k_R \tag{6.7}$$

since the right epipolar line $L_{eR}$ is orthogonal to $n_{Le}$ and $k_R$. Hence, because of $$X_{Re} = O_R + \frac{f_R}{d \cdot k_R} d \tag{6.8}$$

the right epipolar line $L_{eR}$ is represented as $$X_{Re} + \beta e_{Re} \tag{6.9}$$

Also, the left epipolar line $L_{eL}$ is similarly represented.

Since usually, left and right epipolar lines $L_{eL}$, $L_{eR}$ are not parallel to the scanning line of each sensor, the searching direction in performing a process such as a search for corresponding point is different from one image to the other, resulting in a complex process. However, both left and right epipolar lines $L_{eL}$, $L_{eR}$ can be made parallel by effecting the rearrangement along each of the epipolar lines $L_{eL}$, $L_{eR}$ as proposed independently, and therefore are supposed to be parallel in the description as hereinafter given.

SUMMARY OF THE INVENTION

The above-described conventional corresponding point extraction method for a plurality of images had the following problems.

(1) Template matching method has disadvantage to bring about a false correspondence for binary image having a periodic structure.

(2) Cooperative algorithm may be insufficient in precision for binary image or if directly applied to density image (including color image) because no local process incorporates any influence due to difference of density values between actual picture elements although local process may be performed.

(3) In cooperative algorithm, there is a disadvantage to have the precision of parallax extracted from the parallax line equivalent to or, no greater than, a precision of picture element pitch of the sensor in the image pickup system.

(4) In cooperative algorithm, there is a disadvantage to take a longer processing time to extract the parallax line because all the points of intersection on the parallax screen are dealt with to be symmetrical.

An object of the present invention is to provide a corresponding point extraction method for a plurality of images which is capable of providing a sufficient precision for binary image or density image.

It is the other object of the present invention to provide a corresponding point extraction method for a plurality of images which allows for the shorter processing time.

It is further the other object of the present invention to provide a corresponding point extraction method for a plurality of images which can provide edge information about the upper and lower edges of an object at good precision.

A first corresponding point extraction method for a plurality of images according to the present invention is to extract corresponding points for a plurality of binary images by performing local calculation having excitatory combination and inhibitory combination based on the actual picture element for said plurality of binary images at each point of intersection on a parallax screen formed of a plurality of epipolar lines extracted respectively from said plurality of binary images to obtain parallax lines, characterized by respectively providing a virtual picture element indicating the continuity of said actual picture elements at a portion between adjacent actual picture elements of said each binary image, and performing local calculation having excitatory combination and inhibitory combination based on said virtual picture element in parallel with the local calculation having excitatory combination and inhibitory combination based on said actual picture element.

Herein, excitatory combination based on said virtual picture element may be competitive with excitatory combination based on said actual picture element, and inhibitory combination based on said virtual picture element may be competitive with inhibitory combination based on said actual picture element.

A second corresponding point extraction method for a plurality of images according to the present invention is to extract corresponding points for a plurality of binary images by performing local calculation having excitatory combination and inhibitory combination based on the actual picture element for said plurality of binary images at each point of intersection on a parallax screen formed of a plurality of epipolar lines extracted respectively from said plurality of binary images to obtain parallax lines, characterized by providing a virtual picture element indicating the continuity of said actual picture elements at a portion between adjacent actual picture elements of said each binary image, and limiting the ranges of excitatory combination and inhibitory combination based on said actual picture element, when the picture element value of virtual picture element indicates that said adjacent actual picture elements are discontinuous.

A third corresponding point extraction method for a plurality of images according to the present invention is to extract corresponding points for a plurality of binary images by performing local calculation having excitatory combination and inhibitory combination based on the actual picture element for said plurality of binary images at each point of intersection on a parallax screen formed of a plurality of epipolar lines from said plurality of binary images to obtain parallax lines, characterized by changing the strengths of excitatory combination and inhibitory combination respectively within the ranges of excitatory combination and inhibitory combination.

Herein, the profile for changing the strength of excitatory combination within the range of excitatory combination may be Gaussian line shape.

A fourth corresponding point extraction method for a plurality of images according to the present invention is to extract corresponding points for a plurality of binary images by performing local calculation having excitatory combination and inhibitory combination based on the actual picture element for said plurality of binary images at each point of intersection on a parallel screen formed of a plurality of epipolar lines extracted respectively from said plurality of binary images to obtain parallax lines, characterized by performing local calculation having excitatory combination and inhibitory combination based on said actual picture element by virtually increasing the number of points of intersection on said parallax screen.

Herein, local calculation having excitatory combination and inhibitory combination based on said actual picture element may be performed any number of times by virtually increasing the number of points of intersection on said parallax screen.

Also, after local calculation having excitatory combination and inhibitory combination based on said actual picture element is performed a predetermined number of times at each point of intersection on said parallax screen, local calculation having excitatory combination and inhibitory combination based on said actual picture element may be performed a predetermined number of times by virtually increasing the number of points of intersection on said parallax screen.

A fifth corresponding point extraction method for a plurality of images according to the present invention is to extract corresponding points for a plurality of binary images by performing local calculation having excitatory combination and inhibitory combination based on the actual picture element for said plurality of binary images at each point of intersection on a parallax screen formed of a plurality of epipolar lines extracted respectively from said plurality of binary images to obtain parallax lines, characterized by defining the value of each point of intersection on said parallax screen as an intermediate value.

A sixth corresponding point extraction method for a plurality of images according to the present invention is to extract corresponding points for a plurality of binary images by performing local calculation having excitatory combination and inhibitory combination based on the actual picture element for said plurality of binary images at each point of intersection on a parallax screen formed of a plurality of epipolar lines extracted respectively from said plurality of binary images to obtain parallax lines, characterized by limiting the range of parallax screen for performing local calculation having excitatory combination and inhibitory combination based on said actual picture element.

Herein, local calculation having excitatory combination and inhibitory combination based on said actual picture element may be performed any number of times by limiting the range of said parallax screen.

Also, after local calculation having excitatory combination and inhibitory combination based on said actual picture element is performed over the entire range of said parallax screen, local calculation having excitatory combination and inhibitory combination based on said actual picture element may be performed a predetermined number of times by limiting the range of said parallax screen.

A seventh corresponding point extraction method for a plurality of images according to the present invention is to extract corresponding points for a plurality of binary images by performing local calculation having excitatory combination and inhibitory combination based on the actual picture element for said plurality of binary images at each point of intersection on a parallax screen formed of a plurality of epipolar lines extracted respectively from said plurality of binary images to obtain parallax lines, characterized by changing the range of excitatory combination.

Herein, the range of excitatory combination may be changed in accordance with the number of picture elements of black on each epipolar line succeeding in one direction.

An eighth corresponding point extraction method for a plurality of images according to the present invention is to extract corresponding points for a plurality of images by performing local calculation having excitatory combination and inhibitory combination based on the actual picture element for said plurality of images at each point of intersection on a parallax screen formed of a plurality of epipolar lines extracted respectively from said plurality of images to obtain parallax lines, characterized by defining the value of picture element on said epipolar line as an intermediate value, and defining the value of each point of intersection on said parallax screen as an intermediate value.

Herein, the picture element value of a picture element on said epipolar line may be a picture element value of an actual picture element for said image corresponding to said picture element of said epipolar line.

Also, the picture element value of picture element on said epipolar line may be regarded as a gradient value determined by the picture element value of actual picture element of said image corresponding to said picture element on said epipolar line and the picture element value of another actual picture element in proximity to said actual picture element.

A ninth corresponding point extraction method for a plurality of images according to the present invention is to extract corresponding points for a plurality of images by performing local calculation having excitatory combination and inhibitory combination based on the actual picture element for said plurality of images at each point of intersection on a parallax screen formed of a plurality of epipolar lines extracted respectively from said plurality of images to obtain parallax lines, characterized by providing a virtual picture element indicating the continuity of said actual picture elements at a portion between adjacent actual picture elements of said each image, defining the picture element value of picture element on said epipolar line as an intermediate value, defining the value of each point of intersection on said parallax screen as an intermediate value, and performing local calculation having excitatory combination and inhibitory combination based on said virtual picture element in parallel with local calculation having excitatory combination and inhibitory combination based on said actual picture element.

Herein, excitatory combination based on said virtual picture element may be competitive with excitatory combination based on said actual picture element, and inhibitory combination based on said virtual picture element may be competitive with inhibitory combination based on said actual picture element.

A tenth corresponding point extraction method for a plurality of images according to the present invention is to extract corresponding points for a plurality of images by performing local calculation having excitatory combination and inhibitory combination based on the actual picture element for said plurality of images at each point of intersection on a parallax screen formed of a plurality of epipolar lines extracted respectively from said plurality of images to obtain parallax lines, characterized by providing a virtual picture element indicating the continuity of said actual picture elements at a portion between adjacent actual picture elements of said each image, defining the picture element value of picture element on said epipolar line as an intermediate value, defining the value of each point of intersection on said parallax screen as an intermediate value, and limiting the ranges of excitatory combination and inhibitory combination based on said actual picture element, respectively, when the picture element value of said virtual picture element indicates that said adjacent actual picture elements are discontinuous.

An eleventh corresponding point extraction method for a plurality of images according to the present invention is to extract corresponding points for a plurality of images by performing local calculation having excitatory combination and inhibitory combination based on the actual picture element for said plurality of images at each point of intersection on a parallax screen formed of a plurality of epipolar lines extracted respectively from said plurality of images to obtain parallax lines, characterized by defining the picture element value of picture element on said epipolar line as an intermediate value, defining the value of each point of intersection on said parallax screen as an intermediate value, and changing the strengths of said excitatory combination and said inhibitory combination respectively within the ranges of said excitatory combination and said inhibitory combination.

Herein, the profile for changing the strength of excitatory combination within the range of excitatory combination may be Gaussian line shape.

A twelfth corresponding point extraction method for a plurality of images according to the present invention is to extract corresponding points for a plurality of images by performing local calculation having excitatory combination and inhibitory combination based on the actual picture element for said plurality of images at each point of intersection on a parallax screen formed of a plurality of epipolar lines extracted respectively from said plurality of images to obtain parallax lines, characterized by defining the picture element value of picture element on said epipolar line as an intermediate value, defining the value of each point of intersection on said parallax screen as an intermediate value, and performing local calculation having excitatory combination and inhibitory combination based on said actual picture element by virtually increasing the number of points of intersection on said parallax screen.

Herein, local calculation having excitatory combination and inhibitory combination based on said actual picture element is performed any number of times by virtually increasing the number of points of intersection on said parallax screen.

Also, after local calculation having excitatory combination and inhibitory combination based on said actual picture element is performed a predetermined number of times at each point of intersection on said parallax screen, local calculation having excitatory combination and inhibitory combination based on said actual picture element may be performed a predetermined number of times by virtually increasing the number of points of intersection on said parallax screen.

A thirteenth corresponding point extraction method for a plurality of images according to the present invention is to extract corresponding points for a plurality of images by performing local calculation having excitatory combination and inhibitory combination based on the actual picture element for said plurality of images at each point of intersection on a parallax screen formed of a plurality of epipolar lines extracted respectively from said plurality of images to obtain parallax lines, characterized by defining the picture element value of picture element on said epipolar line as an intermediate value, defining the value of each point of intersection on said parallax screen as an intermediate value, and limiting the range of said parallax screen for performing local calculation having excitatory combination and inhibitory combination based on said actual picture element.

Herein, local calculation having excitatory combination and inhibitory combination based on said actual picture element is performed any number of times by limiting the range of said parallax screen.

Also, after local calculation having excitatory combination and inhibitory combination based on said actual picture element is performed over the entire range of said parallax screen, local calculation having excitatory combination and inhibitory combination based on said actual picture element may be performed by limiting the range of said parallax screen.

A fourteenth corresponding point extraction method for a plurality of images according to the present invention is to extract corresponding points for a plurality of images by performing local calculation having excitatory combination and inhibitory combination based on the actual picture element for said plurality of images at each point of intersection on a parallax screen formed of a plurality of epipolar lines extracted respectively from said plurality of images to obtain parallax lines, characterized by defining the picture element value of picture element on said epipolar line as an intermediate value, defining the value of each point of intersection on said parallax screen as an intermediate value, and changing the range of said excitatory combination.

Herein, the range of said excitatory combination may be changed in accordance with the initial value on said parallax screen and the picture element value of said each epipolar line.

A fifteenth corresponding point extraction method for a plurality of images according to the present invention is to extract corresponding points for a plurality of images by performing local calculation having excitatory combination and inhibitory combination based on the actual picture element for said plurality of images at each point of intersection on a parallax screen formed of a plurality of epipolar lines extracted respectively from said plurality of images to obtain parallax lines, characterized by performing local calculation also having excitatory combination and inhibitory combination based on the actual picture element over a plurality of parallax screens.

Herein, local calculation having excitatory combination and inhibitory combination based on the actual picture element over said plurality of parallax screens may have smaller ranges of excitatory combination and inhibitory combination on a parallax screen farther away from a central parallax screen.

A sixteenth corresponding point extraction method for a plurality of images according to the present invention is to extract corresponding points for a plurality of images by performing local calculation having excitatory combination and inhibitory combination based on the actual picture element for said plurality of images at each point of intersection on a parallax screen formed of a plurality of epipolar lines extracted respectively from said plurality of images to obtain parallax lines, characterized by providing a virtual picture element indicating the continuity of actual picture elements at a portion between said actual picture elements adjacent in a vertical direction of said each image, inserting each virtual parallax screen formed of said virtual picture elements between said each parallax screen, and performing local calculation having excitatory combination and inhibitory combination based on the virtual picture element over a plurality of virtual parallax screens in parallel with local calculation having excitatory combination and inhibitory combination based on the actual picture element over a plurality of parallax screens.

Herein, excitatory combination based on said virtual picture element over said plurality of virtual parallax screens may be competitive with excitatory combination based on said actual picture element over said plurality of parallax screens, and inhibitory combination based on said virtual picture element over said plurality of virtual parallax screens may be competitive with inhibitory combination based on said actual picture element over said plurality of parallax screens.

The first corresponding point extraction method for a plurality of images according to the present invention allows the vertical line segment and the horizontal line segment of parallax line, which may be unlikely output in performing only local calculation having excitatory combination and inhibitory combination based on actual picture element, to be represented more vividly by performing local calculation having excitatory combination and inhibitory combination based on virtual picture element in such a manner as to provide a virtual picture element indicating the continuity of actual picture elements at a portion between adjacent actual picture elements of each binary image, and to perform local calculation having excitatory combination and inhibitory combination based on virtual picture element in parallel with local calculation having excitatory combination and inhibitory combination based on actual picture element.

The second corresponding point extraction method for a plurality of images according to the present invention allows for the reduction of errors in the local calculation having excitatory combination and inhibitory combination based on actual picture element, which may be caused by discontinuous actual picture elements of each binary image as picked up in such a manner as to provide a virtual picture element indicating the continuity of actual picture elements at a portion between adjacent actual picture elements of each binary image, and to limit the ranges of excitatory combination and inhibitory combination based on actual picture element when said adjacent actual picture elements indicate the discontinuity.

The third corresponding point extraction method for a plurality of images according to the present invention allows for the smoother rate of change in differences between neighboring parallaxes and the stronger inhibitory combination with higher probability of occurrence of false correspondence by changing the strengths of excitatory combination and inhibitory combination within the ranges of excitatory combination and inhibitory combination, respectively.

The fourth corresponding point extraction method for a plurality of images according to the present invention allows the ranges of excitatory combination and inhibitory combination to be configured in units of a sub-picture element pitch finer than a unit of picture element for each epipolar line in such a manner as to perform local calculation having excitatory combination and inhibitory combination based on actual picture element by increasing virtually the number of points of intersection on the parallax screen.

The fifth corresponding point extraction method for a plurality of images according to the present invention allows the local process having excitatory combination and inhibitory combination based on actual picture element to be performed at higher precision than the conventional example wherein each point of intersection on parallax screen has only binary value, in such a manner as to define the value of each point of intersection on a parallax screen as an intermediate value.

The sixth corresponding point extraction method for a plurality of images according to the present invention allows the number of local processes having excitatory combination and inhibitory combination to be greatly reduced by limiting the range of parallax screen for effecting the local calculation having excitatory combination and inhibitory combination based on actual picture element.

The seventh corresponding point extraction method for a plurality of images according to the present invention is effective not only to the smoothness of parallax line for an object placed at fixed distance but also to an object placed at gradually varying distance by changing the range of excitatory combination.

The eighth corresponding point extraction method for a plurality of images according to the present invention allows the cooperative algorithm to be applied to variable density image by defining the picture element value of picture element on the epipolar line as an intermediate value, and the value of each point of intersection on parallax screen an intermediate value.

The ninth corresponding point extraction method for a plurality of images according to the present invention allows the vertical line segment and the horizontal line segment of parallax line for the variable density image, which may be unlikely output in performing only local calculation having excitatory combination and inhibitory combination based on actual picture element, to be represented more vividly by performing local calculation having excitatory combination and inhibitory combination based on virtual picture element in such a manner as to provide a virtual picture element indicating the continuity of actual picture elements between adjacent actual picture elements of each image, to define the picture element value of picture element on the epipolar line as an intermediate value, and the value of each point of intersection on parallax screen an intermediate value, and to perform local calculation having excitatory combination and inhibitory combination based on the virtual picture element in parallel with local calculation having excitatory combination and inhibitory combination based on the actual picture element.

The tenth corresponding point extraction method for a plurality of images according to the present invention allows for the reduction of errors in the local calculation having excitatory combination and inhibitory combination based on actual picture element, which may be caused by discontinuous actual picture elements of each variable density image picked up such a manner as to provide a virtual picture element indicating the continuity of actual picture elements between adjacent actual picture elements of each image, to define the picture element value of picture element on the epipolar line as an intermediate value, and the value of each point of intersection on parallax screen an intermediate value, and to limit the ranges of excitatory combination and inhibitory combination based on the actual picture element when the picture element value of virtual picture element indicates the discontinuity of adjacent actual picture elements.

The eleventh corresponding point extraction method for a plurality of images according to the present invention allows for the smoother rate of change in differences between neighboring parallaxes and the stronger inhibitory combination with higher probability of occurrence of false correspondence, for the variable density image, by defining the picture element value of picture element on the epipolar line as an intermediate value, and the value of each point of intersection on parallax screen as an intermediate value, and changing the strengths of excitatory combination and inhibitory combination within the ranges of excitatory combination and inhibitory combination, respectively.

The twelfth corresponding point extraction method for a plurality of images according to the present invention allows the ranges of excitatory combination and inhibitory combination, for the variable density image, to be configured in units of a sub-picture element pitch finer than a unit of picture element for each epipolar line in such a manner as to define the picture element value of picture element on the epipolar line as an intermediate value, and the value of each point of intersection on parallax screen as an intermediate value, and perform local calculation having excitatory combination and inhibitory combination based on actual picture element by increasing virtually the number of points of intersection on a parallax screen.

The thirteenth corresponding point extraction method for a plurality of images according to the present invention allows for a great reduction in the number of local processes having excitatory combination and inhibitory combination based on actual picture element, for the density image, by defining the picture element value of picture element on the epipolar line as an intermediate value and the value of each point of intersection on parallax screen as an intermediate value, and limiting the range of parallax screen for effecting the local calculation having excitatory combination and inhibitory combination based on actual picture element.

The fourteenth corresponding point extraction method for a plurality of images according to the present invention is effective, for the density image, to not only the smoothness of parallax line for an object placed at fixed distance but also an object placed at gradually varying distance by defining the picture element value of picture element on the epipolar line as an intermediate value and the value of each point of intersection on parallax screen as an intermediate value, and changing the range of excitatory combination.

The fifteenth corresponding point extraction method for a plurality of images according to the present invention provides for the three dimensional parallax line to which the continuity of parallax lines obtained on adjacent parallax screens is reflected by effecting local calculation having excitatory combination and inhibitory combination based on actual picture element over a plurality of parallax screens.

The sixteenth corresponding point extraction method for a plurality of images according to the present invention provides for the three dimensional parallax line to which the continuity of parallax lines obtained on adjacent parallax screens is reflected, as well as providing for a greater precision of three dimensional parallax line obtained than when performing only local calculation having excitatory combination and inhibitory combination based on an actual picture element over a plurality of parallax screens in such a manner as to provide a virtual picture element indicating the continuity of actual picture elements between adjacent actual picture elements of each image, to insert each virtual parallax screen formed of virtual picture elements between each parallax screen, and to perform local calculation having excitatory combination and inhibitory combination based on virtual picture element over a plurality of virtual parallax screens in parallel with local calculation having excitatory combination and inhibitory combination based on actual picture element over a plurality of parallax screens.

BRIEF DESCRIPTION OF THE DRAWINGS

FIGS. 3A and 3B are views for explaining the practical insertion operation of virtual picture element in one embodiment of the first corresponding point extraction method for a plurality of images according to the present invention, wherein FIG. 3A illustrates a left epipolar line and FIG. 3B illustrates a right spipolar line.

FIGS. 6A, 6B and 6C are views for explaining the effects of one embodiment of the first corresponding point extraction method for a plurality of images according to the present invention, wherein FIG. 6A illustrates an instance of parallax line obtained by a conventional cooperative algorithm, FIG. 6B illustrates an instance of parallax line obtained when performing only local calculation having excitatory combination and inhibitory combination based on virtual picture element, and FIG. 6C illustrates an instance of parallax line obtained when performing local calculation having excitatory combination and inhibitory combination based actual picture element in parallel with local calculation having excitatory combination and inhibitory combination based on virtual picture element.

12A illustrates a profile for changing the strength of excitatory combination within the range of excitatory combination, and FIGS. 12B and 12C illustrate profiles for changing the strength of inhibitory combination within the range of inhibitory combination.

FIGS. 14A and 14B are views for explaining the effects of the first embodiment of the fourth corresponding point extraction method for a plurality of images according to the present invention, wherein FIG. 14A illustrates the range of excitatory combination in a conventional embodiment, and FIG. 14B illustrates the range of inhibitory combination in this embodiment.

FIG. 15 is a view illustrating an instance of parallax line eventually obtained in the first embodiment of the fourth corresponding point extraction method for a plurality of images according to the present invention.

FIG. 16 is a view illustrating an instance of parallax line eventually obtained in a conventional embodiment.

FIGS. 28A and 28B are views for explaining the range of excitatory combination based on actual picture element in one embodiment of the seventh corresponding point extraction method for a plurality of images according to the present invention, wherein FIG. 28A illustrates the range of excitatory combination based on actual picture element in a conventional coordination algorithm and FIG. 28B illustrates the range of excitatory combination based on actual picture element in this embodiment.

FIG. 29 is a flowchart for explaining the operation in one embodiment of an eighth corresponding point extraction method for a plurality of images according to the present invention.

FIGS. 33A and 33B are views for explaining the range of excitatory combination based on actual picture element in one embodiment of the fourteenth corresponding point extraction method for a plurality of images according to the present invention, wherein FIG. 33A illustrates the range of excitatory combination based on actual picture element in a conventional coordination algorithm and FIG. 33B illustrates the range of excitatory combination based on actual picture element in this embodiment.

DETAILED DESCRIPTION OF THE PREFERRED EMBODIMENTS

The preferred embodiments of the present invention will be described in detail with reference to the drawings.

A. First corresponding point extraction method for a plurality of images according to the invention:

One embodiment of the first corresponding point extraction method for a plurality of images according to the present invention is to extract corresponding points for two binary images by performing local calculation having excitatory combination and inhibitory combination based on the actual picture element for said two binary images at each point of intersection on a parallax screen formed of two epipolar lines extracted respectively from said two binary images to obtain parallax lines, characterized by providing a virtual picture element indicating the continuity of actual picture elements at a portion between adjacent actual picture elements of each binary image, and performing local calculation having excitatory combination and inhibitory combination based on virtual picture element in parallel with the local calculation having excitatory combination and inhibitory combination based on actual picture element. Note that excitatory combination based on virtual picture element may be competitive with excitatory combination based on actual picture element, and inhibitory combination based on virtual picture element may be competitive with inhibitory combination based on actual picture element.

Algorithm of this embodiment comprises the following three rules 1 to 3 according to "Cooperative algorithm" proposed by David Marr.

Rule 1 (compatibility) ... Black point can be coordinated with only black point.

Rule 2 (uniqueness) ... Almost always, one black point in one image can be coordinated with a unique black point in the other image.

Rule 3 (continuity) ... Parallax of point to be coordinated will smoothly change over substantially the entire area.

And the additional three following rules 4 to 6 are proposed as follows.

Rule 4 ... Degree of continuity of parallax is made stronger toward the central portion of local process or weaker toward the peripheral portion of local process.

Rule 5 ... Inhibitory combination is made stronger when approaching closer to the periphery of local process in order to strengthen uniqueness.

Rule 6 ... A virtual picture element indicating the continuity of actual picture elements is provided at a portion between adjacent actual picture elements in the image, and a process competitive with rules 1 to 5 is performed each virtual picture element provided.

It should be noted that the "local process" as referred to in rule 5 means a process applied for the local area around one actual picture element of notice in an image, the "center of local process" means a position of one actual picture element of notice, and the "periphery of local process" means a position away from one actual picture element of notice.

Figure 1:
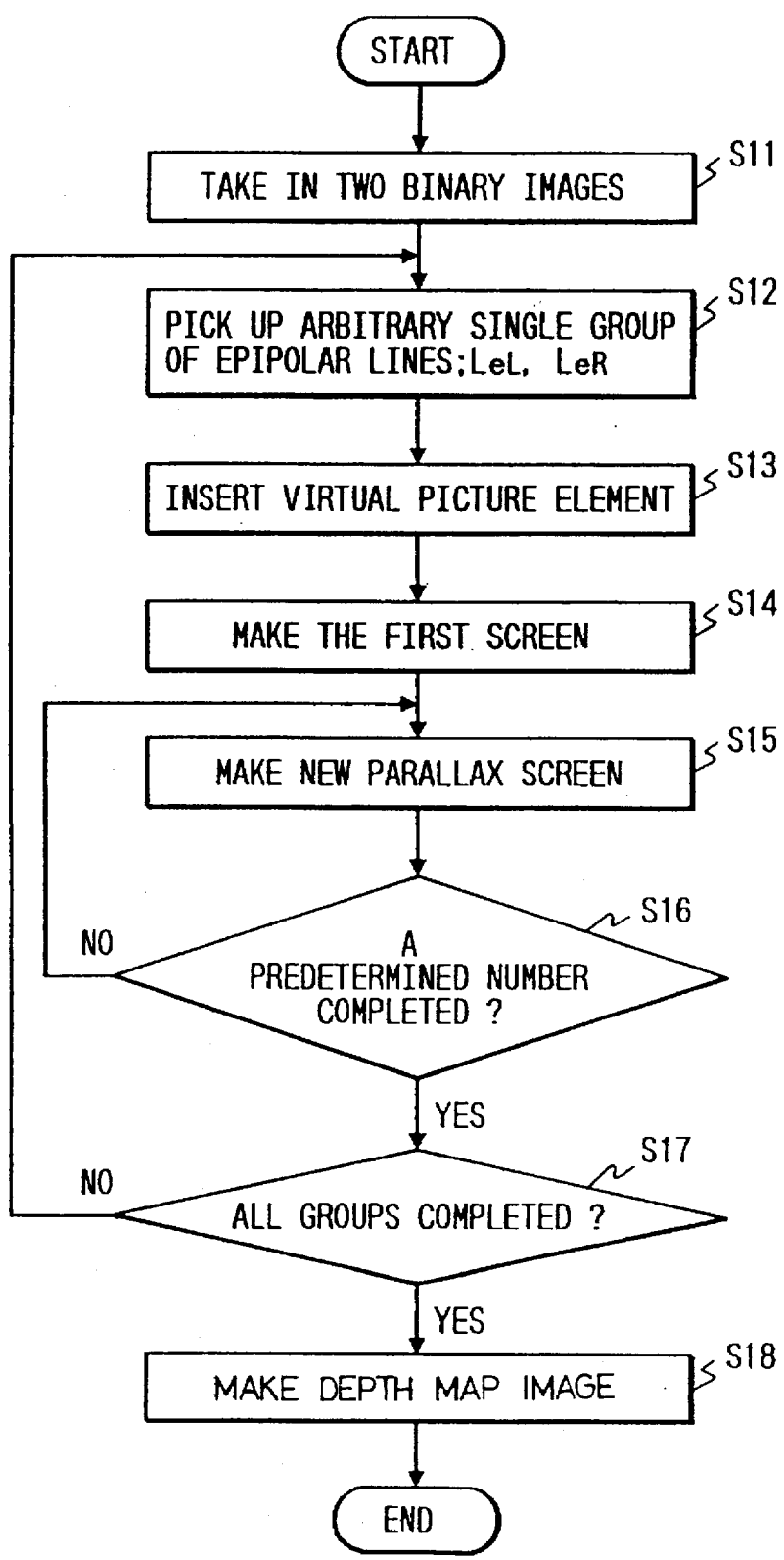
FIG. 1 is a flowchart for explaining the operation flow in one embodiment of the first corresponding point extraction method for a plurality of images according to the present invention.

The operation flow of this embodiment will be now described briefly with reference to a flowchart as shown in FIG. 1.

Two binary images having a parallax such as a Julesz's random dot stereogram as previously described are picked up using a left camera and a right camera (step S11), and an arbitrary set of epipolar lines $L_{eL}$, $L_{eR}$ are extracted from two binary images picked up (step S12). Subsequently, in order to provide a virtual picture element having a picture element value indicating the continuity of actual picture elements between adjacent actual picture elements for two binary images picked up, a picture element having the picture element value of the virtual picture element is inserted between adjacent picture elements on two extracted epipolar lines $L_{eL}$, $L_{eR}$ (step S13). Subsequently, using two epipolar lines $L_{eL}$, $L_{eR}$ into which the picture element having the picture element value of each virtual picture element is inserted, an initial screen having initial values of parallax screen is created (step S14). Then, the process according to the rules 1 to 6 as described above is performed for each black point in the created initial screen to create a new parallax screen (step S15). Subsequently, a check is performed to determine whether or not the process of step S15 is repeated by a predetermined number of times (step S16). If it is not performed by the predetermined number of times, the process of step S15 is repeated with the new parallax screen created in the process of step S15 being the initial screen. As a result, finally, a parallax line appears on the new parallax screen created in the process of step S15, whereby the extraction of corresponding point can be made based on this parallax line.

As described above, if parallax line is extracted for a set of epipolar lines $L_{eL}$, $L_{eR}$, the same process is repeatedly performed for the next set of epipolar lines (step S17). If this process is performed for all the sets of epipolar lines, distance image is created from each parallax line obtained, considering the camera conditions (step S18).

It should be noted that instead of making a check at step S16, the process of step S15 may be repeated, with the new parallax screen created in the process of step S15 as the initial screen, until the value of each point of intersection on the parallax screen is converged.

Next, the operation of steps S11 to S18 as shown in FIG. 1 will be described below in detail.

(1) Operation at step S11 and step S12

The take-in operation of two binary images at step S11 and the extraction operation of a set of epipolar lines $L_{eL}$, $L_{eR}$ at step S12 are equivalent to those of the conventional example as previously described, and therefore no longer described in detail.

(2) Operation at step S13

Figure 2:
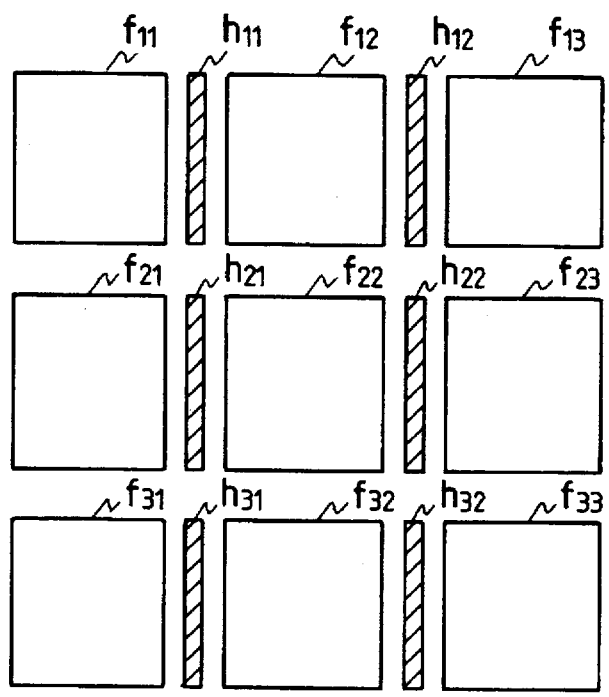
FIG. 2 is a view for explaining a virtual picture element in one embodiment of the first corresponding point extraction method for a plurality of images according to the present invention.

The insertion operation of virtual picture element at step S13 is performed as follows. As illustrated in FIG. 2, a virtual picture element (e.g., virtual picture element $h_{11}$) in a horizontal direction is set between adjacent actual picture elements (e.g., actual picture element $f_{11}$ and actual picture element $f_{12}$) in the horizontal direction of each binary image picked up at step S11. Herein, the picture element value of each virtual picture element to be set is a picture element value indicating the continuity of actual picture elements adjoining in the horizontal direction. Namely, for example, when actual picture element $f_{11}$ and actual picture element $f_{12}$ are continuous (both are black or both are white), the picture element value of virtual picture element $h_{11}$ is defined as "0", while when actual picture element $f_{11}$ and actual picture element $f_{12}$ are discontinuous (one is black and the other is white), the picture element value of virtual picture element $h_{11}$ is defined as "1".

Figure 3A:
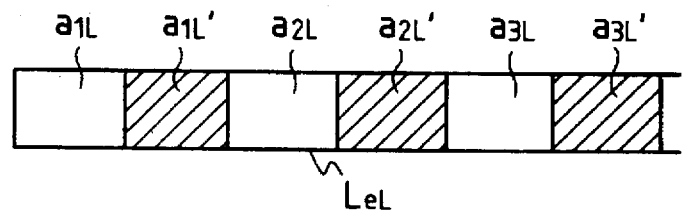
Figure 3B:
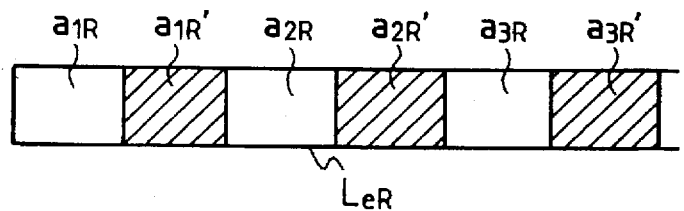

It should be noted that, in practice, the insertion operation of virtual picture element is performed by inserting a picture element having the picture element value of virtual picture element between adjacent picture elements on two epipolar lines $L_{eL}$, $L_{eR}$ extracted from two binary images picked up. That is, in a case of extracting a left epipolar line $L_{eL}$ along the scanning line at the uppermost stage as illustrated in FIG. 2 when the binary image as illustrated in FIG. 2 is a left image a picture element $a_{1L}'$ having the picture element value of virtual picture element $h_{11}$ indicating the continuity of actual picture elements $f_{11}$ and $f_{12}$ is inserted between a picture element $a_{1L}$ at the leftmost end as shown in FIG. 3A having the picture element value of actual picture element $f_{11}$ and a picture element $a_{2L}$ having the picture element value of actual picture element $f_{12}$, a picture element $a_{2L}'$ having the picture element value of virtual picture element $h_{12}$ indicating the continuity of actual picture elements $f_{12}$ and $f_{13}$ is inserted between a picture element $a_{2L}$ having the picture element value of actual picture element $f_{12}$ and a picture element $a_{3L}$ having the picture element value of actual picture element $f_{13}$, and so on, so that each picture element having the picture element value of each virtual picture element is inserted into the left epipolar line $L_{eL}$. For a right epipolar line $L_{eR}$ as illustrated in FIG. 3B, each picture element (such as picture element $a_{1R}'$ to $a_{3R}'$) having the picture element value of each virtual picture element is likewise inserted.

(3) Operation at step S14

The creation operation of initial screen at step S14 is performed as follows. First of all, as illustrated in FIG. 4, at step S13, the left epipolar line $L_{eL}$ having each picture element having the picture element value of each virtual picture element inserted therein is arranged in a transverse direction as shown with a picture element $a_{1L}$ disposed at the leftmost end as shown, and at step S13, the right epipolar line $L_{eR}$ having each picture element having the picture element value of each virtual picture element inserted therein is arranged in a longitudinal direction as shown with a picture element $a_{1R}$ disposed at the bottom end as shown.

Figure 4:
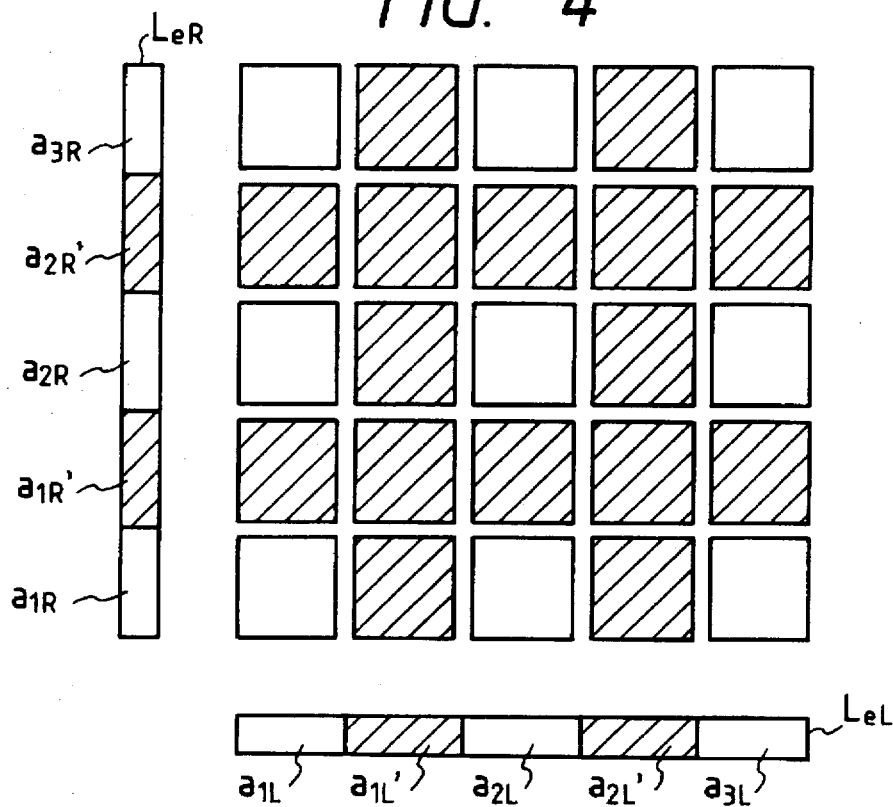
FIG. 4 is a view for explaining the creation operation of an initial screen in one embodiment of the first corresponding point extraction method for a plurality of images according to the present invention.

Since two actual picture elements of binary image as picked up are combined for each point of intersection as indicated by a square on the parallax screen as illustrated in FIG. 4, only if two picture elements corresponding to the left and right epipolar lines $L_{eL}$, $L_{eR}$ (e.g., picture element $a_{1L}$ and picture element $a_{1R}$, picture element $a_{1L}$ and picture element $a_{2R}$) are both black, they are defined as a black point (picture element value "1"), or otherwise defined as a white point (picture element value "0"), as in the conventional example previously described. Also, for each point of intersection as indicated by a black square as illustrated in FIG. 4 on the parallax screen, the picture element value is determined as follows.

(A) For two picture elements having picture element values of virtual picture element (e.g., picture element $a_{1L}'$ and picture element $a_{1R}'$, picture element $a_{1L}'$ and picture element $a_{2R}'$) the point of intersection is a black point (picture element value "1") only if both picture elements are "1", or otherwise a white point (picture element value "0").

(B) For the picture elements having picture element values of actual picture element and virtual picture element (e.g., picture element $a_{1L}$ and picture element $a_{1R}'$, picture element $a_{1L}$ and picture element $a_{2R}'$), (a) When the picture element $a_{1R}'$ having the picture element value of virtual picture element is "1", for example, the point of intersection is either a black point (picture element value "1") or a white point (picture element value "0"), whether the picture element $a_{1L}$ having the picture element value of actual picture element is black or white not.

(b) When the picture element $a_{1R}'$ having the picture element value of virtual picture element is "0" and the picture element $a_{1L}$ having the picture element value of actual picture element is black, for example, the point of intersection is a black point (picture element value "1"), if picture element $a_{1R}$ or $a_{2R}$ having the picture element value of an actual picture element adjacent to picture element $a_{1R}'$ is black, or a white point (picture element value "0"), if picture element $a_{1R}$ or $a_{2R}$ is white. On the other hand, when the picture element $a_{1L}$ having the picture element value of actual picture element is white, the point of intersection is a white point (picture element value "0"), if picture element $a_{1R}$ or $a_{2R}$ having the picture element value of an actual picture element adjacent to picture element $a_{1R}'$ is black, or a black point (picture element value "1"), if picture element $a_{1R}$ or $a_{2R}$ is white.

(4) Operation at step S15

The creation operation of a new parallax screen at step S15 is performed in the following way. For each point of intersection as indicated by a void square as illustrated in FIG. 4 on the initial screen created at step S14, the local calculation having excitatory combination and inhibitory combination based on actual picture element of binary image as picked up is performed for each point of intersection which is black, as described and shown in FIGS. 48A to 48E.

Figure 5:
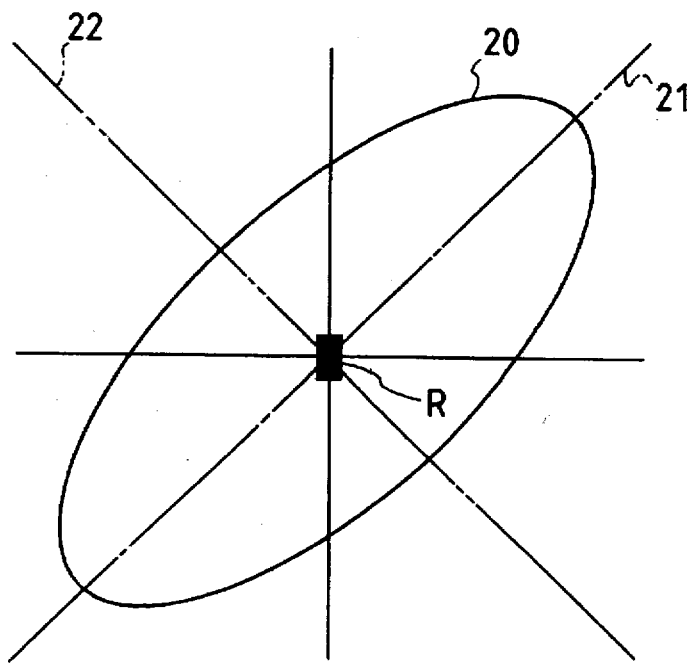
FIG. 5 is a view for explaining the excitatory combination and the inhibitory combination based virtual picture element in one embodiment of the first corresponding point extraction method for a plurality of images according to the present invention.
Figure 48A:
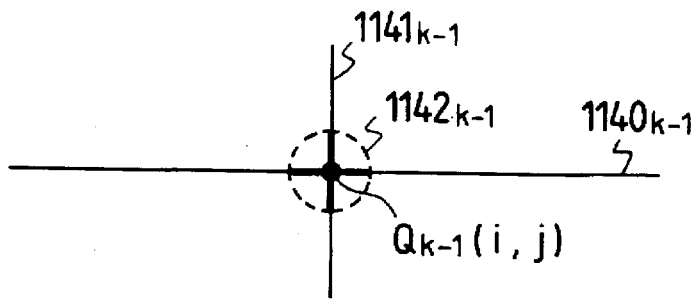
FIGS. 48A to 48E are views for explaining the range of inhibitory combination in one embodiment of the sixteenth corresponding point extraction method for a plurality of images according to the present invention.

On the other hand, for each point of intersection as indicated by a square of slanting lines as illustrated in FIG. 4, the local calculation having excitatory combination and inhibitory combination based on virtual picture element is performed for each point of intersection which has a value of "1". Herein, it is to be noted that the excitatory combination based on virtual picture element is competitive with the excitatory combination based on actual picture element of binary image, and the inhibitory combination based on virtual picture element is competitive with the inhibitory combination based on actual picture element of binary image. That is, for a point of intersection R which has a value of "1", excitatory combination based on virtual picture element is effected for each point of intersection residing on a horizontal axis as well as a vertical axis as illustrated in FIG. 5, while inhibitory combination is effected for each point of intersection residing within an ellipse 20 having a major axis 21 extending in a right upward direction with an inclination of 45° and a minor axis 22 extending in a right downward direction with an inclination of −45°. Accordingly, excitatory combination and inhibitory combination based on virtual picture element has an inverse relation with the excitatory combination and inhibitory combination based on actual picture element of binary image as illustrated in FIGS. 48A and 48E.

Figure 68:
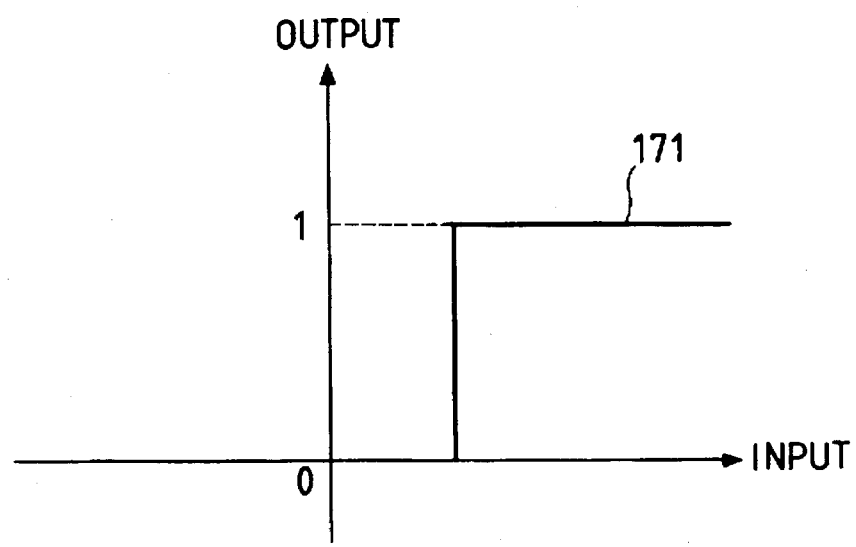
FIG. 68 is a graph for exemplifying a threshold function of binary output.
Figure 69:
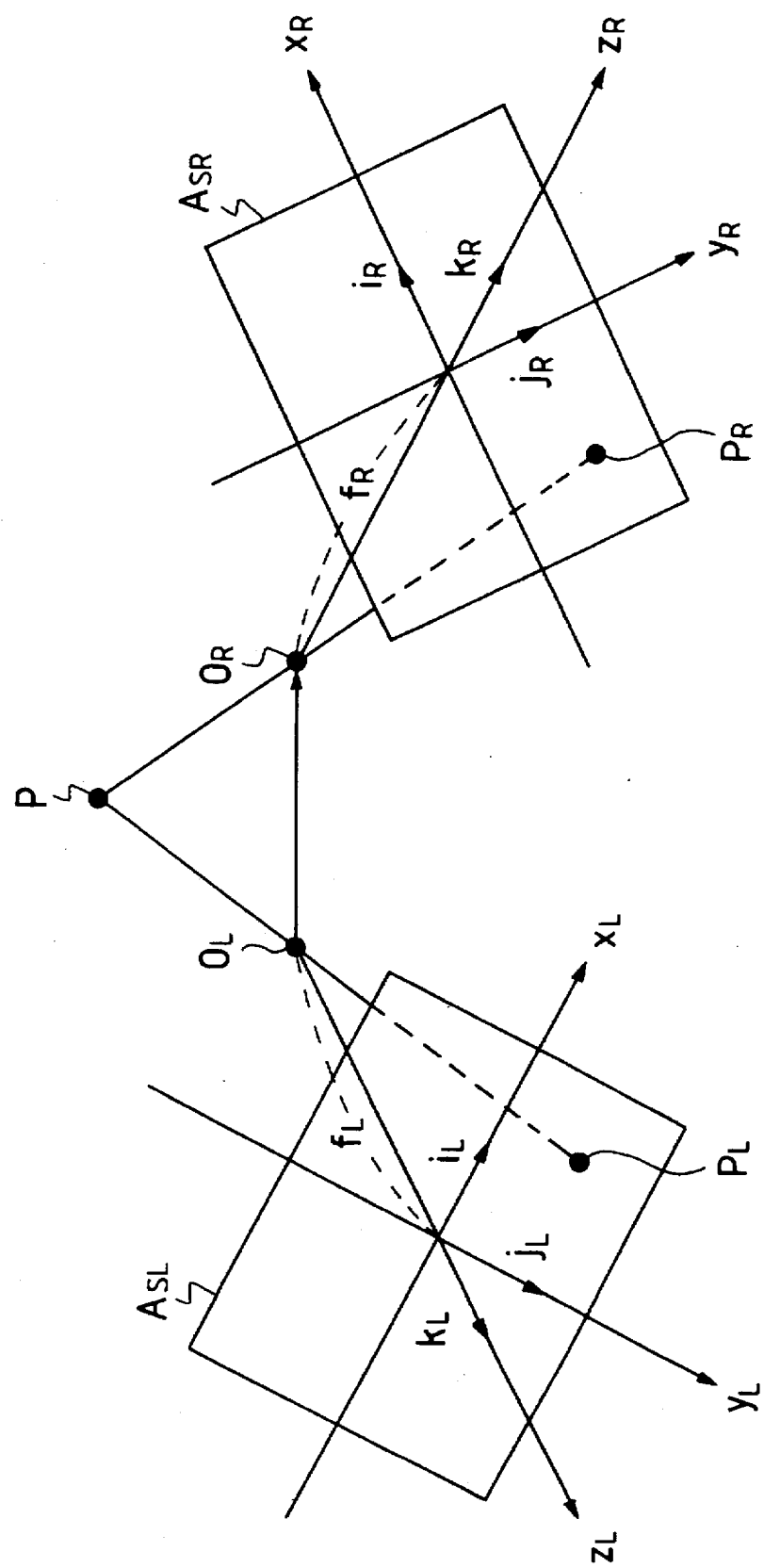
FIG. 69 is a view for explaining a way of extracting a set of epipolar lines.

In the above way, a new parallax screen is created by performing a predetermined process using a threshold function of binary output like, for example, a threshold function 171 as illustrated in FIG. 68, on each point of intersection on the initial screen in which local calculation having excitatory combination and inhibitory combination based on actual picture element of binary image is performed in parallel with the local calculation having excitatory combination and inhibitory combination based on virtual picture element.

(5) Operation at steps S16 to S18

In the check operation for predetermined number completion at step S16, a check is made to determine whether or not the creation operation of a new parallax screen at step S15 as above is performed a predetermined number, and if not, the same operation is repeated while regarding the new parallax screen created as the initial screen. As a result, a parallax line appears on a new parallax screen finally created, and the extraction of corresponding point can be effected based on this parallax line. In the check operation for all groups completion at step S17, a check is made to determine whether or not parallax lines are obtained for all groups of epipolar lines $L_{eL}$, $L_{eR}$ in two binary images picked up at step S11. If parallax lines are not obtained for all the groups, the operation from step S12 to step S16 is repeated. In the creation operation of distance image at step S12, distance image representing the distance to substance (object) is created with each parallax line obtained above.

Figure 6A:
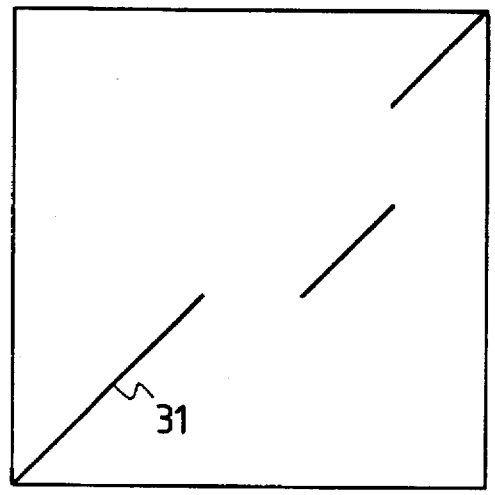
Figure 6B:
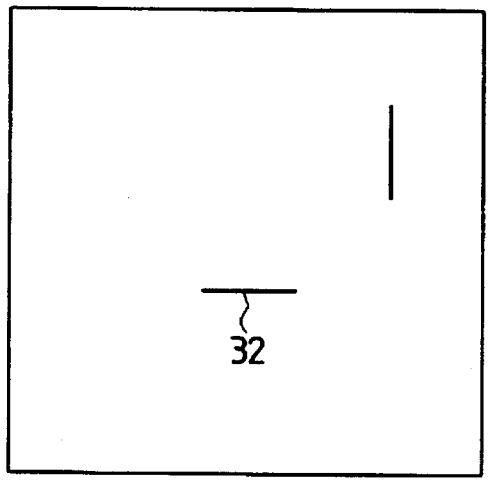

Next, the effects of corresponding point extraction method for a plurality of images in this embodiment will be described below with reference to FIGS. 6A to 6C.

Figure 63A:
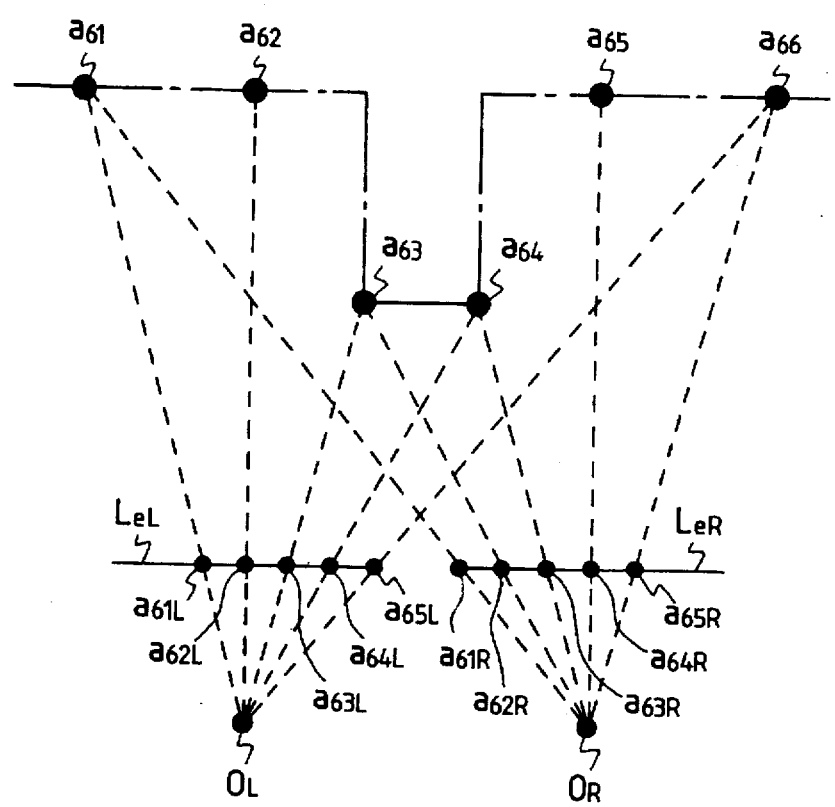
FIGS. 63A and 63B are views for explaining the relation between parallax line and distance.
Figure 63B:
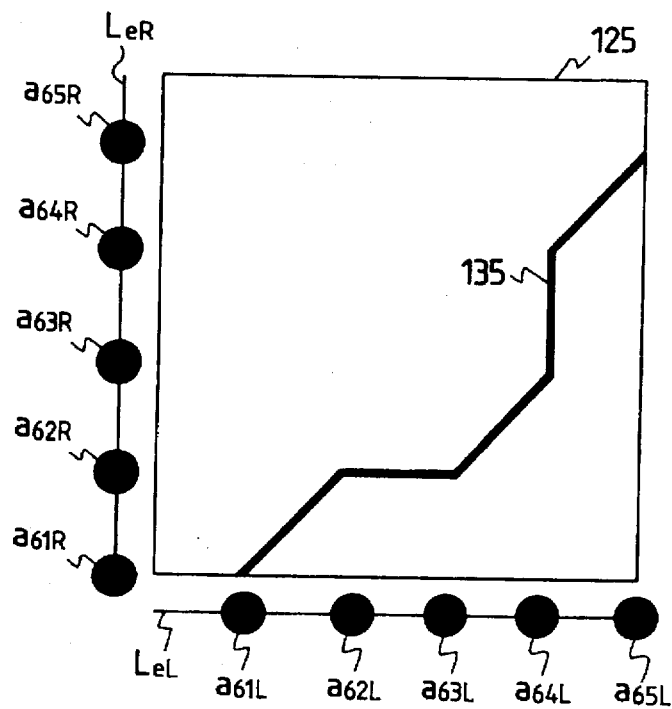
Figure 64:
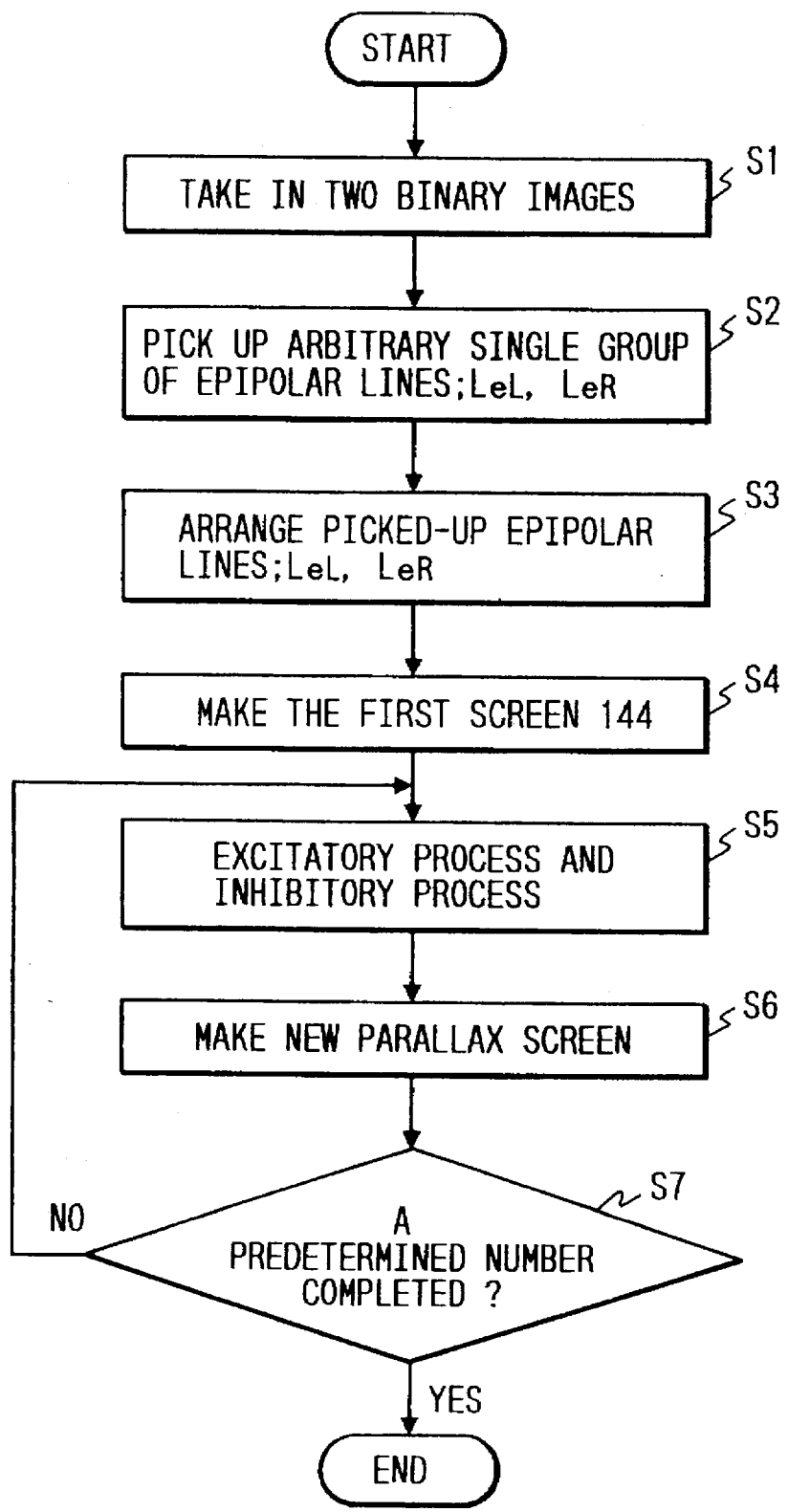
FIG. 64 is a flowchart for explaining an example of extracting the corresponding point in accordance with a coordination algorithm for two binary images converged to extremely similar images as represented in Julesz's random dot stereogram.
Figure 65:
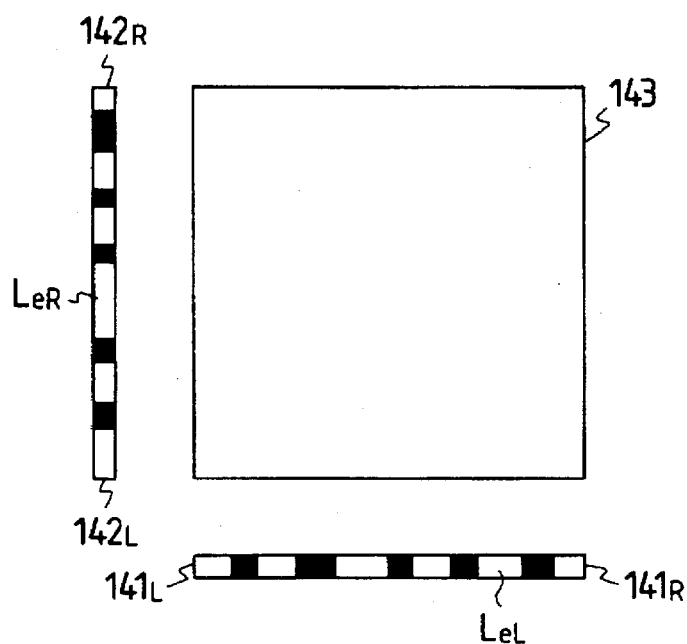
FIG. 65 is a view illustrating the arrangement of left and right epipolar lines in the cooperative algorithm.
Figure 67:
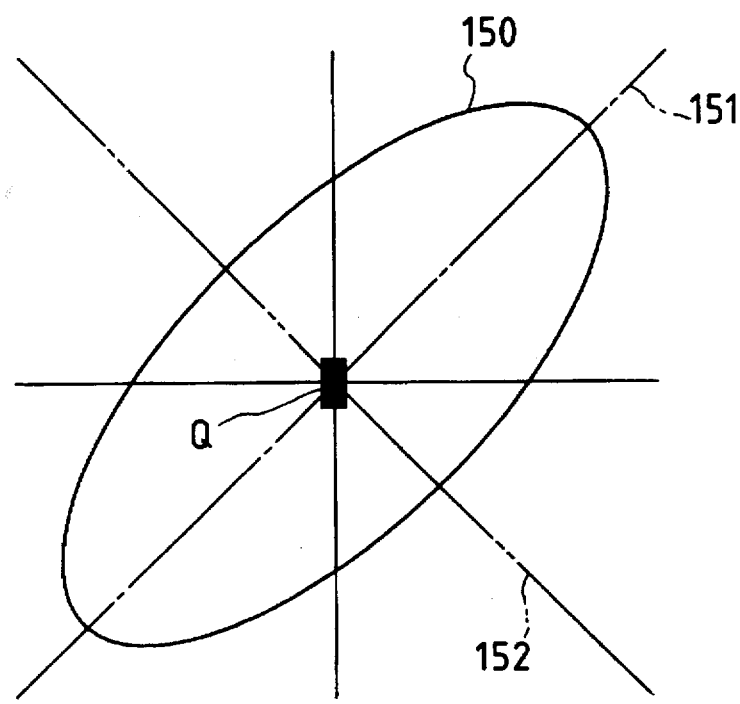
FIG. 67 is a view for explaining the ranges of excitatory combination and inhibitory combination based on actual picture element in the cooperative algorithm.

Like the conventional cooperative algorithm as previously described, when performing only the local calculation having excitatory combination and inhibitory combination based on actual picture element of binary image, excitatory combination is made in a direction extending at 45° from a black point Q as illustrated in FIG. 67, so that parallax line obtained has a tendency to exhibit line segments in the direction at 45°. As a result, parallax line 31 obtained for an object as illustrated in FIG. 63A has a tendency to be unlikely to output vertical and horizontal line segments, as illustrated in FIG. 6A. On the other hand, since excitatory combination based on virtual picture element in this embodiment is made in a vertical direction and a horizontal direction as shown with respect to a point of intersection R, parallax line obtained has a tendency to exhibit strongly vertical line segment and horizontal line segments. As a result, when performing only the local calculation having excitatory combination and inhibitory combination based on virtual picture element, parallax line 32 obtained for an object as illustrated in FIG. 63A has a tendency to be unlikely to output line segments along a direction at 45°.

Figure 6C:
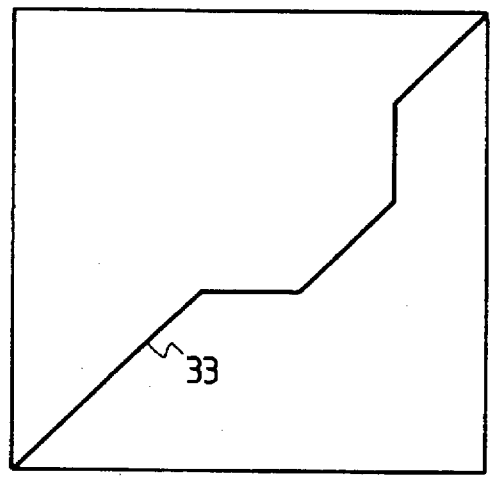

Accordingly, like this embodiment, by performing local calculation having excitatory combination and inhibitory combination based on actual picture element of binary image in parallel with local calculation having excitatory combination and inhibitory combination based on virtual picture element, parallax line 33 obtained for an object as illustrated in FIG. 63A has line segments all output for vertical, horizontal, and 45° directions, as illustrated in FIG. 6C.

Cooperative algorithm in this embodiment as described above is represented by a formulized expression as follows, $$C_{x,y,d}^{n+1} = \sigma_1 \left\{ \sum_{x'y'd' \in s(x,y,d)} C_{x',y',d'}^n - \epsilon \sum_{x'y'd' \in o(x,y,d)} C_{x',y',d'}^n + C_{x,y,d}^0 \right\} + \qquad (A1)$$

$$\sigma_2 \left\{ \sum_{x'y'd' \in o'(x,y,d)} C_{x',y',d'}^n - \epsilon \sum_{x'y'd' \in s'(x,y,d)} C_{x',y',d'}^n + C_{x,y,d}^n + C_{x,y,d}^0 \right\}$$

Figure 7:
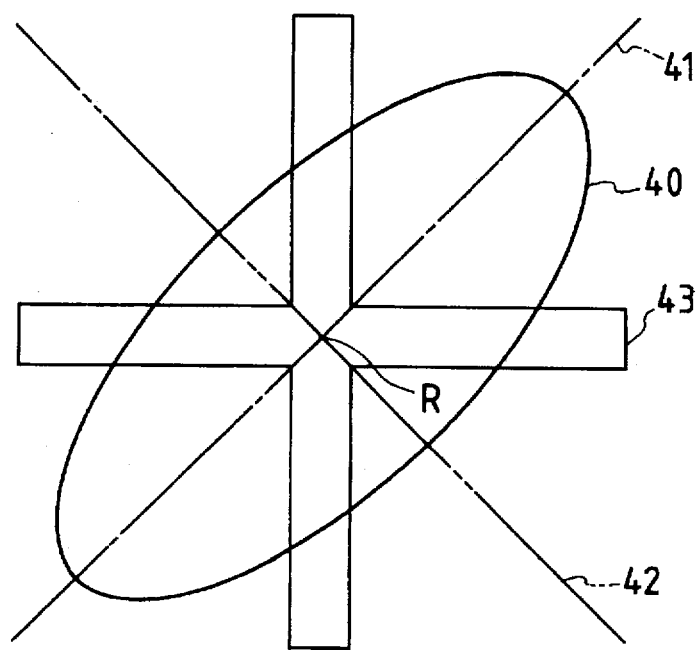
FIG. 7 is a view illustrating another instance of the range of excitatory combination and inhibitory combination based on virtual picture element.

While in the above description, excitatory combination and inhibitory combination based on virtual picture element are performed within the range as shown in FIG. 5, it will be appreciated that excitatory combination based on virtual picture element for a point of intersection R may be performed for each point of intersection residing within the range of a cross 43 having a certain width in both a horizontal direction and a vertical direction as shown in FIG. 7.

B. Second corresponding point extraction method for a plurality of images according to the present invention:

One embodiment of the second corresponding point extraction method for a plurality of images according to the present invention is to extract corresponding points for two binary images by performing local calculation having excitatory combination and inhibitory combination based on the actual picture element for two binary images at each point of intersection on a parallax screen formed of two epipolar lines extracted respectively from two binary images to obtain parallax lines, characterized by providing a virtual picture element indicating the continuity of actual picture elements between adjacent actual picture elements of each binary image, and respectively limiting the ranges of excitatory combination and inhibitory combination based on actual picture element when the picture element value of virtual picture element indicates that adjacent actual picture elements are discontinuous.

Figure 8:
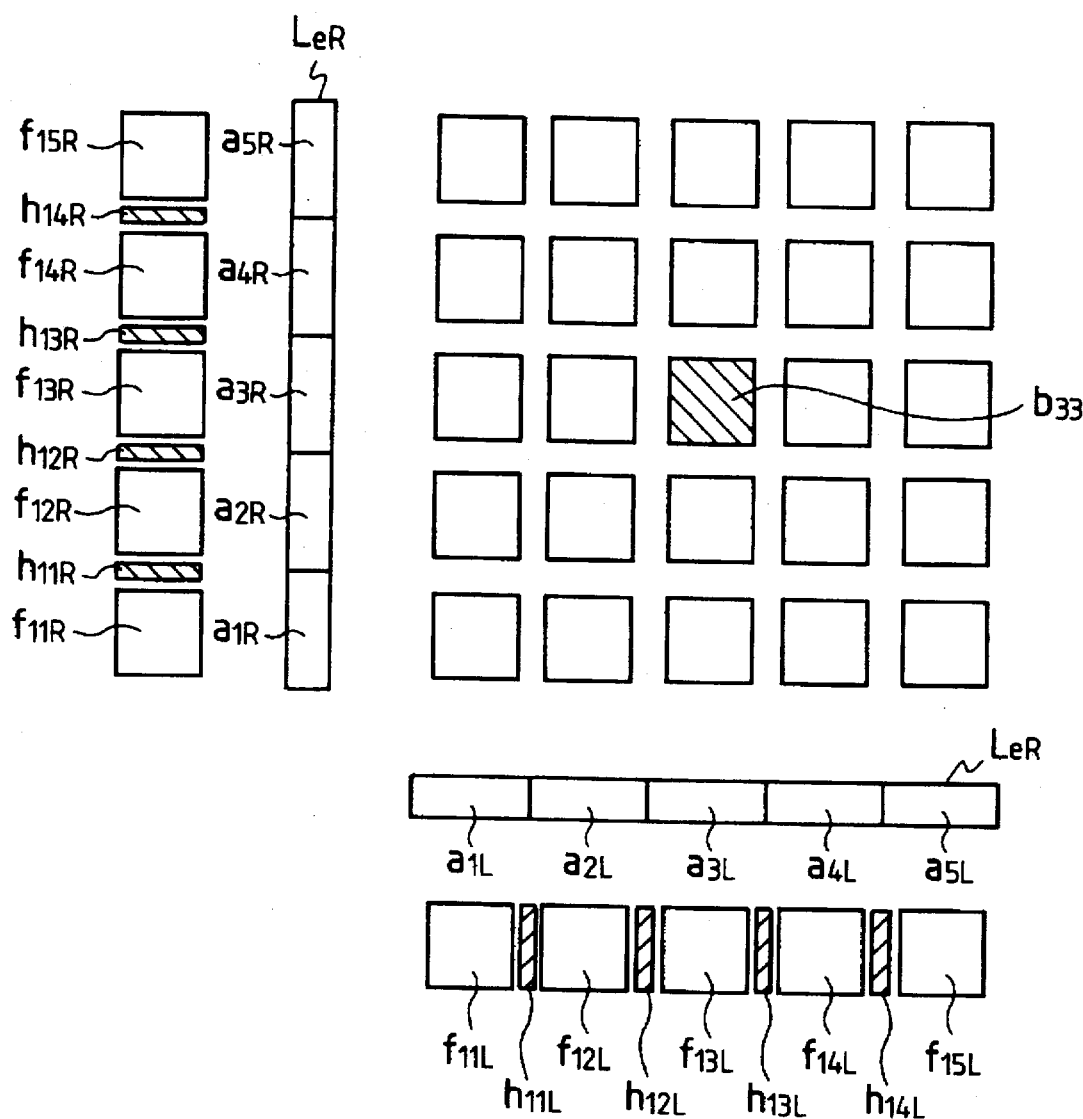
FIG. 8 is a view for explaining the operation in one embodiment of the second corresponding point extraction method for a plurality of images according to the present invention.

The operation flow of this embodiment will be now described with reference to FIGS. 8 and 9.

Two binary images having a parallax such as a Julesz's random dot stereogram as previously described are picked up using a left camera and a right camera, and then an arbitrary set of epipolar lines $L_{eL}$, $L_{eR}$ are extracted from two binary images picked up. Subsequently, as shown in FIG. 2, a virtual picture element in a horizontal direction is set between actual picture elements adjoining in the horizontal direction for two binary images picked up. Herein, the picture element value of each virtual picture element to be set is a picture element value indicating the continuity of actual picture elements adjoining in the horizontal direction. Namely, for example, when adjacent actual picture elements are continuous (both are black or both are white), the picture element value of virtual picture element to be inserted between such actual picture elements is defined as "0", while when adjacent actual picture elements are discontinuous (one is black and the other is white), the picture element value of virtual picture element to be inserted between such actual picture elements is defined as "1".

Figure 66:
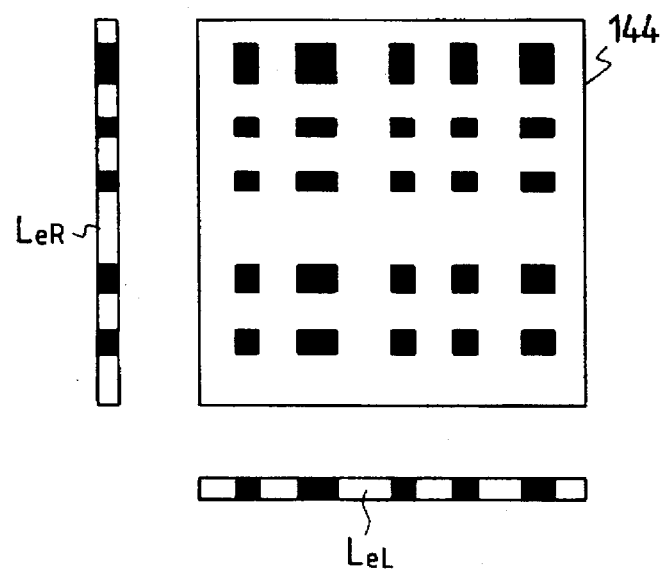
FIG. 66 is a view for explaining a way of creating the initial screen in the cooperative algorithm.

Subsequently, using two epipolar lines $L_{eL}$, $L_{eR}$ as extracted, an initial screen having the initial values of parallax screen is created, as illustrated in FIG. 66.

Subsequently, local process having excitatory combination and inhibitory combination based on actual picture element is performed for each black point in the initial screen created. Herein, when the picture element value of virtual picture element is "1" (adjacent actual picture elements are discontinuous), respective ranges of excitatory combination and inhibitory combination based on actual picture element are limited. That is, in the initial screen as shown in FIG. 8, when the point of intersection $b_{33}$ as indicated by oblique lines is a black point, the local process having excitatory combination and inhibitory combination based on actual picture element is performed for the point of intersection $b_{33}$ within the range as shown in FIG. 67, like the conventional example, if the picture element values of virtual picture elements (e.g., virtual picture elements $h_{11R}$ to $h_{14R}$, $h_{11L}$ to $h_{14L}$) inserted into each binary image within the range for performing the local process having excitatory combination and inhibitory combination based on actual picture element for the point of intersection $b_{33}$ are all "0" (adjacent actual picture elements are continuous in all cases). On the other hand, for example, when the picture element value of virtual picture element $h_{14L}$ is "1" (actual picture element $f_{14L}$ and actual picture element $f_{15L}$ of left binary image are discontinuous) and the picture element values of other virtual picture elements $h_{11R}$ to $h_{14R}$ and $h_{11L}$ to $h_{13L}$ are all "0", local process having excitatory combination and inhibitory combination based on actual picture element is performed for the point of intersection $b_{33}$ outside of the range as indicated by the slanting line, as shown in FIG. 9.

Figure 9:
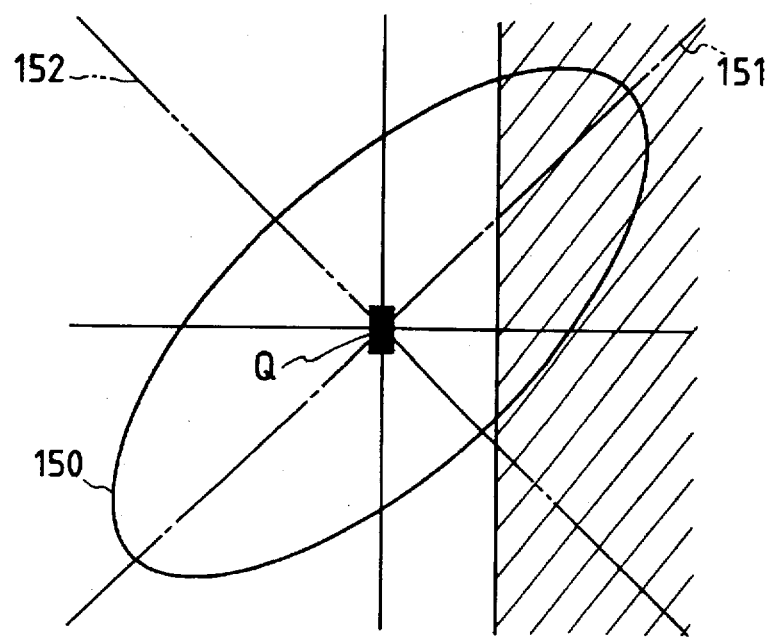
FIG. 9 is a view for explaining the operation in one embodiment of the second corresponding point extraction method for a plurality of images according to the present invention.

For example, when the picture element value of virtual picture element $h_{11L}$ is "1" (actual picture element $f_{11L}$ and actual picture element $f_{12L}$ of left binary image are discontinuous) and the picture element values of other virtual picture elements $h_{11R}$ to $h_{14R}$ and $h_{12L}$ to $h_{14L}$ are all "0", the ranges of excitatory combination and inhibitory combination based on actual picture element are limited to the left side as shown in FIG. 9; also, for example, when the picture element value of virtual picture element $h_{14R}$ is "1" (actual picture element $f_{14R}$ and actual picture element $f_{15R}$ of right binary image are discontinuous) and the picture element values of other virtual picture elements $h_{11R}$ to $h_{13R}$ and $h_{11L}$ to $h_{14L}$ are all "0", the ranges of excitatory combination and inhibitory combination based on actual picture element are limited to the upper side as shown in FIG. 9; further, for example, when the picture element value of virtual picture element $h_{11R}$ is "1" (actual picture element $f_{11R}$ and actual picture element $f_{12R}$ of right binary image are discontinuous) and the picture element values of the other virtual picture elements $h_{12R}$ to $h_{14R}$ and $h_{11L}$ to $h_{14L}$ are all "0", the ranges of excitatory combination and inhibitory combination based on actual picture element are limited to the lower side as shown in FIG. 9. Also, for example, when the picture element values of two virtual picture elements $h_{11R}$, $h_{14R}$ are "1" (actual picture element $f_{11R}$ and actual picture element $f_{12R}$ of right binary image are discontinuous, and actual picture element $f_{11L}$ and actual picture element $f_{12L}$ of left binary image are discontinuous) and the picture element values of other virtual picture elements $h_{12R}$ to $h_{14R}$ and $h_{11L}$ to $h_{13L}$ are all "0", the ranges of excitatory combination and inhibitory combination based on actual picture element are respectively limited to the lower side and the right side as shown in FIG. 9.

In this way, by limiting the ranges of excitatory combination and inhibitory combination based on actual picture element when the picture element value of virtual picture element is "1" (adjacent actual picture elements are discontinuous), improvement of precision can be effected because of reduced errors in the local process having excitatory combination and inhibitory combination based actual picture element, which may be caused by discontinuous actual picture elements of each binary image picked up.

Figure 49:
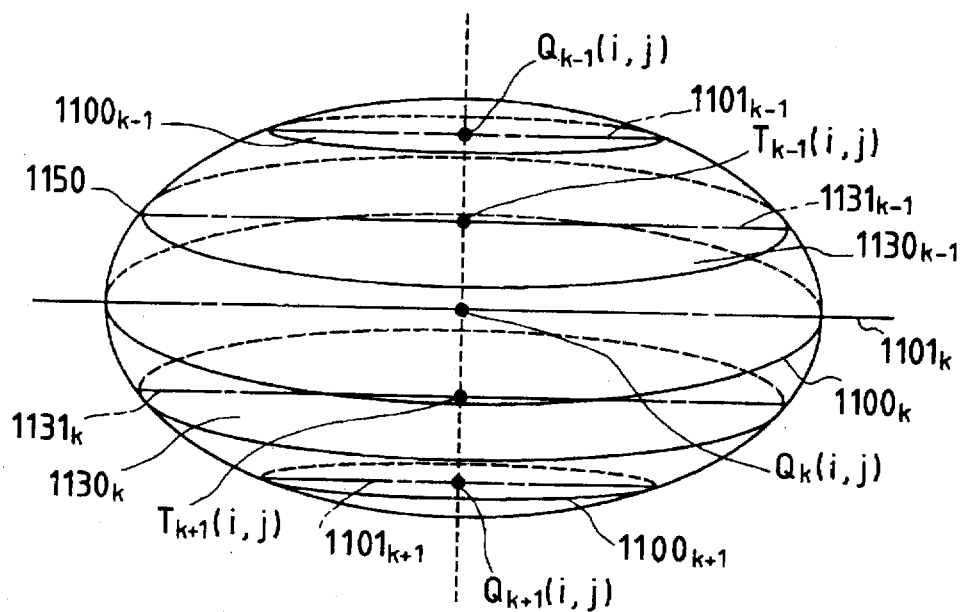
FIG. 49 is a view for exemplifying a way of determining the range of ellipses as illustrated in FIGS. 47A, 47C and 47E, and FIGS. 48B and 48D.

In the above way, a new parallax screen is created by performing a predetermined process using a threshold function of binary output like, for example, a threshold function 171 as illustrated in FIG. 49, for each point of intersection on the initial screen to which focal calculation having excitatory combination and inhibitory combination based on actual picture element of binary image has been performed.

Subsequently, a check is made to determine whether or not a local process having excitatory combination and inhibitory combination based on actual picture element is performed a predetermined number, and if not, the same operation is repeated while regarding the new parallax screen created in the local process as the initial screen. As a result, a parallax line appears on a new parallax screen finally created, and the extraction of corresponding point can be effected based on this parallax line.

If the parallax line is extracted for a group of epipolar lines $L_{eL}$, $L_{eR}$ in the above way, the same process is repeated for the next group of epipolar lines. If such operation is performed for all the groups of epipolar lines, distance image is created from each parallax line obtained by considering the camera conditions.

C. Third corresponding point extraction method for a plurality of images according to the invention:

One embodiment of the third corresponding point extraction method for a plurality of images according to the present invention is to extract corresponding points for two binary images by performing local calculation having excitatory combination and inhibitory combination based on the actual picture element for said two binary images at each point of intersection on a parallax screen formed of two epipolar lines extracted respectively from said two binary images to obtain parallax lines, characterized by respectively changing the strengths of excitatory combination and inhibitory combination within the respective ranges of excitatory combination and inhibitory combination.

Algorithm of this embodiment comprises the following three rules 1 to 3 according to "Cooperative algorithm" proposed by David Marr.

Rule 1 (compatibility) . . . Black point can be coordinated with only black point.

Rule 2 (uniqueness) . . . Almost always, one black point in one image can be coordinated with a unique black point in the other image.

Rule 3 (continuity) . . . Parallax of point to be coordinated smoothly changes over substantially the entire area.

And the additional rules 4 and 5 are proposed as follows.

Rule 4 . . . Degree of continuity of parallax is made stronger toward the central portion of local process or weaker toward the peripheral portion of local process.

Rule 5 . . . Inhibitory combination is made stronger when approaching closer to the periphery of local process in order to strengthen uniqueness.

It should be noted that the "local process" as referred to in rule 5 means a process for the local area around one actual picture element of notice in an image, the "center of local process" means a position of one actual picture element of notice, and the "periphery of local process" means a position away from one actual picture element of notice.

Figure 10:
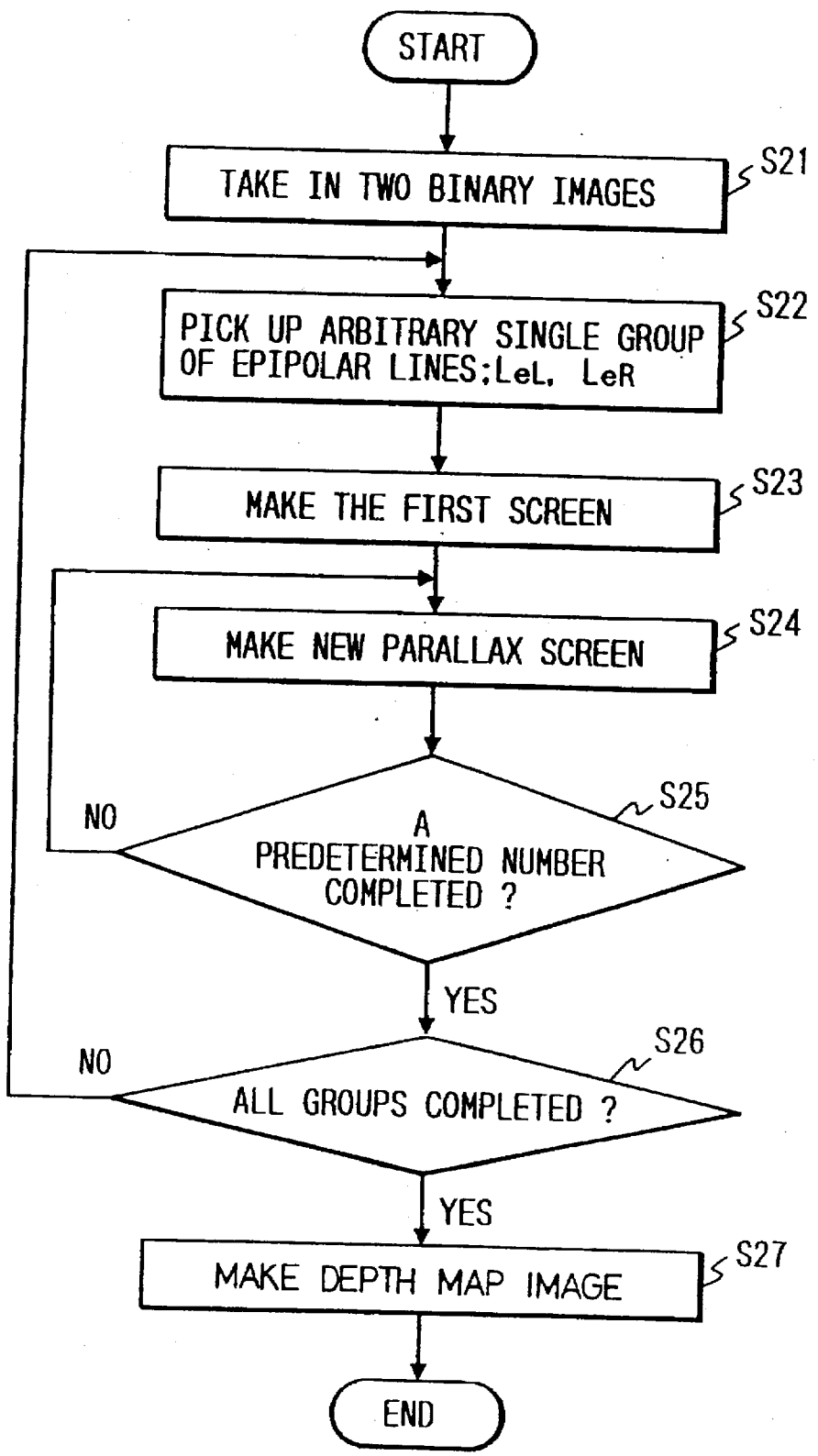
FIG. 10 is a flowchart for explaining the operation flow in one embodiment of the third corresponding point extraction method for a plurality of images according to the present invention.

The operation flow of this embodiment will be now described briefly with reference to a flowchart as shown in FIG. 10.

Two binary images having a parallax such as a Julesz's random dot stereogram as previously described are picked up using a left camera and a right camera (step S21), and an arbitrary set of epipolar lines $L_{eL}$, $L_{eR}$ are extracted from two binary images picked up (step S22). Subsequently, using two epipolar lines $L_{eL}$, $L_{eR}$ as extracted, an initial screen having the initial values of parallax screen is created (step S23). Then, the process according to the rules 1 to 5 as described above is performed for each black point in the created initial screen to create a new parallax screen (step S24). Subsequently, a check is performed to determine wether or not the process of step S24 is repeated by a predetermined number of times (step S25). If it is not performed by the predetermined number of times, the process of step S24 is repeated with the new parallax screen created in the process of step S24 being the initial screen. As a result, finally, a parallax line appears on the new parallax screen created in the process of step S24, whereby the extraction of corresponding point can be made based on this parallax line.

As described above, if parallax line is extracted for a set of epipolar lines $L_{eL}$, $L_{eR}$, the same process is repeatedly performed for the next set of epipolar lines (step S26). If this process is performed for all the sets of epipolar lines, distance image is created from each parallax line obtained, considering the camera conditions (step S27).

It should be noted that instead of making a check at step S25, the process of step S24 may be repeated by regarding the new parallax screen created in the process of step S24 as the initial screen, until the value of each point of intersection on the parallax screen is converged.

Next, the operation of steps S21 to S27 as shown in FIG. 10 will be described below in detail.

(1) Operation at step S21, step S22 and step S23

The take-in operation of two binary images at step S21, the extraction operation of a set of epipolar lines $L_{eL}$, $L_{eR}$ at step S22, and the creation operation of initial screen at step S23 are equivalent to those of the conventional example as previously described, and therefore herein no longer described in detail.

(2) Operation at step S24

Figure 11:
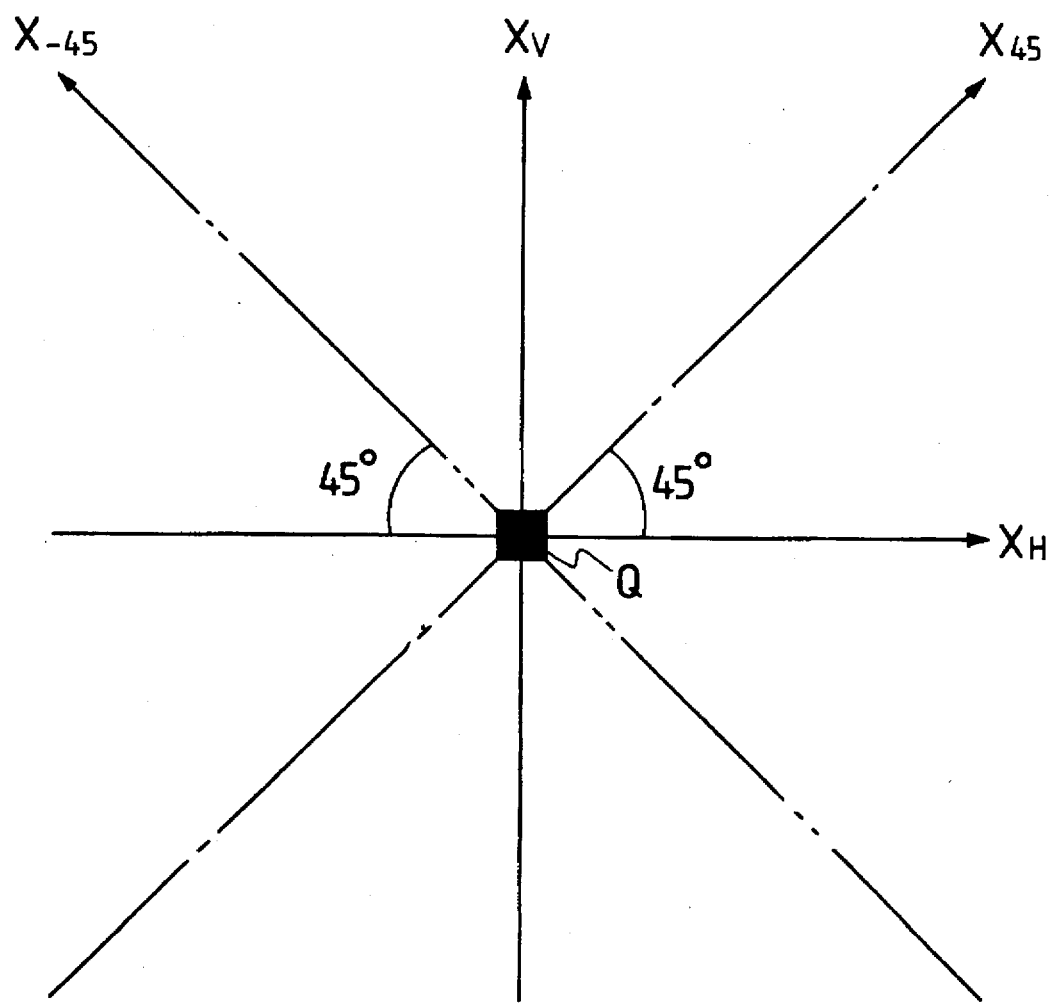
FIG. 11 is a view for explaining the creation operation of a new parallax screen in the third corresponding point extraction method for a plurality of images according to the present invention.
Figure 12A:
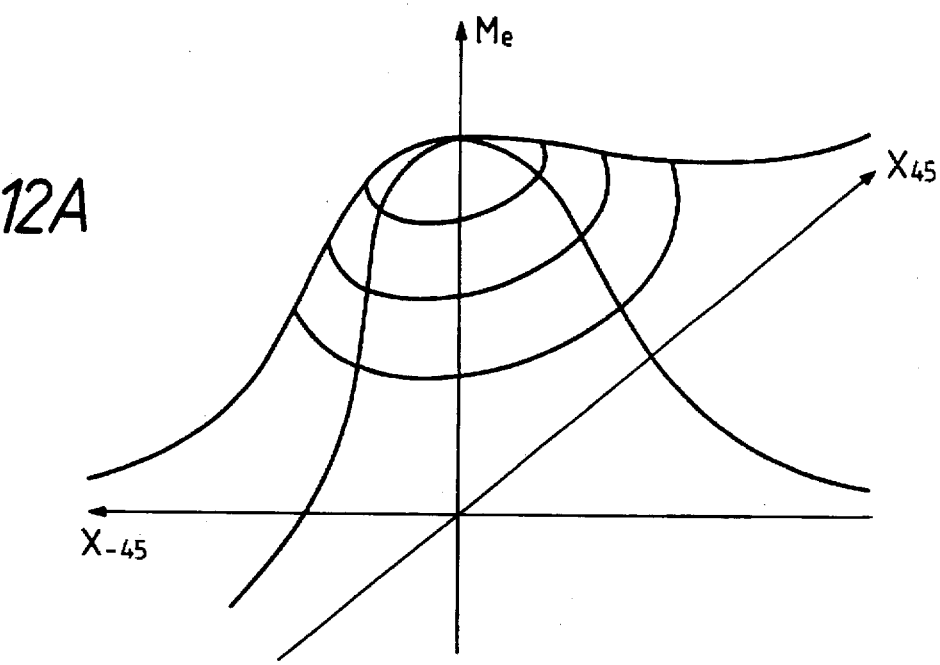
FIGS. 12A, 12B and 12C are views for explaining the creation operation of a new parallax screen in the third corresponding point extraction method for a plurality of images according to the present invention, wherein FIG.

The creation operation of a new parallax screen at step S24 is performed in the following way. For each black point of the initial screen created at step S23, the local calculation is performed by changing the strengths of excitatory combination and inhibitory combination within the ranges of excitatory combination and inhibitory combination, respectively. That is, as illustrated in FIG. 11, for a black point Q, local process having excitatory combination in a 45° direction ($x_{45}$ direction and $x_{-45}$ direction) is performed, and local process having inhibitory combination in a horizontal direction $x_H$ and a vertical direction $x_V$ is performed, wherein the profile for changing the strength $M_e$ of excitatory combination within the range of excitatory combination is Gaussian as illustrated in FIG. 12A. This means that for Rule 3 "smooth change of parallax", the conventional cooperative algorithm has additionally following Rule 4.

Rule 4 . . . Degree of continuity of parallax is made stronger toward the central portion of local process or weaker toward the peripheral portion of local process so that the introduction of Gaussian function will allow for the smaller difference between adjacent parallaxes as well as the smoother rate of change in terms of the degree of smooth change.

Note that the Gaussian line shape as illustrated in FIG. 12A is represented as $$M_e = A_1 \cdot \exp[-\{(x_{45}/\gamma_1)^2 + (x_{-45}/\gamma_2)^2\}] \quad \text{(C1)}$$

wherein $A_1$ determines the strength of excitatory combination and $\gamma_1$ and $\gamma_2$ determine the range of excitatory combination.

Figure 12B:
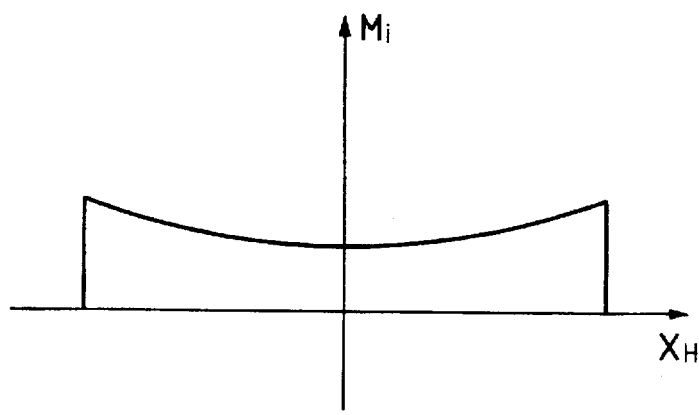
Figure 12C:
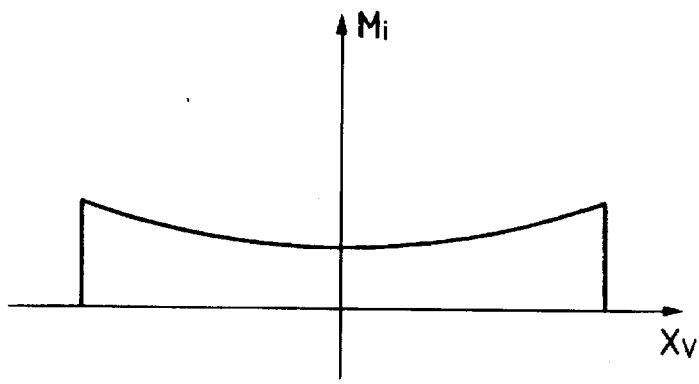

Also, the profile for changing the strength $M_i$ of inhibitory combination within the range of inhibitory combination may converge to a black point Q, as illustrated in FIGS. 12B and 12C. This means that the conventional cooperative algorithm has additionally following Rule 5.

Rule 5 . . . Inhibitory combination is made stronger when approaching closer to the periphery of local process in order to strengthen uniqueness so that the inhibitory combination is made stronger at points having higher probability of false correspondence.

In the above way, a new parallax screen is created by performing a predetermined process using a threshold function of binary output like, for example, a threshold function 171 as illustrated in FIG. 68, for each point of intersection on the initial screen to which local calculation having excitatory combination and inhibitory combination based on actual picture element of binary image is performed.

(5) Operation at steps S25 to S27:

In the check operation for predetermined number completion at step S25, a check is made to determine whether or not the creation operation of a new parallax screen at step S24 as above is performed a predetermined number, and if not, the same operation is repeated while regarding the new parallax screen created as the initial screen. As a result, a parallax line appears on a new parallax screen finally created, and the extraction of corresponding point can be effected based on this parallax line.

In the check operation for all groups completion at step S26, a check is made to determine whether or not parallax lines are obtained for all groups of epipolar lines $L_{eL}$, $L_{eR}$ in two binary images picked up at step S21. If parallax lines are not obtained for all the groups, the operation from step S22 to step S25 is repeated.

In the creation operation of distance image at step S27, distance image representing the distance to substance (object) is created with each parallax line obtained above.

While in the above description the profile for changing the strength $M_e$ of excitatory combination within the range of excitatory combination is Gaussian, it will be understood that any other shapes than the Gaussian profile may be employed which gradually decrease from the center toward the periphery.

D. Fourth corresponding point extraction method for a plurality of images according to the invention:

A first embodiment of the fourth corresponding point extraction method for a plurality of images according to the present invention is to extract corresponding points for two binary images by performing local calculation having excitatory combination and inhibitory combination based on the actual picture element for said two binary images at each point of intersection on a parallax screen formed of two epipolar lines extracted respectively from said two binary images to obtain parallax lines, characterized by performing local calculation having excitatory combination and inhibitory combination based on actual picture element by virtually increasing the number of points of intersection on the parallax screen.

The operation flow of this embodiment will be described below.

Figure 13:
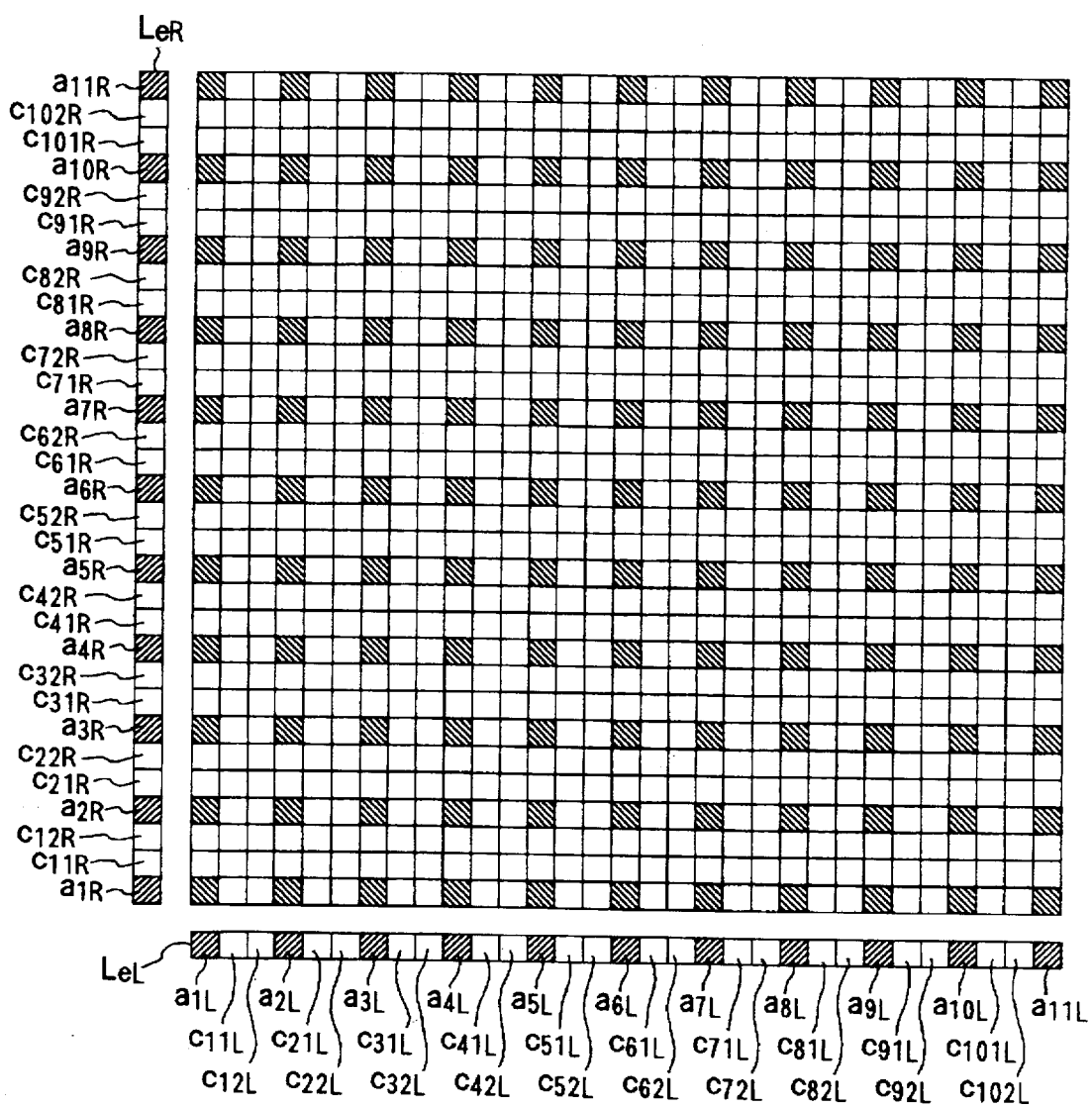
FIG. 13 is a view for explaining the operation in a first embodiment of the fourth corresponding point extraction method for a plurality of images according to the present invention.

Two binary images having a parallax such as a Julesz's random dot stereogram as previously described are picked up using a left camera and a right camera, and an arbitrary set of epipolar lines $L_{eL}$, $L_{eR}$ are extracted from two binary images picked up. Subsequently, as illustrated in FIG. 13, two virtual picture elements (as shown by a void square) are inserted between adjacent two picture elements (as shown by a square of slanting lines) of left epipolar line $L_{eL}$ as extracted, in such a manner that, for example, two virtual picture elements $c_{1L}$, $c_{12L}$ are inserted between picture elements $a_{1L}$ and $a_{2L}$ of left epipolar line $L_{eL}$ as extracted, two virtual picture elements $c_{21L}$, $C_{22L}$ are inserted between picture elements $a_{2L}$ and $a_{3L}$, and so on; and two virtual picture elements (as shown by a void square) are inserted between adjacent two picture elements (as shown by a square of slanting lines) of right epipolar line $L_{eR}$ as extracted, in such a manner that, for example, two virtual picture elements $c_{11R}$, $c_{12R}$ are inserted between picture elements $a_{1R}$ and $a_{2R}$ of right epipolar line $L_{eR}$ as extracted, two virtual picture elements $c_{21R}$, $c_{22R}$ are inserted between picture elements $a_{2R}$ and $a_{3R}$, and so on. It should be noted that the picture element value of each of virtual picture elements $c_{11L}$ to $c_{102L}$, $c_{12R}$ to $c_{102R}$ is determined by a well-known spline interpolation or linear interpolation using the picture element values of adjacent picture elements of left and right epipolar lines $L_{eL}$ and $L_{eR}$, for example, the picture element values of two virtual picture elements $c_{11L}$, $c_{12L}$ are determined by the well-known spline interpolation or linear interpolation using the picture element value of a picture element $a_{1L}$ of left epipolar line $L_{eL}$ and the picture element value of a picture element $a_{1L}$.

Subsequently, using left and right epipolar lines $L_{eL}$, $L_{eR}$ into which each virtual picture element is inserted, an initial screen having the initial values of parallax screen is created. Then, the point of intersection between a picture element of left epipolar line $L_{eL}$ and a picture element of right epipolar line $L_{eR}$ as indicated by a square of oblique lines in FIG. 13 is a black point, only when the picture element values of two picture elements are both black, as was performed by the previously-described conventional creation method of initial screen. Also, the point of intersection between a virtual picture element of left epipolar line $L_{eL}$ and a virtual picture element of right epipolar line $L_{eR}$, the point of intersection between a picture element of left epipolar line $L_{eL}$ and a virtual picture element of right epipolar line $L_{eR}$ and the point of intersection between a virtual picture element of left epipolar line $L_{eL}$ and a picture element of right epipolar line $L_{eR}$, as indicated by a void square in FIG. 13O may be defined as a black point only when the picture element values of two picture elements are both black, or all defined as either white point or black point, as was performed by the previously-described conventional creation method of initial screen. Subsequently, for each black point of created initial screen, local calculation having excitatory combination and inhibitory combination based on actual picture element is performed, as was conventionally performed.

In the above way, a new parallax screen is created by performing a predetermined process using a threshold function of binary output like, for example, a threshold function 171 as illustrated in FIG. 68, for each point of intersection on the initial screen to which local calculation having excitatory combination and inhibitory combination based on actual picture element of binary image is performed.

Subsequently, a check is made to determine whether or not the creation operation of a new parallax screen is performed predetermined number, and if not, the local calculation having excitatory combination and inhibitory combination based on actual picture element is repeated while regarding the new parallax screen created as the initial screen. As a result, a parallax line appears on a new parallax screen finally created, and the extraction of corresponding point can be effected based on this parallax line.

In the above way, if parallax lines are not extracted for a group of epipolar lines $L_{eL}$, $L_{eR}$, the same operation is repeated for the next group of epipolar lines. If the above operation is performed for all the groups of epipolar lines, distance image is created from each parallax line obtained above, considering the camera conditions.

Next, the effects of this embodiment will be described below.

Figure 14A:
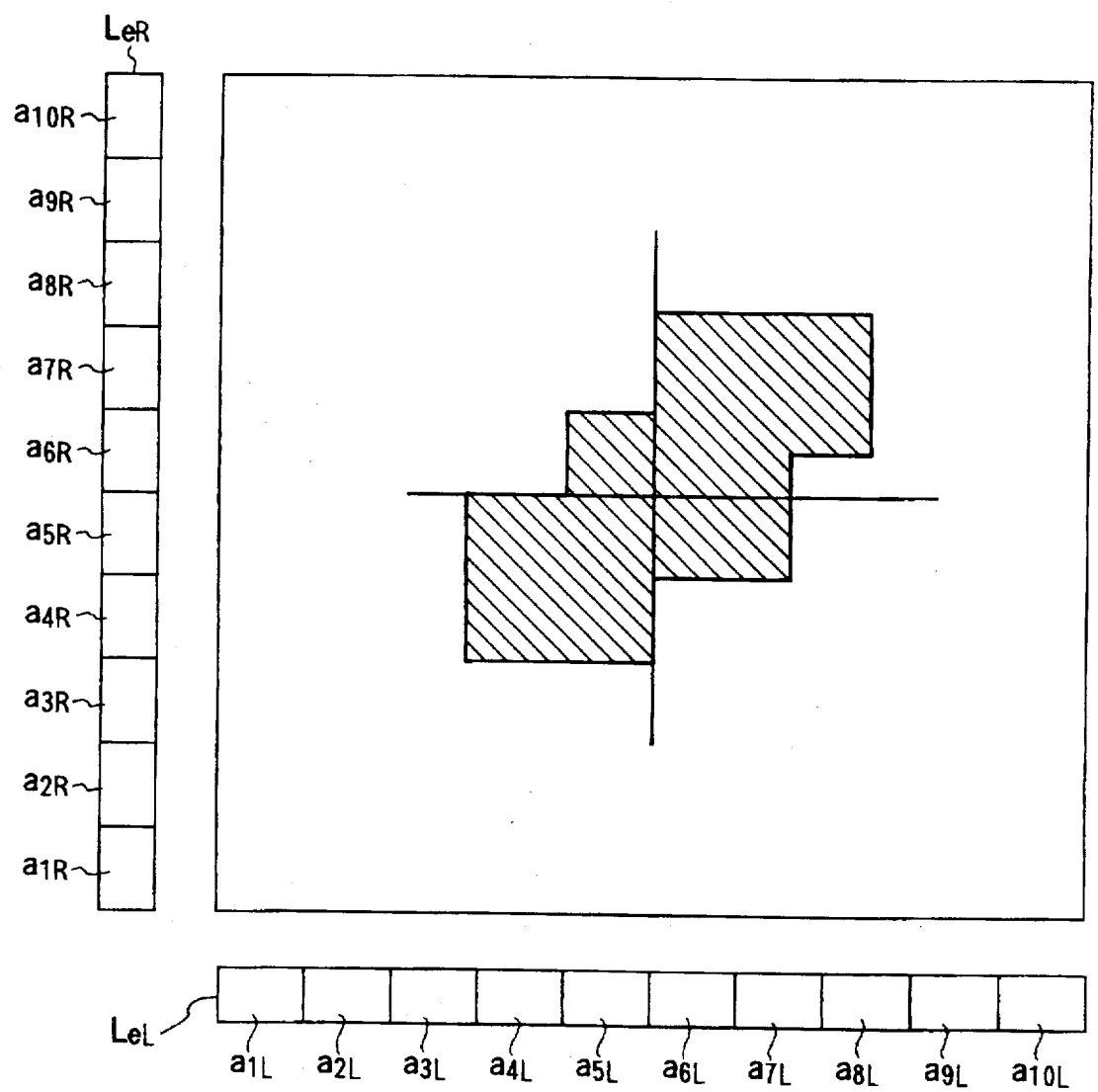
Figure 14B:
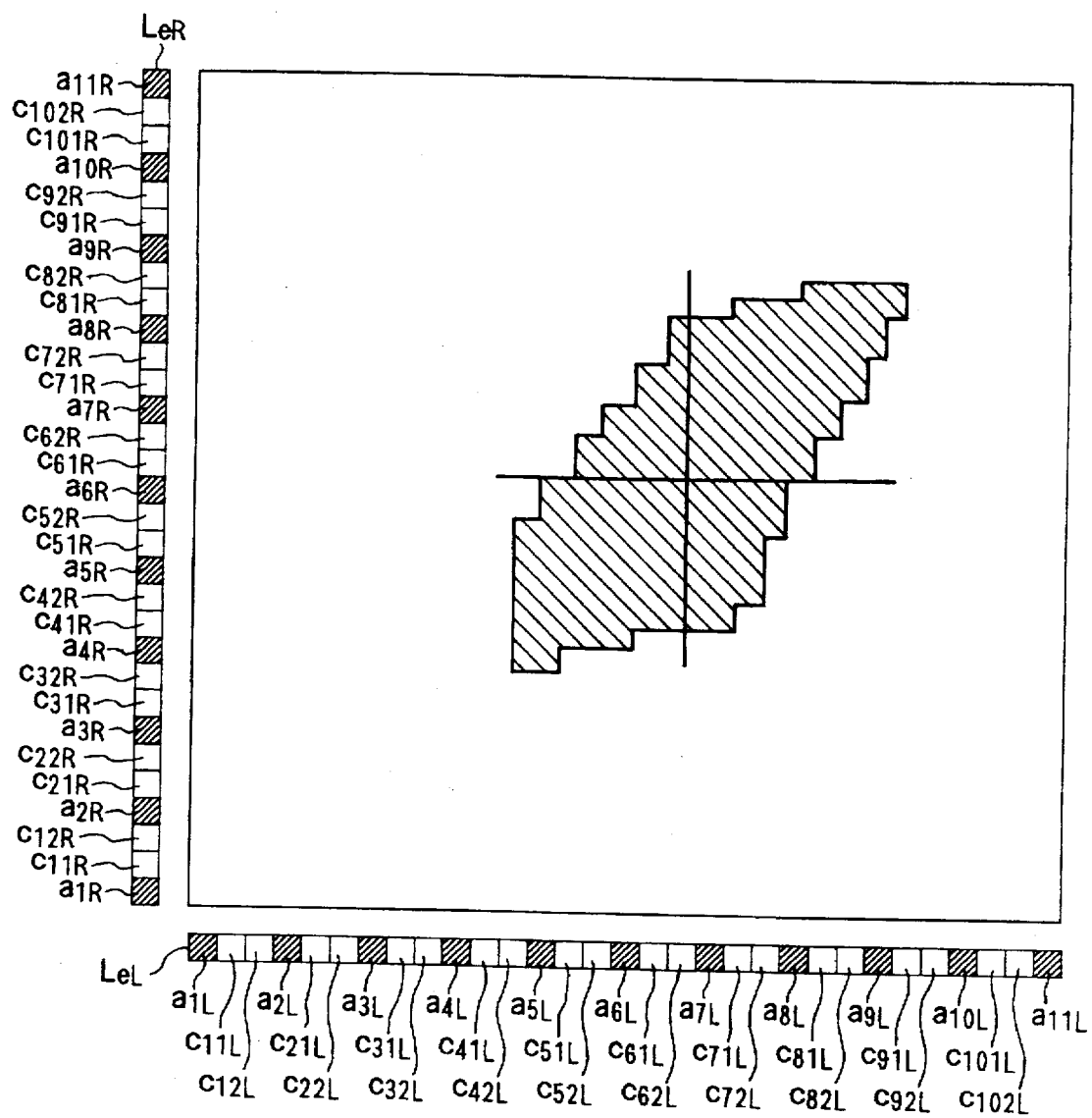

For example, regarding as the local process having excitatory combination, the range of excitatory combination was in units of picture element pitch for each epipolar line $L_{eL}$, $L_{eR}$ in the conventional example, as illustrated in FIG. 14A, whereas in this embodiment, the range of excitatory combination is in units of subpicture element pitch smaller than a unit of picture element for each epipolar line $L_{eL}$, $L_{eR}$ as illustrated in FIG. 14B. Accordingly, the precision of parallax line 51 finally obtained in this embodiment as illustrated in FIG. 15 is better than that of the parallax line 52 finally obtained in the conventional example as illustrated in FIG. 16.

While in this embodiment two virtual picture elements are inserted between two adjacent picture elements of each epipolar line $L_{eL}$, $L_{eR}$, it will be understood that the number of virtual picture elements to be inserted may be arbitrary, and may be different between left epipolar line $L_{eL}$ and right epipolar line $L_{eR}$.

Next, a second embodiment of the fourth corresponding point extraction method for a plurality of images according to the present invention will be described below.

This embodiment is different from the first embodiment of the fourth corresponding point extraction method for a plurality of images according to the invention as described above in that the processing speed of local calculation is improved in such a manner as to perform local calculation having excitatory combination and inhibitory combination based on actual picture element by increasing virtually the number of virtual picture elements on the parallax screen a predetermined number of times, after performing local calculation having excitatory combination and inhibitory combination based on actual picture element at each point of intersection on a parallax screen a predetermined number of times.

The operation of this embodiment will be described below.

Two binary images having a parallax such as a Julesz's random dot stereogram as previously described are picked up using a left camera and a right camera, and an arbitrary set of epipolar lines $L_{eL}$, $L_{eR}$ are extracted from two binary images picked up. Subsequently, using left and right epipolar lines $L_{eL}$, $L_{eR}$ as extracted, an initial screen having the initial values of parallax screen is created by defining the point of intersection of two picture elements as a black point only if the picture element value of a picture element of the left epipolar line $L_{eL}$ and the picture element value of a picture element of the right epipolar line $L_{eR}$ are both black, like the creation method of conventional initial screen as previously described. Subsequently, local calculation having excitatory combination and inhibitory combination based on actual picture element is performed for each black point of the initial screen created, in the same way as conventionally.

In the above way, a new parallax screen is created by performing a predetermined process using a threshold function of binary output like, for example, a threshold function 171 as illustrated in FIG. 68, for each point of intersection on the initial screen to which local calculation having excitatory combination and inhibitory combination based on actual picture element of binary image is performed.

Subsequently, a check is made to determine whether or not the creation operation of a new parallax screen is performed a predetermined number, and if not, the local calculation having excitatory combination and inhibitory combination based on actual picture element is repeated while regarding the new parallax screen created as the initial screen. On the other hand, if it is performed a predetermined number, two virtual picture elements are inserted between two adjacent picture elements of each epipolar line $L_{eL}$, $L_{eR}$, as illustrated in FIG. 13. It should be noted that the picture element value of each of virtual picture elements $c_{11L}$ to $c_{102L}$, $c_{11R}$ to $c_{102R}$ to be inserted therein is determined by a well-known spline interpolation or linear interpolation using the picture element values of adjacent picture elements of left and right epipolar lines $L_{eL}$ and $L_{eR}$, for example, the picture element values of two virtual picture elements $c_{11L}$, $c_{12L}$ are determined by the well-known spline interpolation or linear interpolation using the picture element value of a picture element $a_{1L}$ of left epipolar line $L_{eL}$ and the picture element value of a picture element $a_{2L}$.

Figure 17:
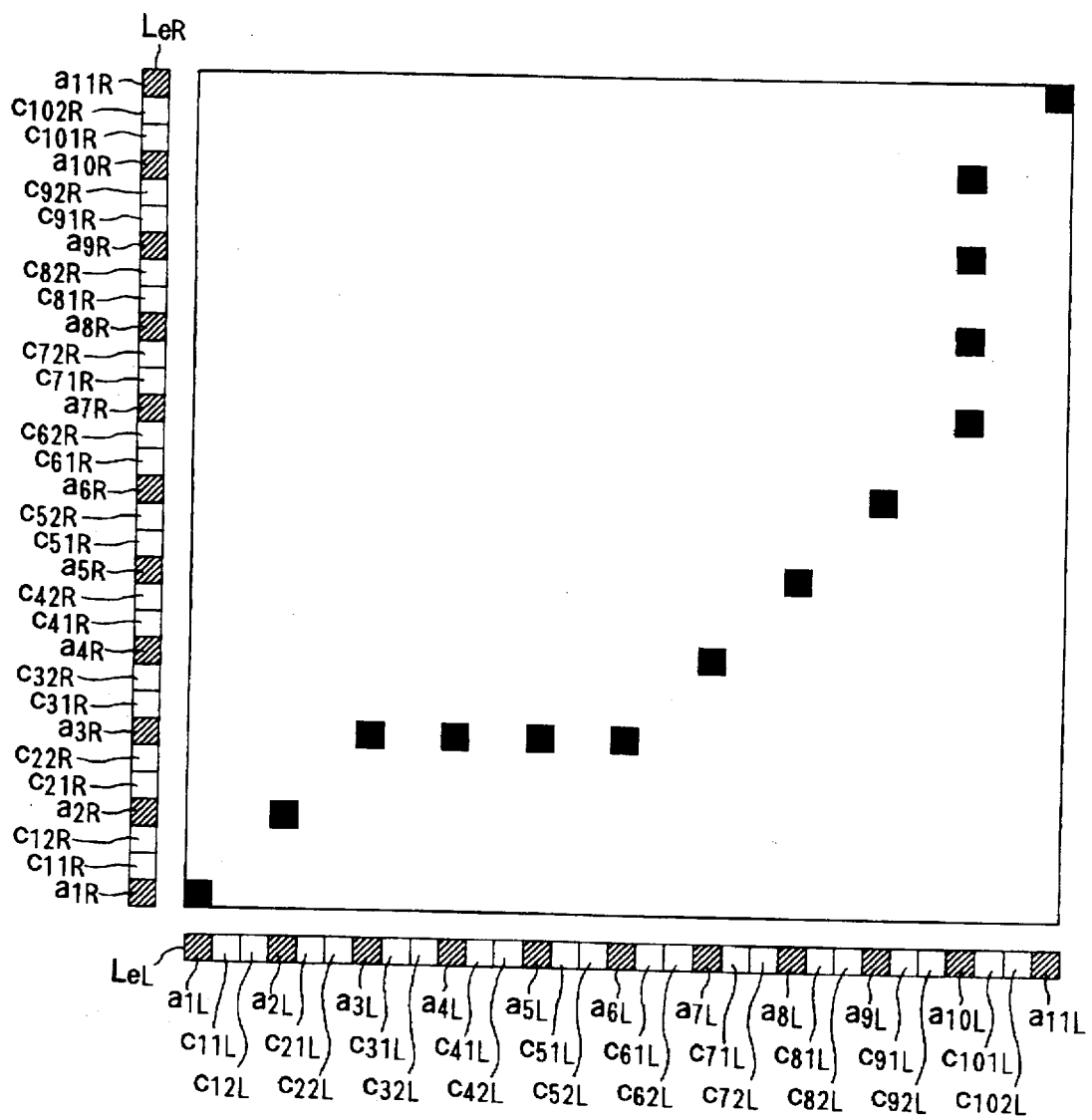
FIG. 17 is a view for explaining the re-created operation of an initial screen in a second embodiment of the fourth corresponding point extraction method for a plurality of images according to the present invention.

Subsequently, using left and right epipolar lines $L_{eL}$, $L_{eR}$ into which each virtual picture element is inserted, an initial screen is created again. Then, the point of intersection between a picture element (e.g., picture element $a_{1L}$) of left epipolar line $L_{eL}$ and a picture element (e.g., picture element $a_{1R}$) of right epipolar line $L_{eR}$ is defined as a black point only when it is a black point by local calculation having excitatory combination and inhibitory combination based on actual picture element repeated by the above-mentioned predetermined number as shown in FIG. 17. Also, the point of intersection between a virtual picture element of left epipolar line $L_{eL}$ (e.g., virtual picture element $c_{11L}$) and a virtual picture element of right epipolar line $L_{eR}$ (e.g., virtual picture element $c_{11R}$), the point of intersection between a picture element of left epipolar line $L_{eL}$ and a virtual picture element of right epipolar line $L_{eR}$ and the point of intersection between a virtual picture element of left epipolar line $L_{eL}$ and a picture element of right epipolar line $L_{eR}$ are all defined as a white point as illustrated in FIG. 17. Subsequently, for each black point of initial screen created again, local calculation having excitatory combination and inhibitory combination based on actual picture element is performed, as was conventionally performed.

In the above way, a new parallax screen is created by performing a predetermined process using a threshold function if binary output like, for example, a threshold function 171 as illustrated in FIG. 68, for each point of intersection on the initial screen to which local calculation having excitatory combination and inhibitory combination based on actual picture element of binary image is performed.

Subsequently, a check is made to determine whether or not the creation operation of a new parallax screen is performed a predetermined number, and if not, the local calculation having excitatory combination and inhibitory combination based on actual picture element is repeated while regarding the new parallax screen created as the initial screen. As a result, a parallax line appears on a new parallax screen finally created, and the extraction of corresponding point can be effected based on this parallax line.

In the above way, if a parallax line is extracted for a group of epipolar lines $L_{eL}$, $L_{eR}$, the same operation is repeated for the next group of epipolar lines. If the above operation is performed for all the groups of epipolar lines, distance image is created from each parallax line obtained above, considering the camera conditions.

In this embodiment, the precision of parallax line finally obtained is better than that of parallax line finally obtained in the conventional example.

While in this embodiment the point of intersection between a virtual picture element of left epipolar line $L_{eL}$ and a virtual picture element of right epipolar line $L_{eR}$, the point of intersection between a picture element of left epipolar line $L_{eL}$ and a virtual picture element of right epipolar line $L_{eR}$ and the point of intersection between a virtual picture element of left epipolar line $L_{eL}$ and a picture element of right epipolar line $L_{eR}$ are all defined as a white point, it will be understood that they may be defined as a black point only if the picture element values of two picture elements are both black, or all as a black point. Also, while this embodiment performs local calculation having excitatory combination and inhibitory combination based on actual picture element a predetermined number of times by increasing virtually the number of picture elements on the parallax screen, after performing local calculation having excitatory combination and inhibitory combination based on actual picture element a predetermined number, those two local calculations may be switched at every arbitrary times to obtain the same effect.

A third embodiment of the fourth corresponding point extraction method for a plurality of images according to the present invention will be described below.

Figure 18:
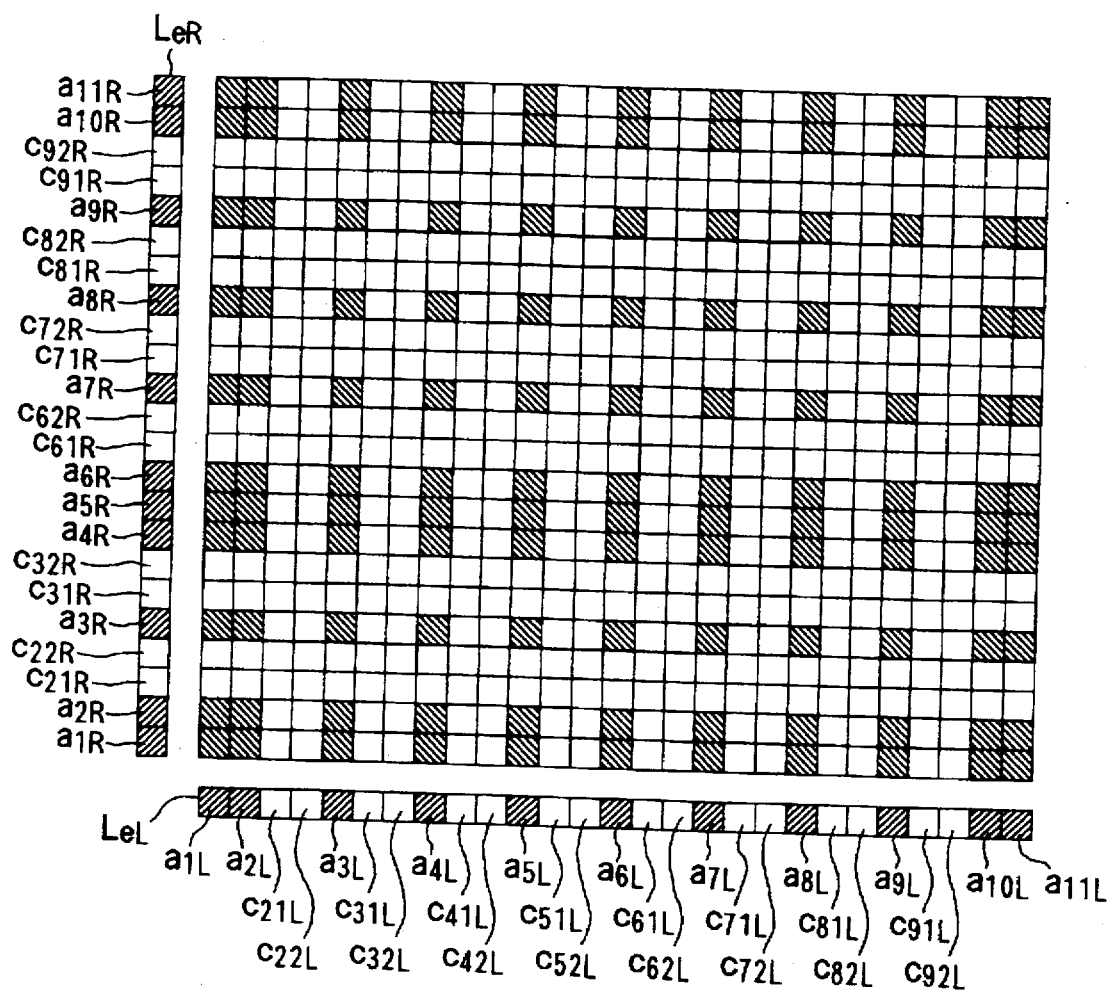
FIG. 18 is a view for explaining a third embodiment of the fourth corresponding point extraction method for a plurality of images according to the present invention.

This embodiment is different from the first and second embodiments for the fourth corresponding point extraction method for a plurality of images according to the invention, in which two virtual picture elements are inserted between adjacent two picture elements of each epipolar line $L_{eL}$, $L_{eR}$ as shown in FIG. 18, in that virtual picture elements are inserted by limiting adjacent two picture elements of each epipolar line $L_{eL}$, $L_{eR}$ to reduce the number of points of intersection for which local calculation having excitatory combination and inhibitory combination based on actual picture element is performed and further improved the processing speed.

E. Fifth corresponding point extraction method for a plurality of images according to the invention:

One embodiment of the fifth corresponding point extraction method for a plurality of images according to the present invention is to extract corresponding points for two binary images by performing local calculation having excitatory combination and inhibitory combination based on the actual picture element for said two binary images at each point of intersection on a parallax screen formed of two epipolar lines extracted respectively from said two binary images to obtain parallax lines, characterized by defining the value of each point of intersection on the parallax screen as an intermediate value.

Figure 19:
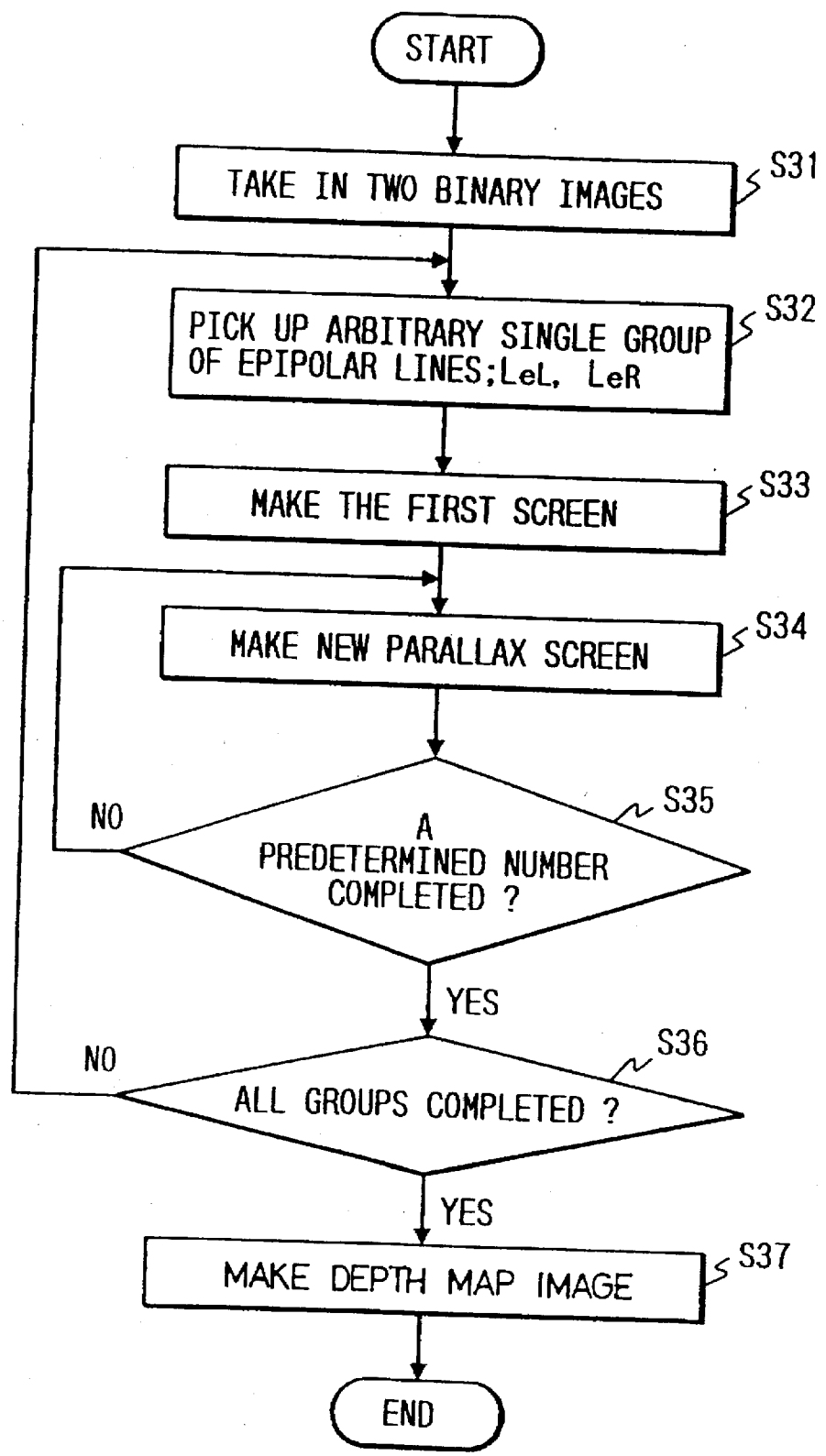
FIG. 19 is a flowchart for explaining the operation in one embodiment of the fifth corresponding point extraction method for a plurality of images according to the present invention.

The operation flow of this embodiment will be now described briefly with reference to a flowchart as shown in FIG. 19.

Two binary images having a parallax such as a Julesz's random dot stereogram as previously described are picked up using a left camera and a right camera (step S31), and an arbitrary set of epipolar lines $L_{eL}$, $L_{eR}$ are extracted from two binary images picked up (step S32). Subsequently, using two epipolar lines $L_{eL}$, $L_{eR}$ as extracted, an initial screen having the initial values of parallax screen is created (step S33). Then, the value of each point of intersection on the initial screen is defined as "1" (black point) only if corresponding picture elements of left and right epipolar lines $L_{eL}$, $L_{eR}$ are both black, or otherwise "0" (white point), as in the conventional example previously described.

Subsequently, a new parallax screen is created by performing local calculation having excitatory combination and inhibitory combination based on actual picture element for each black point in the created initial screen (step S34). Herein, in the previously-described conventional example, a new parallax screen was created by performing a predetermined treatment using a threshold function of binary output 171 as shown in FIG. 68 for each black point in the initial screen to which local calculation having excitatory combination and inhibitory combination based on actual picture element is performed. However, in this embodiment, no predetermined treatment using the threshold function of binary output 171 is done since the value of each point of intersection on the parallax screen is an intermediate value. That is, this embodiment transforms the algorithm in the conventional example as represented by the above expression (5) into an algorithm as represented by the following expression.

$$C_{x,y,d}^{t+1} = \sum_{x'y'd \in s(x,y,d)} C_{x'y'd}^{t} - \epsilon \sum_{x'y'd \in o(x,y,d)} C_{x'y'd}^{t} + C_{x,y,d}^{o} \quad (D1)$$

Subsequently, local calculation having excitatory combination and inhibitory combination based on actual picture element is repeated while regarding the new parallax screen as created being an initial screen (step S35), whereby since there are some points of intersection having intermediate values other than "1" and "0" on the parallax screen, local calculation having excitatory combination and inhibitory combination based on actual picture element is performed for each point of intersection having "1" and intermediate value or having a predetermined value or greater. Since the local process having excitatory combination and inhibitory combination based actual picture element is performed at higher precision as compared with the conventional example wherein each point of intersection on the parallax screen has a binary value, the parallax line can be more accurately obtained finally. Hereby there is an advantage that the parallax line can be also obtained for variable density image including color image by further developing this embodiment, as will be described later.

As described above, if parallax line is extracted for a set of epipolar lines $L_{eL}$, $L_{eR}$, the same process is repeatedly performed for the next set of epipolar lines (step S36). If this process is performed for all the sets of epipolar lines, distance image is created from each parallax line obtained, considering the camera conditions (step S37).

It should be noted that instead of making a check at step S35, the process of step S34 may be repeated, with the new parallax screen created in the process of step S34 as the initial screen, until the value of each point of intersection on the parallax screen is converged.

Figure 31:
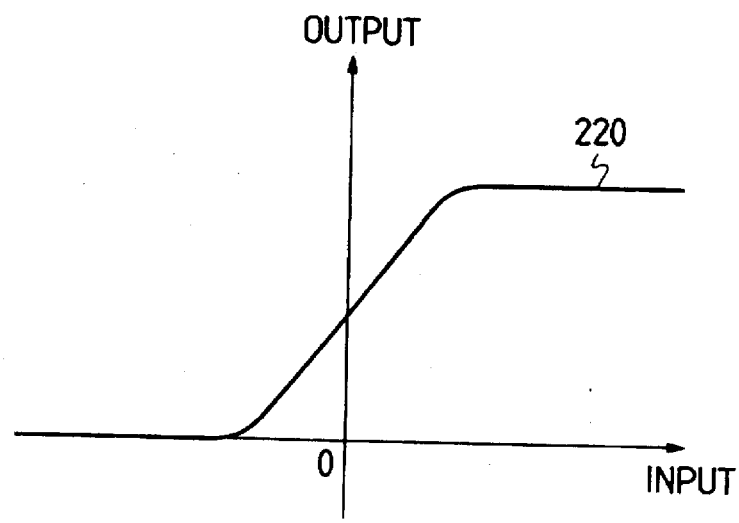
FIG. 31 is a graph illustrating a threshold function of multi-value output.

While in this embodiment a new parallax screen is created only by performing local calculation having excitatory combination and inhibitory combination based on actual picture element, it will be understood that a new parallax screen may be created by performing a predetermined processing using a threshold function of multi-value output 220 as shown in FIG. 31 for each point of intersection of the initial screen (parallax screen), after performing local calculation having excitatory combination and inhibitory combination based on actual picture element.

F. Sixth corresponding point extraction method for a plurality of images according to the invention:

A first embodiment of the sixth corresponding point extraction method for a plurality of images according to the present invention is to extract corresponding points for two binary images by performing local calculation having excitatory combination and inhibitory combination based on the actual picture element for said two binary images at each point of intersection on a parallax screen formed of two epipolar lines extracted respectively from said two binary images to obtain parallax lines, characterized by Limiting the range of parallax screen for performing local calculation having excitatory combination and inhibitory combination based on actual picture element to substantially one-half thereof.

The operation flow of this embodiment will be described below.

Figure 20:
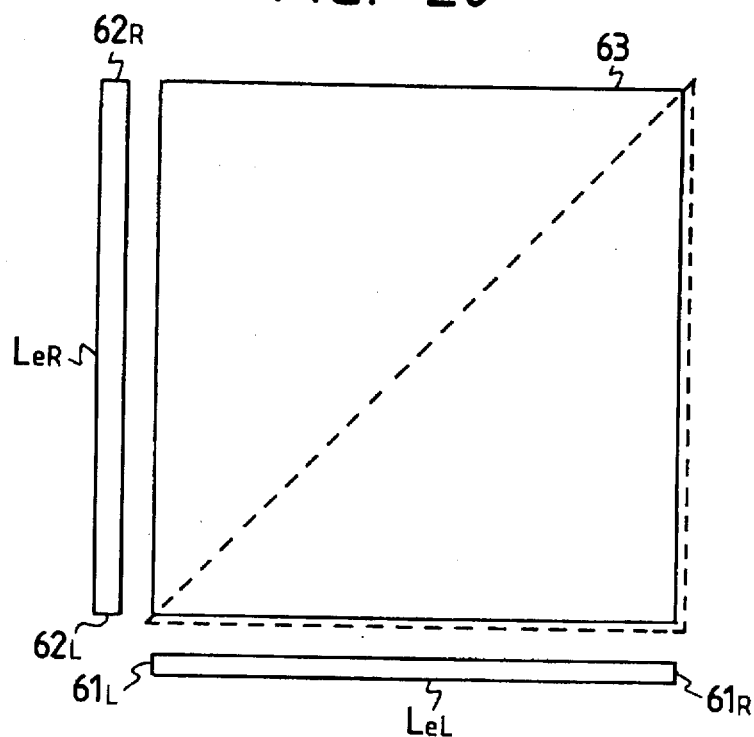
FIG. 20 is a view illustrating a range for performing local calculation having excitatory combination and inhibitory combination based on actual picture element in a first embodiment of the sixth corresponding point extraction method for a plurality of images according to the present invention.

Two binary images having a parallax such as a Julesz's random dot stereogram as previously described are picked up using a left camera and a right camera, and an arbitrary set of epipolar lines $L_{eL}$, $L_{eR}$ are extracted from two binary images picked up. Subsequently, a left epipolar line $L_{eL}$ as extracted is arranged in a transverse direction as illustrated in FIG. 20, with a left end $61_L$ placed on the left side as shown and a right end $61_R$ placed on the right side as shown. Also, a right epipolar line $L_{eR}$ as extracted is arranged in a longitudinal direction as illustrated in FIG. 20, with a left end $62_L$ placed on the bottom side as shown and a right end $62_R$ placed on the top side as shown. Subsequently, by defining as the black point all the points of intersection on the parallax screen 63 in which picture element indicating the picture element value "black" on the left epipolar line $L_{eL}$ and picture element indicating the picture element value "black" on the right epipolar line $L_{eR}$ are intersected on the parallax screen 63, an initial screen having the initial values of the parallax screen 63 is created.

Subsequently, local calculation having excitatory combination and inhibitory combination based on actual picture element is performed for each black point in the initial screen as created, wherein in this embodiment local calculation having excitatory combination and inhibitory combination based on actual picture element is performed only for the range surrounded by the broken line in FIG. 20. That is, when left and right epipolar lines $L_{eL}$, $L_{eR}$ as extracted are arranged as illustrated in FIG. 20, a parallax line finally obtained will appear in the range surrounded by the broken line on the parallax screen 63, as illustrated in FIGS. 59A to 62B, whereby the parallax line can be obtained finally even by performing local calculation having excitatory combination and inhibitory combination based on actual picture element within this range.

Subsequently, a new parallax screen is created by performing a predetermined processing using a threshold function of binary output 171 as shown in FIG. 68, for each black point in the initial screen to which local calculation having excitatory combination and inhibitory combination based on actual picture element is performed.

Subsequently, local calculation having excitatory combination and inhibitory combination based on actual picture element is repeated with the created new parallax screen being the initial screen, wherein local calculation having excitatory combination and inhibitory combination based on actual picture element is also performed only for the range surrounded by the broken line in FIG. 20.

As described above, if parallax line is extracted for a set of epipolar lines $L_{eL}$, $L_{eR}$, the same process is repeatedly performed for the next set of epipolar lines. If this process is performed for all the sets of epipolar lines, distance image is created from each parallax line obtained, considering the camera conditions.

As described above, in this embodiment, the range of parallax screen for performing local calculation having excitatory combination and inhibitory combination based on actual picture element is limited to substantially one-half thereof to obtain parallax lines finally, the processing time can be shortened as compared with the conventional example in which local calculation having excitatory combination and inhibitory combination based on actual picture element is performed over an entire range of parallax screen.

Figure 21:
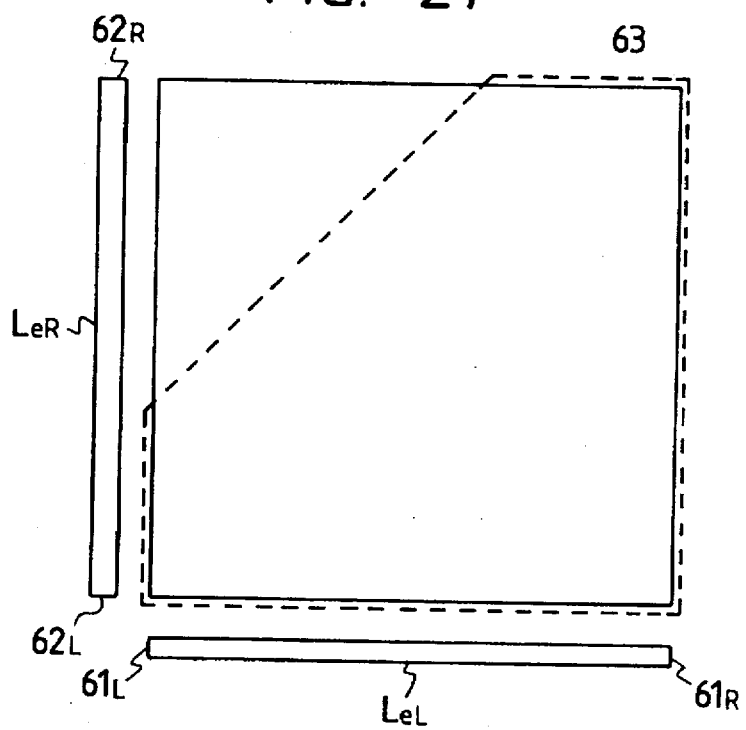
FIG. 21 is a view illustrating another embodiment as for a range for performing local calculation having excitatory combination and inhibitory combination based on actual picture element in the first embodiment of the sixth corresponding point extraction method for a plurality of images according to the present invention.

While in this embodiment the range of parallax screen for performing local calculation having excitatory combination and inhibitory combination based on actual picture element is limited to substantially one-half thereof, it will be understood that the range of parallax screen for performing local calculation having excitatory combination and inhibitory combination based on actual picture element may be shifted to the left upward side as shown in FIG. 21.

A second embodiment of the sixth corresponding point extraction method for a plurality of images according to the present invention will be described below.

This embodiment is to extract corresponding points for two binary images by performing local calculation having excitatory combination and inhibitory combination based on the actual picture element for said two binary images at each point of intersection on a parallax screen formed of two epipolar lines extracted respectively from said two binary images to obtain parallax lines, characterized by performing local calculation having excitatory combination and inhibitory combination based on actual picture element by limiting the range of parallax screen to one-half thereof, after performing local calculation having excitatory combination and inhibitory combination based on actual picture element a predetermined number of times.

The operation of this embodiment will be described below.

Figure 22:
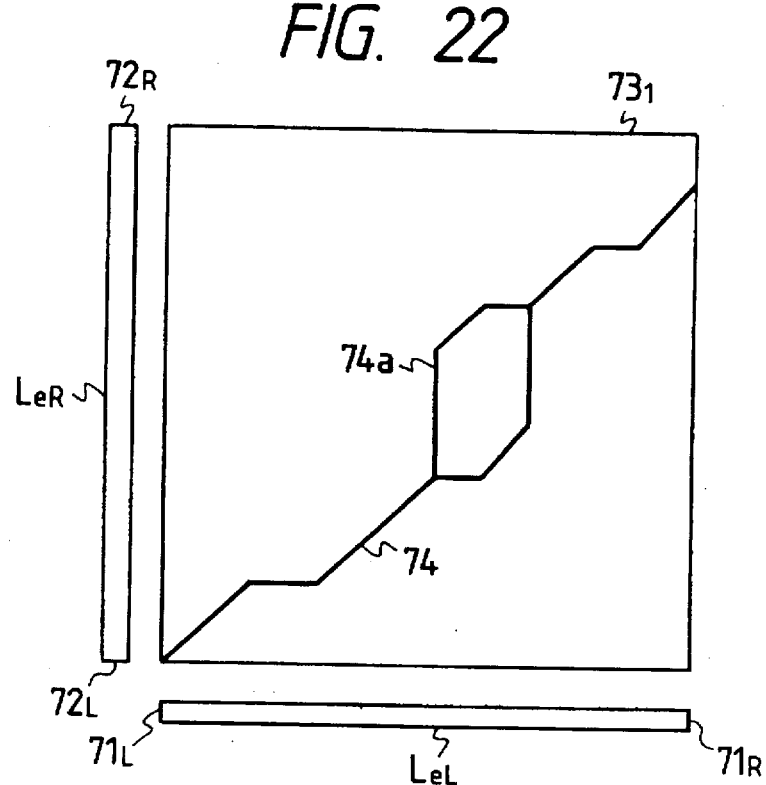
FIG. 22 is a view for explaining the operation in a second embodiment of the sixth corresponding point extraction method for a plurality of images according to the present invention.

Two binary images having a parallax such as a Julesz's random dot stereogram as previously described are picked up using a left camera and a right camera, and an arbitrary set of epipolar lines $L_{eL}$, $L_{eR}$ are extracted from two binary images picked up. Subsequently, a left epipolar line $L_{eL}$ as extracted is arranged in a transverse direction as illustrated in FIG. 22, with a left end $71_L$ placed on the left side as shown and a right end $71_R$ placed on the right side as shown. Also, a right epipolar line $L_{eR}$ as extracted is arranged in a longitudinal direction as illustrated in FIG. 20, with a left end $72_L$ placed on the bottom side as shown and a right end $72_R$ placed on the top side as shown. Subsequently, by defining as the black point all the points of intersection on the parallax screen in which picture element indicating the picture element value "black" on the left epipolar line $L_{eL}$ and picture element indicating the picture element value "black" on the right epipolar line $L_{eR}$ are intersected on the parallax screen, an initial screen having the initial values of the parallax screen is created.

Subsequently, local calculation having excitatory combination and inhibitory combination based on actual picture element is performed for each black point over the entire range of the initial screen as created. Subsequently, a new parallax screen is created by performing a predetermined processing using a threshold function of binary output 171 as shown in FIG. 68, for each black point in the initial screen to which local calculation having excitatory combination and inhibitory combination based on actual picture element is performed. Subsequently, local calculation having excitatory combination and inhibitory combination based on actual picture element is repeated while regarding the created new parallax screen as the initial screen to create a new parallax screen, wherein local calculation having excitatory combination and inhibitory combination based on actual picture element is also performed for each point of intersection over the entire range of the initial screen. A parallax line 74 appearing on the parallax screen $73_1$ thus created generally includes an error $74_a$ as illustrated in FIG. 22.

Figure 23:
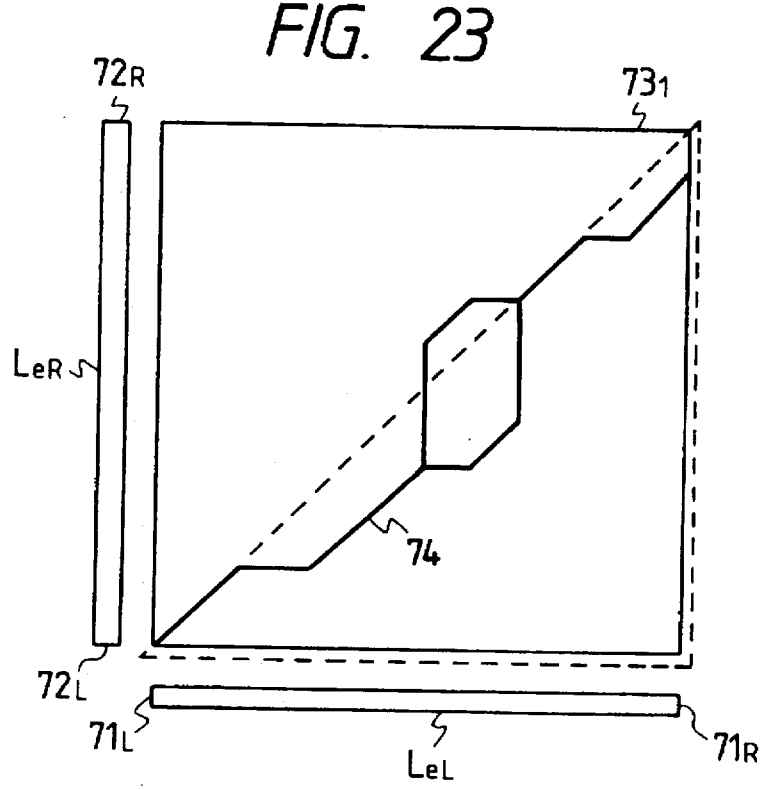
FIG. 23 is a view for explaining the operation in the second embodiment of the sixth corresponding point extraction method for a plurality of images according to the present invention.
Figure 24:
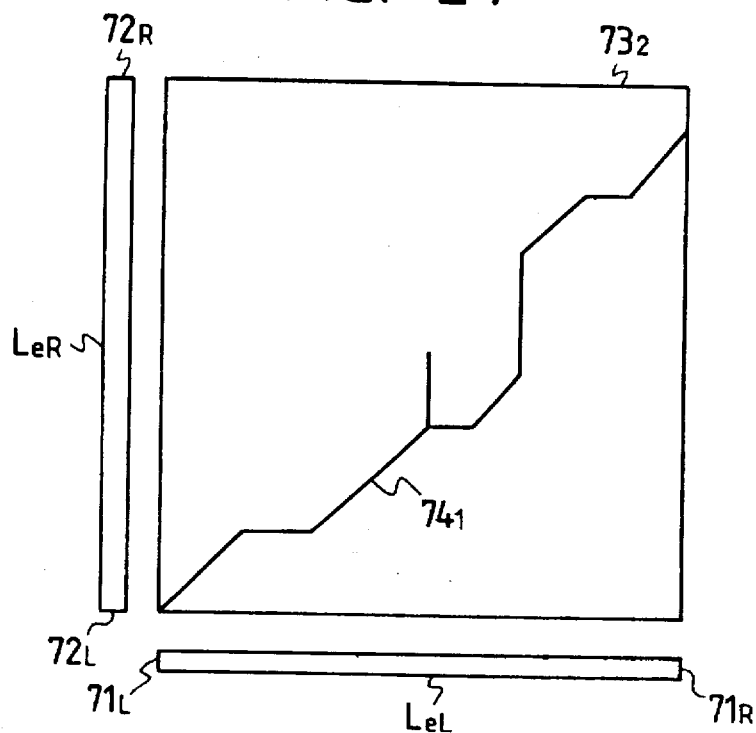
FIG. 24 is a view for explaining the operation in the second embodiment of the sixth corresponding point extraction method for a plurality of images according to the present invention.

Thus, in this embodiment, subsequently, local calculation having excitatory combination and inhibitory combination based on actual picture element is performed by limiting the range of created parallal screen $73_1$ to one-half (a region surrounded by the broken line in FIG. 23). Namely, in this embodiment, the initial screen involves a parallax screen $73_2$ as illustrated in FIG. 24 having a parallax line $74_1$ in which a portion other than the region surrounded by the broken line in FIG. 23 is deleted from among the parallax line 74 in which local calculation having excitatory combination and inhibitory combination based on actual picture element is performed for each black point over the entire range of parallax screen as previously described by a predetermined number of times, and a new parallax screen is created by performing local calculation having excitatory combination and inhibitory combination based on actual picture element only for the range surrounded by the broken line in FIG. 23.

Figure 25:
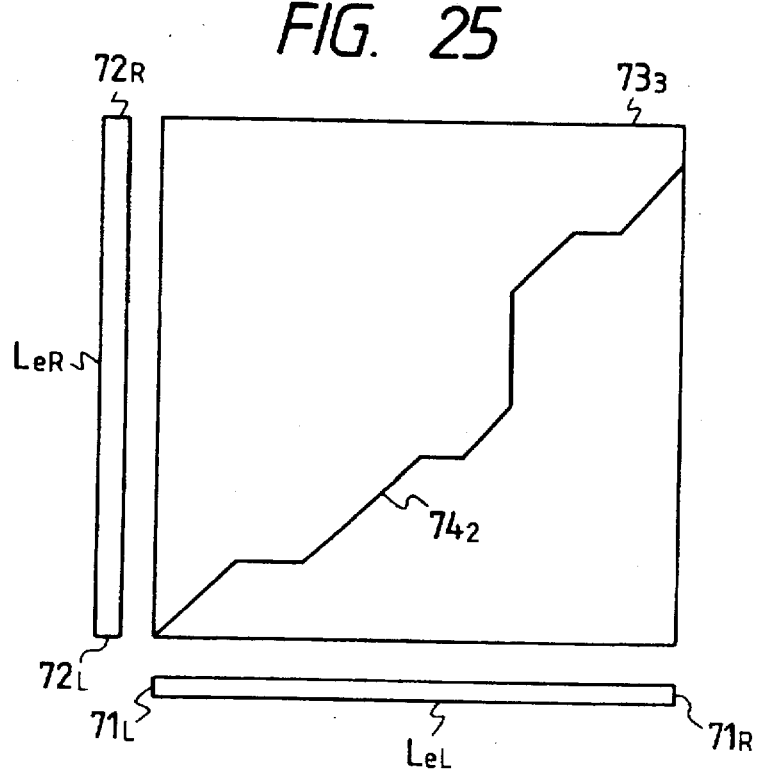
FIG. 25 is a view illustrating an instance of parallax line eventually obtained in the second embodiment of the sixth corresponding point extraction method for a plurality of images according to the present invention.

Subsequently, local calculation having excitatory combination and inhibitory combination based on actual picture element is repeated a predetermined number of times with the created new parallax screen being the initial screen, wherein local calculation having excitatory combination and inhibitory combination based on actual picture element is performed only for the range surrounded by the broken line in FIG. 23. As a result, a parallax line $74_2$ without any error can be obtained on the finally created parallax screen $73_3$, as illustrated in FIG. 25.

As described above, if parallax line $74_2$ is extracted for a set of epipolar lines $L_{eL}$, $L_{eR}$, the same process is repeatedly performed for the next set of epipolar lines. If this process is performed for all the sets of epipolar lines, distance image is created from each parallax line obtained, considering the camera conditions.

Accordingly, this embodiment allows the precision of parallax line obtained to be improved, and the processing time to be shortened.

Figure 26:
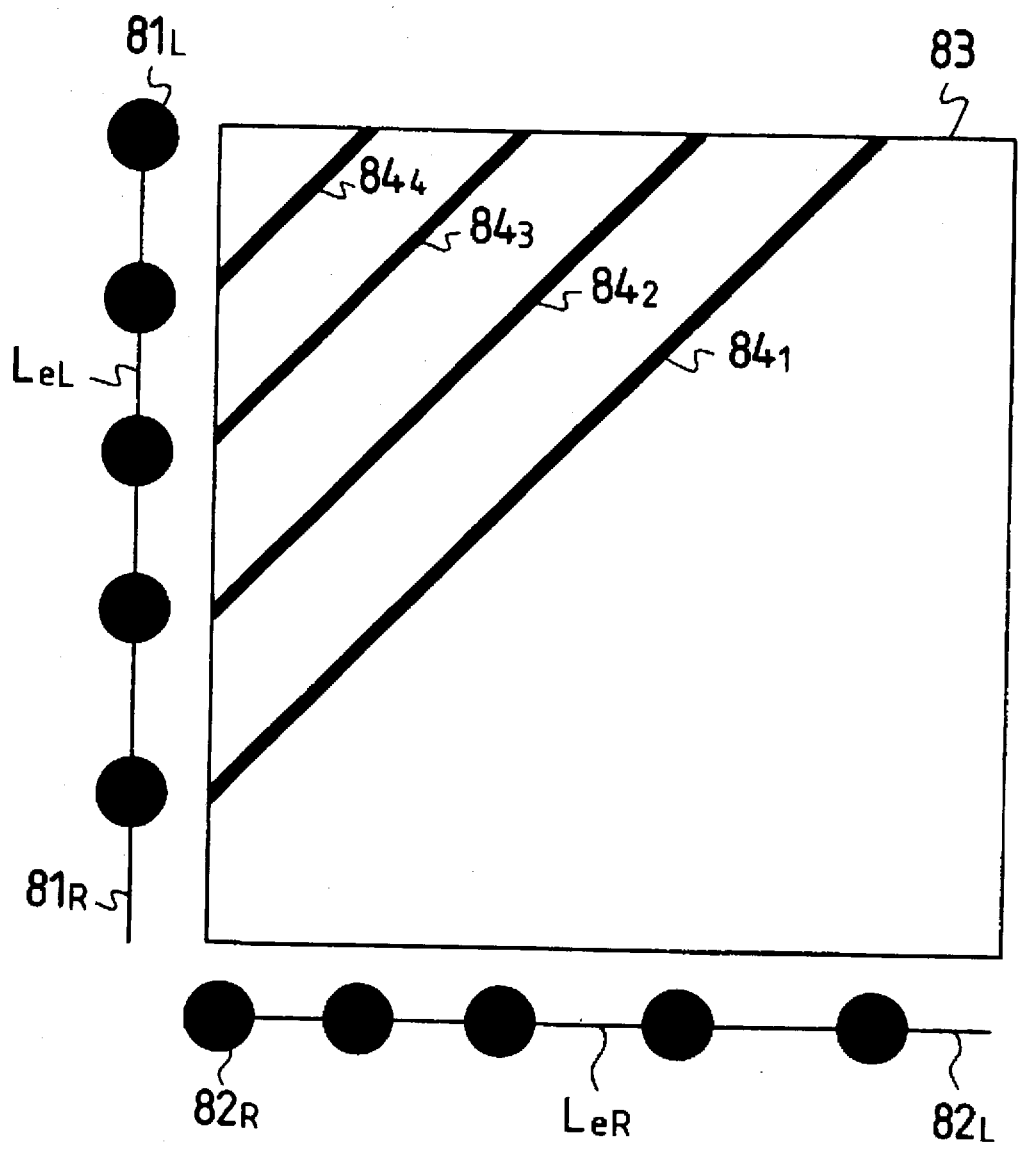
FIG. 26 is a view illustrating another arrangement of left and right epipolar lines.

While in this embodiment local calculation having excitatory combination and inhibitory combination based on actual picture element is performed a predetermined number of times by limiting the range of parallax screen to one-half thereof, the limited range of parallax screen may be a range as shown in FIG. 21, or the limited range of parallax screen may be changed depending on the number of times. Further, in creating the parallax screen, a left epipolar line $L_{eL}$ as extracted is arranged in a transverse direction as illustrated in FIG. 22, with a left end $71_L$ placed on the left side as shown and a right end $71_R$ placed on the right side as shown, and a right epipolar line $L_{eR}$ as extracted is arranged in a longitudinal direction as illustrated, with a left end $72_L$ placed on the bottom side as shown and a right end $72_R$ placed on the top side as shown, whereas it will be understood that as illustrated in FIG. 26, a left epipolar line $L_{eL}$ as extracted is arranged in a longitudinal direction as illustrated, with a left end $81_L$ placed on the upper side as shown and a right end $81_R$ placed on the bottom side as shown, and a right epipolar line $L_{eR}$ as extracted is arranged in a transverse direction as illustrated, with a left end $82_L$ placed on the right side as shown and a right end $82_R$ placed on the left side as shown. In this case, each of parallax lines $84_1$ to $84_4$ appears in a left upper half of parallax screen 83 as illustrated in FIG. 26, whereby the same effects can be obtained by limiting the range for performing local calculation having excitatory combination and inhibitory combination based on actual picture element of parallax screen.

G. Seventh corresponding point extraction method for a plurality of images according to the invention:

One embodiment of the seventh corresponding point extraction method for a plurality of images according to the present invention is to extract corresponding points for two binary images by performing local calculation having excitatory combination and inhibitory combination based on the actual picture element for said two binary images at each point of intersection on a parallax screen formed of two epipolar lines extracted respectively from said two binary images to obtain parallax lines, characterized by changing the range of excitatory combination depending on the number of picture elements by which black of each epipolar line succeeds in one direction.

The operation of this embodiment will be described below.

Figure 27:
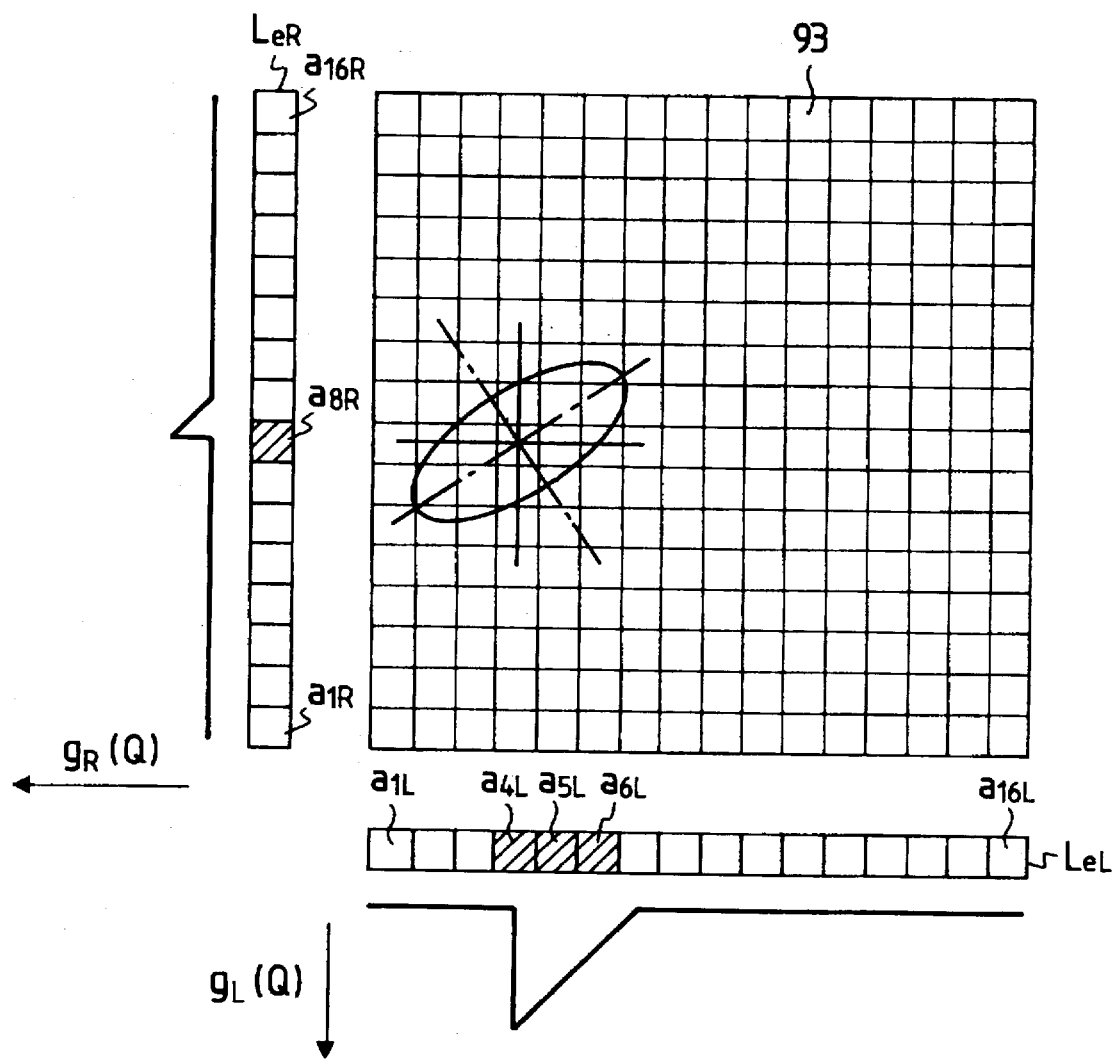
FIG. 27 is a view for explaining the operation in one embodiment of a seventh corresponding point extraction method for a plurality of images according to the present invention.

Two binary images having a parallax such as a Julesz's random dot stereogram as previously described are picked up using a left camera and a right camera, and an arbitrary set of epipolar lines $L_{eL}$, $L_{eR}$ are extracted from two binary images picked up. Subsequently, a left epipolar line $L_{eL}$ as extracted is arranged in a transverse direction, as illustrated in FIG. 27, with a picture element $a_{1L}$ placed on the left side as shown and a picture element $a_{16L}$ placed on the right side as shown. Also, a right epipolar line $L_{eR}$ as extracted is arranged in a longitudinal direction as illustrated, with a picture element $a_{1R}$ placed on the bottom side as shown and a picture element $a_{16R}$ placed on the top side as shown. Subsequently, by defining as the black point all the points of intersection on the parallax screen in which picture element indicating the picture element value "black" on the left epipolar line $L_{eL}$ and picture element indicating the picture element value "black" on the right epipolar line $L_{eR}$ are intersected on the parallax screen, an initial screen 93 having the initial values of the parallax screen is created.

Subsequently, local calculation having excitatory combination and inhibitory combination based on actual picture element is performed for each black point over the entire range in the initial screen 93 as created. Hereby, the range of excitatory combination based on actual picture element is determined in the following way.

Figure 28A:
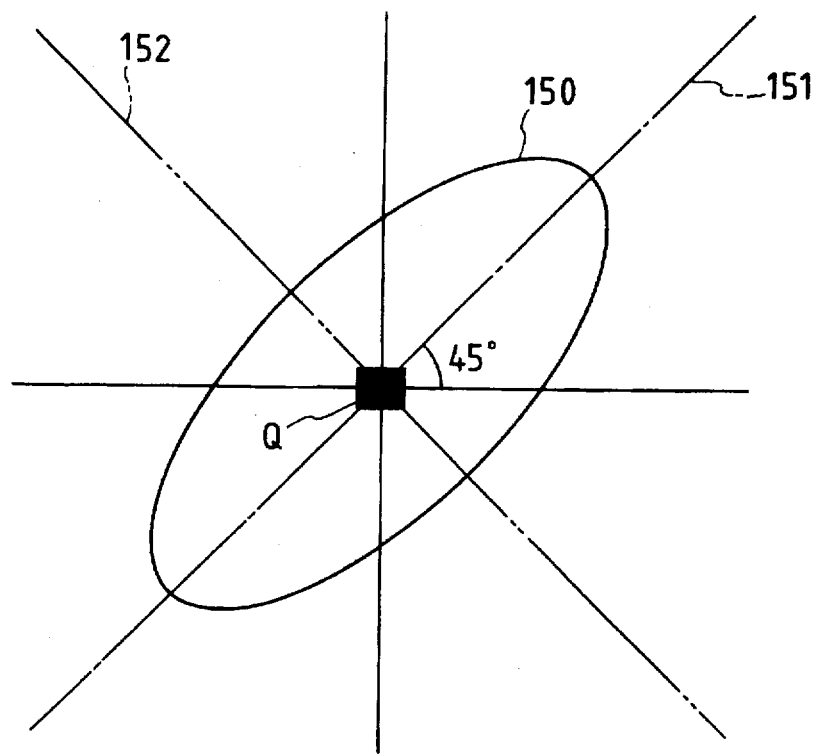
Figure 28B:
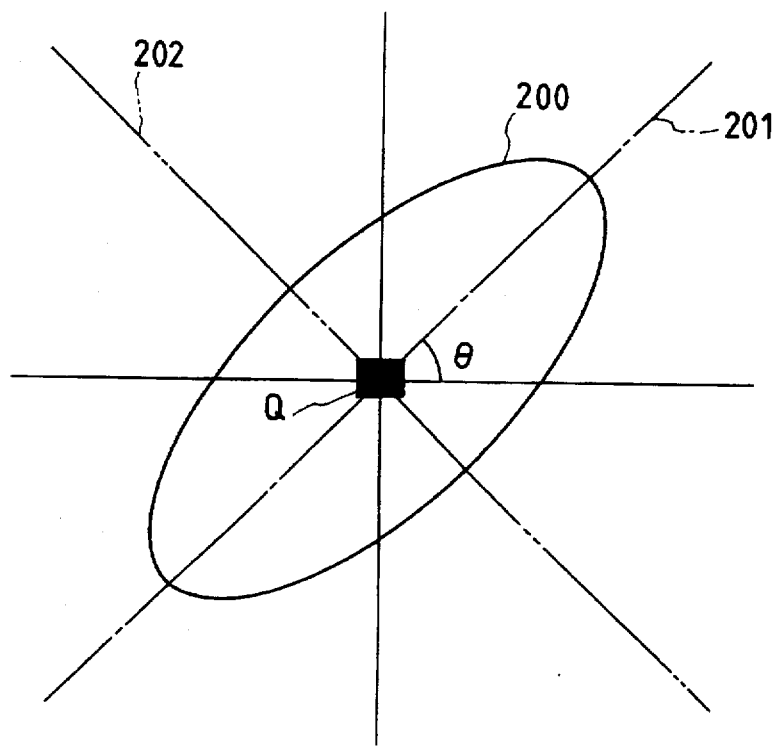

In a conventional cooperative algorithm, an ellipse 150 for determining the range of excitatory combination based on actual picture element was determined so that a major axis 151 thereof makes an angle of 45° with respect to the axis for determining the range of inhibitory combination in a transverse direction, as illustrated in FIG. 28A. On the contrary, in this embodiment, the angle θ made between a major axis 201 of an ellipse 200 for determining the range of excitatory combination based on actual picture element and an axis for determining the range of inhibitory combination in a transverse direction as shown is changed depending on the number of picture elements by which black of each epipolar line $L_{eL}$, $L_{eR}$ succeeds in one direction, as illustrated in FIG. 28B. That is, providing that the number of picture elements of black succeeding from black point Q, including picture elements of epipolar lines $L_{eL}$, $L_{eR}$, to be $g_L(Q)$ and $g_R(Q)$, respectively, the angle θ is defined as $$\theta = E_1 * \tan h\{(g_L(Q) - g_R(Q))/2\} + E_2 \qquad (G1)$$

Where $E_1$ and $E_2$ are arbitrary set angles.

For example, if picture elements $a_{4L}$ to $a_{6L}$ arranged from the fourth to the sixth location from the left end of the left epipolar line $L_{eL}$ are black, and picture element $a_{8R}$ arranged at the eighth location from the bottom end of the right epipolar line $L_{eR}$ is black, as illustrated in FIG. 27, the point of intersection on the parallax screen between the fourth picture element $a_{4L}$ from the left end of the left epipolar line $L_{eL}$ and the eighth picture element $a_{8R}$ from the bottom end of the right epipolar line $L_{eR}$, as illustrated in the same figure, is a black point. Hereby, since the number of picture elements is $g_L(Q)=3$, by which black picture element succeeds including picture element $a_{4L}$ for the left epipolar line $L_{eL}$, and the number of picture elements is $g_R(Q)=1$, by which black picture element succeeds including picture element $a_{8R}$ for the right epipolar line $L_{eR}$, the θ for this black point made between the major axis of ellipse for determining the range of excitatory combination based on actual picture element and the axis for determining the range of inhibitory combination is $$\theta = -10° * \tan h\{(3-1)/2\} + 45° \approx 37°$$

from the above expression (G1), where $E_1 = -10°$ and $E_2 = 45°$. Therefore, the excitatory combination based on actual picture element at this black point is performed within the ellipse having an angle of 37° made between the major axis and the axis for determining the range of inhibitory combination.

In the above way, a new parallax screen is created by performing a predetermined processing using a threshold function of binary output 171 as shown in FIG. 68, for each black point in the initial screen to which local calculation having excitatory combination and inhibitory combination based on actual picture element is performed.

Subsequently, a check is made to determine whether or not the creation of new parallax screen is performed a predetermined number, and if not, the same operation is repeated with the created new parallax screen being the initial screen. As a result, a parallax line appears on the new parallax screen finally created, and the extraction of corresponding point can be performed based on this parallax line.

Then a check is also made to determine whether or not any parallax line is obtained for all the groups of epipolar lines $L_{eL}$, $L_{eR}$ for two density images picked up, and the same operation is repeated unless the parallax line is obtained for all the groups.

If the above operation is performed for all the groups of epipolar lines, distance image is created, considering the camera conditions.

Since in this embodiment, the parallax line having a fixed distance to the object as well as the parallax line according to the angle θ determined by the above expression (G1) can be promoted to appear by changing the range of excitatory combination in accordance with the initial values on the parallax screen and the picture element values of each epipolar line $L_{eL}$, $L_{eR}$, this embodiment is effective not only for the smoothness of parallax line of the object placed at fixed distance, but also to the object placed at gradually changing distance, so that the parallax line of high precision can be obtained. Note that the expression for determining the angle θ may be other than the above expression (G1).

H. Eighth corresponding point extraction method for a plurality of images according to the invention:

One embodiment of the eighth corresponding point extraction method for a plurality of images according to the present invention is to extract corresponding points for two variable density images by performing local calculation having excitatory combination and inhibitory combination based on the actual picture element for said two variable density images at each point of intersection on a parallax screen formed of two epipolar lines extracted respectively from said two density images to obtain parallax lines, characterized by defining the picture element value of picture element for the epipolar line as a picture element value of actual picture element for the density image corresponding to the picture element of this epipolar line, and defining the value of each point of intersection on the parallax screen as an intermediate value.

The operation of this embodiment will be described below with reference to a flowchart as illustrated in FIG. 29.

Two variable density images are picked up using a left camera and a right camera (step S41), and an arbitrary set of epipolar lines $L_{eL}$, $L_{er}$ are extracted from two density images picked up (step S42). Hereby, the picture element values $P_{1L}$ to $P_{10L}$ of the picture elements $a_{1L}$ to $a_{10L}$ of the left epipolar line $L_{eL}$ are directly picture element values of the actual picture elements on the scanning line from which this epipolar line $L_{eL}$ is extracted in the variable density image picked up using the left camera. Also, the picture element values $P_{1R}$ to $P_{10R}$ of the picture elements $a_{1R}$ to $a_{10R}$ of the right epipolar line $L_{eR}$ are directly picture element values of the actual picture elements on the scanning line from which this epipolar line $L_{eR}$ is extracted in the variable density image picked up using the right camera.

Figure 30:
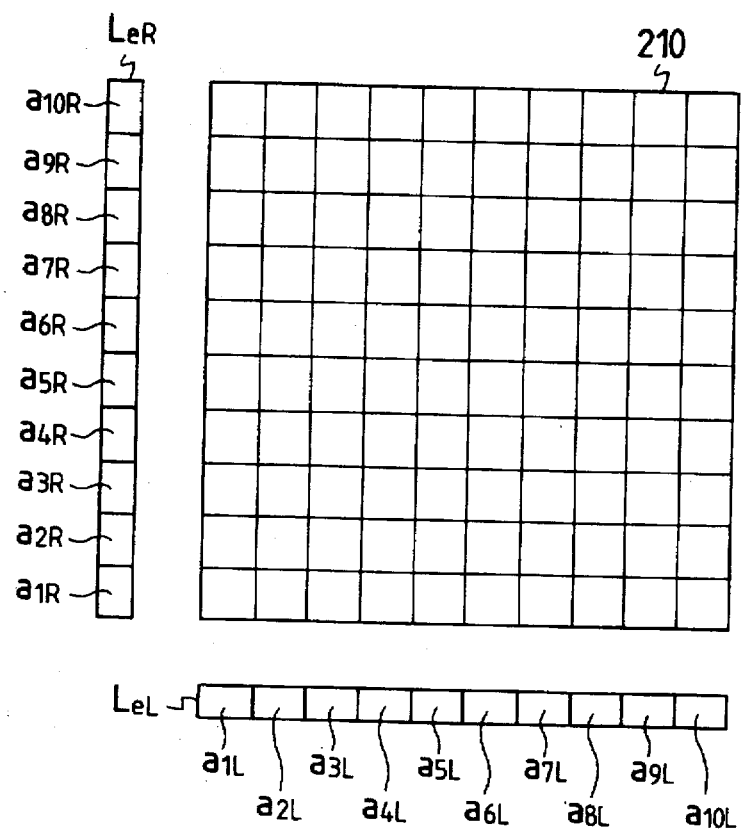
FIG. 30 is a view for explaining a manner of creating initial screen in one embodiment of the eighth corresponding point extraction method for a plurality of images according to the present invention.

Subsequently, as illustrated in FIG. 30, the left epipolar line $L_{eL}$ is arranged in a transverse direction as illustrated, with a picture element all placed on the left side as shown, and the right epipolar line $L_{eR}$ is arranged in a longitudinal direction as illustrated, with a picture element $a_{1R}$ placed on the bottom side as shown, whereby an initial screen 210 having the initial values of parallax screen is created by determining the value Zij of each point of intersection between the picture elements $a_{1L}$ to $a_{10L}$ of the left epipolar line $L_{eL}$ and the picture elements $a_{1R}$ to $a_{10R}$ of the right epipolar line $L_{eR}$ in accordance with the following expressin (step S43).

$$Zij=P_0-ABS(P_{iL}-P_{jR}) \tag{H1}$$

Where $P_0$ is a predetermined constant and ABS($P_{iL}-P_{jR}$) is an absolute value of $P_{iL}-P_{jR}$. Therefore, each point of intersection of the initial screen 210 (parallax screen) has an intermediate value.

Subsequently, local calculation having excitatory combination and inhibitory combination based on actual picture element is performed, as described in connection with FIG. 67, for each point of intersection of the initial screen 210 having a value other than "0". Thereafter, a new parallax screen is created by performing a predetermined processing using a threshold function of multi-value output 220, such as that illustrated in FIG. 31, for each point of intersection of the initial screen 210 (parallax screen) (step S44).

Subsequently, a check is made to determine whether or not the creation of new parallax screen is performed a predetermined number at step S44 as above mentioned, and if not, the same operation is repeated while regarding the created new parallax screen as the initial screen (step S45). As a result, a parallax line appears on the new parallax screen finally created, and the extraction of corresponding point can be performed based on this parallax line.

Then, a check is also made to determine whether or not parallax line is obtained for all the groups of epipolar lines $L_{eL}$, $L_{eR}$ for two variable density images picked up at step S41, and the same operation from step S42 to step S45 is repeated unless the parallax line is not obtained for all the groups (step S46).

If the parallax line is obtained for all the groups of epipolar lines, distance image is created from the parallax lines obtained, considering the camera conditions (step S47).

It should be noted that instead of performing a check at step S45, the process of step S44 is repeated while regarding the new parallax screen created at step S44 as the initial screen until the value of each point of intersection on the parallax screen is converged.

As described above, according to the present invention, cooperative algorithm, which was conventionally applied only to binary image, can be also applied to variable density image.

While this embodiment performs a predetermined processing using a threshold function of multi-value 220 for each point of intersection on the initial screen 210 (parallax screen), after performing local calculation having excitatory combination and inhibitory combination based on actual picture element, a new parallax screen may be created only by performing local calculation having excitatory combination and inhibitory combination based on actual picture element.

Also, while in this embodiment, the picture element value of picture element of the epipolar line is a picture element value of actual picture element for the variable density image corresponding to the picture element of this epipolar line, it will be understood that the picture element value may be a gradient value determined by the picture element value of an actual picture element for the density image corresponding to picture element of this epipolar line and the picture element value of an actual picture element proximate to this actual picture element. That is, for example, by using a picture element value $P_{iL}$ of actual picture element corresponding to picture element $a_{iL}$ for the left epipolar line $L_{eL}$ and a picture element value $P_{(i-1)L}$ of actual picture element immediately before this actual picture element on the scanning line from which this epipolar line $L_{eL}$ is extracted in the density image picked up using the left camera, the picture element value $P_{iL}$ of picture element $a_{iL}$ for the left epipolar line $L_{eL}$ is obtained by $$P_{iL}=(p_{iL}-p_{(i-1)L})/2 \tag{H2}$$

and the picture element value $P_{iR}$ of picture element $a_{iR}$ of the right epipolar line $L_{eR}$ is obtained in the same manner.

I. Ninth corresponding point extraction method for a plurality of images according to the invention.

The ninth corresponding point extraction method for a plurality of images according to the present invention is a combination of the first corresponding point extraction method for a plurality of images according to the invention and the eighth corresponding point extraction method for a plurality of images according to the invention as previously described.

Namely, one embodiment of the ninth corresponding point extraction method for a plurality of images according to the present invention is to extract corresponding points for two variable density images by performing local calculation having excitatory combination and inhibitory combination based on the actual picture element for said two density images at each point of intersection on a parallax screen formed of two epipolar lines extracted respectively from said two variable density images to obtain parallax lines, characterized by providing a virtual picture element indicating the continuity of actual picture elements between adjacent actual picture elements of each variable density image, defining the picture element value of picture element for the epipolar line as an intermediate value, defining the value of each point of intersection on the parallax screen as an intermediate value, and performing local calculation having excitatory combination and inhibitory combination based on virtual picture element in parallel with the local calculation having excitatory combination and inhibitory combination based on actual picture element.

The operation of this embodiment will be described below.

Two variable density images are picked up using a left camera and a right camera, and an arbitrary set of epipolar lines $L_{eL}$, $L_{eR}$ are extracted from two variable density images picked up. Subsequently, in order to provide a virtual picture element having a picture element value indicating the continuity of actual picture elements at a portion between adjacent actual picture elements for two density images picked up, a picture element having the picture element value of the virtual picture element is inserted between adjacent picture elements on two extracted epipolar lines $L_{eL}$, $L_{eR}$. That is like the binary image as illustrated in FIG. 2, a virtual picture element in a horizontal direction is set between actual picture elements adjacent in the horizontal direction of each density image picked up. Hereby, the picture element value of each virtual picture element to be set therein is a picture element value indicating the continuity of adjacent actual picture elements in the horizontal direction. That is, if the difference between two picture element values of adjacent actual picture elements is smaller than a predetermined value, the picture element value of virtual picture element to be set between those two actual picture elements is defined as "0", while if the difference between two picture element values of adjacent actual picture elements is greater than a predetermined value, the picture element value of virtual picture element to be set between those two actual picture elements is defined as "1". Note that in practice, the insertion operation of virtual picture element can be accomplished by inserting a picture element having the picture element value of a virtual element value between adjacent picture elements on two epipolar lines $L_{eL}$, $L_{eR}$ extracted from two binary images picked up, as in one embodiment of the first corresponding point extraction method for a plurality of images according to the present invention as previously described.

Herein, the picture element value of picture element for the left epipolar line $L_{eL}$ corresponding to the actual picture element of density image picked up using the left camera directly uses a picture element value of this actual picture element, and the picture element value of picture element for the right epipolar line $L_{eR}$ corresponding to the actual picture element of density image picked up using the right camera directly uses a picture element value of this actual picture element.

Subsequently, using the left and right epipolar lines $L_{eL}$, $L_{eR}$ into which each picture element having the picture element value of each virtual picture element is inserted, an initial screen having the initial values of parallax screen is created as in one embodiment of the first corresponding point extraction method for a plurality of images according to the present invention as previously described. However, the value of the point of intersection between the picture element of left epipolar line $L_{eL}$ corresponding to the actual picture element of variable density image picked up using the left camera and the picture element of right epipolar line $L_{eR}$ corresponding to the actual picture element of variable density image picked up using the right camera uses a value obtained from the above expression (H1).

Subsequently, for each point of intersection on the initial screen as created, local calculation having excitatory combination and inhibitory combination based on actual picture element as described in connection with FIG. 67 or local calculation having excitatory combination and inhibitory combination based on virtual picture element is performed, as in the first corresponding point extraction method for a plurality of images according to the present invention as previously described. Herein, it is to be noted that excitatory combination based on virtual picture element is competitive with the excitatory combination based on actual picture element, and inhibitory combination based on virtual picture element is competitive with the inhibitory combination based on actual picture element, as was described in one embodiment of the first corresponding point extraction method for a plurality of images according to the present invention as previously described.

In the above way, a new parallax screen is created by performing a predetermined processing using a threshold function of multi-value output 220, as illustrated in FIG. 31, for each point of intersection on the initial screen to which local calculation having excitatory combination and inhibitory combination based on actual picture element and local calculation having excitatory combination and inhibitory combination based on virtual picture element are performed in parallel.

Subsequently, a check is performed to determine whether or not the creation of new parallax screen is repeated by a predetermined number of times. If it is not performed by the predetermined number of times, the same process is repeated with the new parallax screen created being the initial screen. As a result, a parallax line appears on the new parallax screen finally created, whereby the extraction of corresponding point can be made based on this parallax line.

Subsequently, a check is made to determine whether or not parallax line is obtained for all the groups of epipolar lines $L_{eL}$, $L_{eR}$ for two density images picked up, and if the parallax line is not obtained for all the groups, the same operation is repeatedly performed.

If this process is performed for all the groups of epipolar lines, distance image is created from each parallax line obtained, considering the camera conditions.

J. Tenth corresponding point extraction method for a plurality of images according to the invention:

The tenth corresponding point extraction method for a plurality of images according to the present invention is a combination of the second corresponding point extraction method for a plurality of images according to the invention and the eighth corresponding point extraction method for a plurality of images according to the invention, as previously described. Namely, one embodiment of the tenth corresponding point extraction method for a plurality of images according to the present invention is to extract corresponding points for two variable density images by performing local calculation having excitatory combination and inhibitory combination based on the actual picture element for said two variable density images at each point of intersection on a parallax screen formed of two epipolar lines extracted respectively from said two variable density images to obtain parallax lines, characterized by providing a virtual picture element indicating the continuity of actual picture elements at a portion between adjacent actual picture elements of each density image, defining the picture element value of picture element for the epipolar line as an intermediate value, defining the value of each point of intersection on the parallax screen as an intermediate value, and limiting the respective ranges of excitatory combination and inhibitory combination based on actual picture element, when the picture element value of virtual picture element indicates the discontinuity of adjacent actual picture elements.

The operation of this embodiment will be described below.

Two variable density images are picked up using a left camera and a right camera, and an arbitrary set of epipolar lines $L_{eL}$, $L_{eR}$ are extracted from two variable density images picked up. Subsequently, in order to provide a virtual picture element having a picture element value indicating the continuity of actual picture elements between adjacent actual picture elements for two density images picked up, a picture element having the picture element value of the virtual picture element is inserted between adjacent picture elements on two extracted epipolar lines $L_{eL}$, $L_{eR}$. That is, like the binary image as illustrated in FIG. 2, a virtual picture element in a horizontal direction is set between actual picture elements adjacent in the horizontal direction of each variable density image picked up. Hereby, the picture element value of each virtual picture element to be set therein is a picture element value indicating the continuity of adjacent actual picture elements in the horizontal direction. That is, if the difference between two picture element values of adjacent actual picture elements is smaller than a predetermined value, the picture element value of virtual picture element to be set between those two actual picture elements is defined as "0", while if the difference between two picture element values of adjacent actual picture elements is greater than a predetermined value, the picture element value of virtual picture element to be set between those two actual picture elements is defined as "1". Note that in practice, the insertion operation of virtual picture element can be accomplished by inserting a picture element having the picture element value of a virtual element value between adjacent picture elements on two epipolar lines $L_{eL}$, $L_{eR}$ extracted from two binary images picked up, as in one embodiment of the first corresponding point extraction method for a plurality of images according to the present invention as previously described.

Herein, the picture element value of picture element for the left epipolar line $L_{eL}$ corresponding to the actual picture element of variable density image picked up using the left camera directly uses a picture element value of this actual picture element, and the picture element value of picture element for the right epipolar line $L_{eR}$ corresponding to the actual picture element of variable density image picked up using the right camera directly uses a picture element value of this actual picture element.

Subsequently, using the left and right epipolar lines $L_{eL}$, $L_{eR}$ into which each picture element having the picture element value of each virtual picture element is inserted, an initial screen having the initial values of parallax screen is created as in one embodiment of the first corresponding point extraction method for a plurality of images according to the present invention as previously described. However, the value of the point of intersection between the picture element of left epipolar line $L_{eL}$ corresponding to the actual picture element of variable density image picked up using the left camera and the picture element of right epipolar line $L_{eR}$ corresponding to the actual picture element of density image picked up using the right camera uses a value obtained from the above expression (H1).

Subsequently, for each point of intersection on the initial screen as created, local calculation having excitatory combination and inhibitory combination based on actual picture element is performed, as in one embodiment of the second corresponding point extraction method for a plurality of images according to the present invention previously described. Herein, it is to be noted to limit the respective ranges of excitatory combination and inhibitory combination based on actual picture element, when the picture element value of virtual picture element indicates the discontinuity of adjacent actual picture elements.

In the above way, a new parallax screen is created by performing a predetermined processing using a threshold function of multi-value output 220, as illustrated in FIG. 31, for each point of intersection on the initial screen to which local calculation having excitatory combination and inhibitory combination based on actual picture element is performed.

Subsequently, a check is performed to determine whether or not the creation of new parallax screen is repeated by a predetermined number of times. If it is not performed by the predetermined number of times, the same process is repeated with the new parallax screen created being the initial screen. As a result, a parallax line appears on the new parallax screen finally created, whereby the extraction of corresponding point can be made based on this parallax line.

Subsequently, a check is made to determine whether or not parallax line is obtained for all the groups of epipolar lines $L_{eL}$, $L_{eR}$ for two variable density images picked up, and if the parallax line is not obtained for all the groups, the same operation is repeatedly performed.

If this process is performed for all the groups of epipolar lines in the above way, distance image is created from each parallax line obtained, considering the camera conditions.

K. Eleventh corresponding point extraction method for a plurality of images according to the invention:

The eleventh corresponding point extraction method for a plurality of images according to the present invention is a combination of the third corresponding point extraction method for a plurality of images according to the invention and the eighth corresponding point extraction method for a plurality of images according to the invention as previously described. Namely, one embodiment of the eleventh corresponding point extraction method for a plurality of images according to the present invention is to extract corresponding points for two variable density images by performing local calculation having excitatory combination and inhibitory combination based on the actual picture element for said two variable density images at each point of intersection on a parallax screen formed of two epipolar lines extracted respectively from said two variable density images to obtain parallax lines, characterized by defining the picture element value of picture element for the epipolar line as an intermediate value, defining the value of each point of intersection on the parallax screen as an intermediate value, and changing the strengths of excitatory combination and inhibitory combination within the ranges of excitatory combination and inhibitory combination, respectively.

The operation of this embodiment will be described below.

Two variable density images are picked up using a left camera and a right camera, and an arbitrary set of epipolar lines $L_{eL}$, $L_{eR}$ are extracted from two variable density images picked up. Subsequently, using the left and right epipolar lines $L_{eL}$, $L_{eR}$ as extracted, an initial screen having the initial values of parallax screen is created as in one embodiment of the first corresponding point extraction method for a plurality of images according to the present invention as previously described. However, the value of the point of intersection between the picture element of left epipolar line $L_{eL}$ corresponding to the actual picture element of variable density image picked up using the left camera and the picture element of right epipolar line $L_{eR}$ corresponding to the actual picture element of variable density image picked up using the right camera uses a value obtained from the above expression (H1).

Subsequently, for each point of intersection on the initial screen as created, local calculation having excitatory combination and inhibitory combination based on actual picture element is performed, as in one embodiment of the third corresponding point extraction method for a plurality of images according to the present invention previously described. Herein, it is to be noted that the strength $M_e$ of excitatory combination will change in accordance with a Gaussian profile within the range of excitatory combination as illustrated in FIG. 12A, and the strength $M_i$ of inhibitory combination will change to be smaller in approaching closer to each point of intersection within the range of inhibitory combination, as illustrated in FIGS. 12B and 12C.

In the above way, a new parallax screen is created by performing a predetermined processing using a threshold function of multi-value output 220, as illustrated in FIG. 31, for each point of intersection on the initial screen to which local calculation having excitatory combination and inhibitory combination based on actual picture element is performed.

Subsequently, a check is performed to determine whether or not the creation of new parallax screen is repeated by a predetermined number of times. If it is not performed by the predetermined number of times, the same process is repeated with the new parallax screen created being the initial screen. As a result, a parallax line appears on the new parallax screen finally created, whereby the extraction of corresponding point can be made based on this parallax line.

Subsequently, a check is made to determine whether or not parallax line is obtained for all the groups of epipolar lines $L_{eL}$, $L_{eR}$ for two variable density images picked up, and if the parallax line is not obtained for all the groups, the same operation is repeatedly performed.

If this process is performed for all the groups of epipolar lines in the above way, distance image is created from each parallax line obtained, considering the camera conditions.

L. Twelfth corresponding point extraction method for a plurality of images according to the invention:

The twelfth corresponding point extraction method for a plurality of images according to the present invention is a combination of the fourth corresponding point extraction method for a plurality of images according to the invention and the eighth corresponding point extraction method for a plurality of images according to the invention as previously described. Namely, the first embodiment of the twelfth corresponding point extraction method for a plurality of images according to the present invention is to extract corresponding points for two variable density images by performing local calculation having excitatory combination and inhibitory combination based on the actual picture element for said two variable density images at each point of intersection on a parallax screen formed of two epipolar lines extracted respectively from said two variable density images to obtain parallax lines, characterized by defining the picture element value of picture element for the epipolar line as an intermediate value, defining the value of each point of intersection on the parallax screen as an intermediate value, and performing local calculation having excitatory combination and inhibitory combination based on actual picture element by increasing virtually the number of points of intersection on the parallax screen.

The operation of this embodiment will be described below.

Two variable density images are picked up using a left camera and a right camera, and an arbitrary set of epipolar lines $L_{eL}$, $L_{eR}$ are extracted from two variable density images picked up. Subsequently, using the left and right epipolar lines $L_{eL}$, $L_{eR}$ as extracted, an initial screen having the initial values of parallax screen is created as in the first embodiment of the fourth corresponding point extraction method for a plurality of images according to the present invention as previously described. However, the value of the point of intersection between the picture element of left epipolar line $L_{eL}$ corresponding to the actual picture element of variable density image picked up using the left camera and the picture element of right epipolar line $L_{eR}$ corresponding to the actual picture element of variable density image picked up using the right camera uses a value obtained from the above expression (H1).

Subsequently, for each point of intersection on the initial screen as created, local calculation having excitatory combination and inhibitory combination based on actual picture element is performed, as in the first embodiment of the fourth corresponding point extraction method for a plurality of images according to the present invention previously described.

In the above way, a new parallax screen is created by performing a predetermined processing using a threshold function of multi-value output 220, as illustrated in FIG. 31, for each point of intersection on the initial screen to which local calculation having excitatory combination and inhibitory combination based on actual picture element is performed.

Subsequently, a check is performed to determine whether or not the creation of new parallax screen is repeated by a predetermined number of times. If it is not performed by the predetermined number of times, the same process is repeated with the new parallax screen created being the initial screen. As a result, a parallax line appears on the new parallax screen finally created, whereby the extraction of corresponding point can be made based on this parallax line.

Subsequently, a check is made to determine whether or not parallax line is obtained for all the groups of epipolar lines $L_{eL}$, $L_{eR}$ for two variable density images picked up, and if the parallax line is not obtained for all the groups, the same operation is repeatedly performed.

If this process is performed for all the groups of epipolar lines in the above way, distance image is created from each parallax line obtained, considering the camera conditions.

The second embodiment of the twelfth corresponding point extraction method for a plurality of images according to the present invention will be described below.

This embodiment is different from the first embodiment of the twelfth corresponding point extraction method for a plurality of images according to the present invention in that the processing speed of local calculation is improved in such a manner as to perform local calculation having excitatory combination and inhibitory combination based on actual picture element a predetermined number by increasing virtually the number of picture elements on the parallax screen, after performing local calculation having excitatory combination and inhibitory combination based on actual picture element a predetermined number.

The operation of this embodiment is apparent from the second embodiment of the fourth corresponding point extraction method for a plurality of images according to the present invention and the first embodiment of the twelfth corresponding point extraction method for a plurality of images according to the present invention, and will be no longer described.

While this embodiment performs local calculation having excitatory combination and inhibitory combination based on actual picture element a predetermined number by increasing virtually the number of picture elements on the parallax screen, after performing local calculation having excitatory combination and inhibitory combination based on actual picture element a predetermined number, these two local calculations may be switched at every arbitrary number of times to the same effects.

The third embodiment of the twelfth corresponding point extraction method for a plurality of images according to the present invention will be described below.

This embodiment is different from the first and second embodiments of the twelfth corresponding point extraction method for a plurality of images according to the present invention, in which two virtual picture elements are inserted between two adjacent picture elements of each epipolar line $L_{eL}$, $L_{eR}$, in that the processing speed of local calculation is further improved in such a manner as to reduce the number of points of intersection at which local calculation having excitatory combination and inhibitory combination based on actual picture element is performed by limiting two adjacent picture elements of each epipolar line $L_{eL}$, $L_{eR}$ and inserting a virtual picture element thereinto, as illustrated in FIG. 18.

M. Thirteenth corresponding point extraction method for a plurality of images according to the invention:

The thirteenth corresponding point extraction method for a plurality of images according to the present invention is a combination of the sixth corresponding point extraction method for a plurality of images according to the invention and the eighth corresponding point extraction method for a plurality of images according to the invention, as previously described. Namely, the first embodiment of the thirteenth corresponding point extraction method for a plurality of images according to the present invention is to extract corresponding points for two variable density images by performing local calculation having excitatory combination and inhibitory combination based on the actual picture element for said two variable density images at each point of intersection on a parallax screen formed of two epipolar lines extracted respectively from said two variable density images to obtain parallax lines, characterized by defining the picture element value of picture element for the epipolar line as an intermediate value, defining the value of each point of intersection on the parallax screen as an intermediate value, and limiting the range of parallax screen to perform local calculation having excitatory combination and inhibitory combination based on actual picture element.

The operation of this embodiment will be described below.

Two variable density images are picked up using a left camera and a right camera, and an arbitrary set of epipolar lines $L_{eL}$, $L_{eR}$ are extracted from two variable density images picked up. Subsequently, using the left and right epipolar lines $L_{eL}$, $L_{eR}$ as extracted, an initial screen having the initial values of parallax screen is created as in the first embodiment of the sixth corresponding point extraction method for a plurality of images according to the present invention as previously described. However, the value of the point of intersection between the picture element of left epipolar line $L_{eL}$ corresponding to the actual picture element of variable density image picked up using the left camera and the picture element of right epipolar line $L_{eR}$ corresponding to the actual picture element of density image picked up using the right camera uses a value obtained from the above expression (H1).

Subsequently, for each point of intersection on the initial screen as created, local calculation having excitatory combination and inhibitory combination based on actual picture element is performed by limiting the range of parallax screen, as in the first embodiment of the sixth corresponding point extraction method for a plurality of images according to the present invention previously described.

In the above way, a new parallax screen is created by performing a predetermined processing using a threshold function of multi-value output 220, as illustrated in FIG. 31, for each point of intersection on the initial screen to which local calculation having excitatory combination and inhibitory combination based on actual picture element is performed.

Subsequently, a check is performed to determine whether or not the creation of new parallax screen is repeated by a predetermined number of times. If it is not performed by the predetermined number of times, the same process is repeated while regarding the new parallax screen created as the initial screen. As a result, a parallax line appears on the new parallax screen finally created, whereby the extraction of corresponding point can be made based on this parallax line.

Subsequently, a check is made to determine whether or not parallax line is obtained for all the groups of epipolar lines $L_{eL}$, $L_{eR}$ for two density images picked up, and if the parallax line is not obtained for all the groups, the same operation is repeatedly performed.

If this process is performed for all the groups of epipolar lines in the above way, distance image is created from each parallax line obtained, considering the camera conditions.

The second embodiment of the thirteenth corresponding point extraction method for a plurality of images according to the present invention will be described below.

This embodiment is different from the first embodiment of the thirteenth corresponding point extraction method for a plurality of images according to the present invention in that local calculation having excitatory combination and inhibitory combination based on actual picture element is limited a predetermined number by limiting the range of parallax screen. Note that the operation of this embodiment is apparent from the second embodiment of the sixth corresponding point extraction method for a plurality of images according to the present invention and the first embodiment of the thirteenth corresponding point extraction method for a plurality of images according to the present invention, and will be no longer described.

The third embodiment of the thirteenth corresponding point extraction method for a plurality of images according to the present invention will be described below.

This embodiment is different from the first and second embodiments of the thirteenth corresponding point extraction method according to the present invention as described above, in that local calculation having excitatory combination and inhibitory combination based on actual picture element is performed a predetermined number by limiting the range of parallax screen, after performing local calculation having excitatory combination and inhibitory combination based on actual picture element over the entire range of parallax screen. Note that the operation of this embodiment is apparent from the third embodiment of the sixth corresponding point extraction method for a plurality of images according to the present invention and the first and second embodiments of the thirteenth corresponding point extraction method for a plurality of images according to the present invention, and will be no longer described.

N. Fourteenth corresponding point extraction method for a plurality of images according to the invention:

The fourteenth corresponding point extraction method for a plurality of images according to the present invention is a combination of the seventh corresponding point extraction method for a plurality of images according to the invention and the eighth corresponding point extraction method for a plurality of images according to the invention, as previously described. Namely, one embodiment of the fourteenth corresponding point extraction method for a plurality of images according to the present invention is to extract corresponding points for two density images by performing local calculation having excitatory combination and inhibitory combination based on the actual picture element for said two variable density images at each point of intersection on a parallax screen formed of two epipolar lines extracted respectively from said two variable density images to obtain parallax lines, characterized by defining the picture element value of picture element for the epipolar line as an intermediate value, defining the value of each point of intersection on the parallax screen as an intermediate value, and changing the range of excitatory combination in accordance with the initial values on the parallax screen and the picture element value of each epipolar line.

The operation of this embodiment will be described below.

Figure 32:
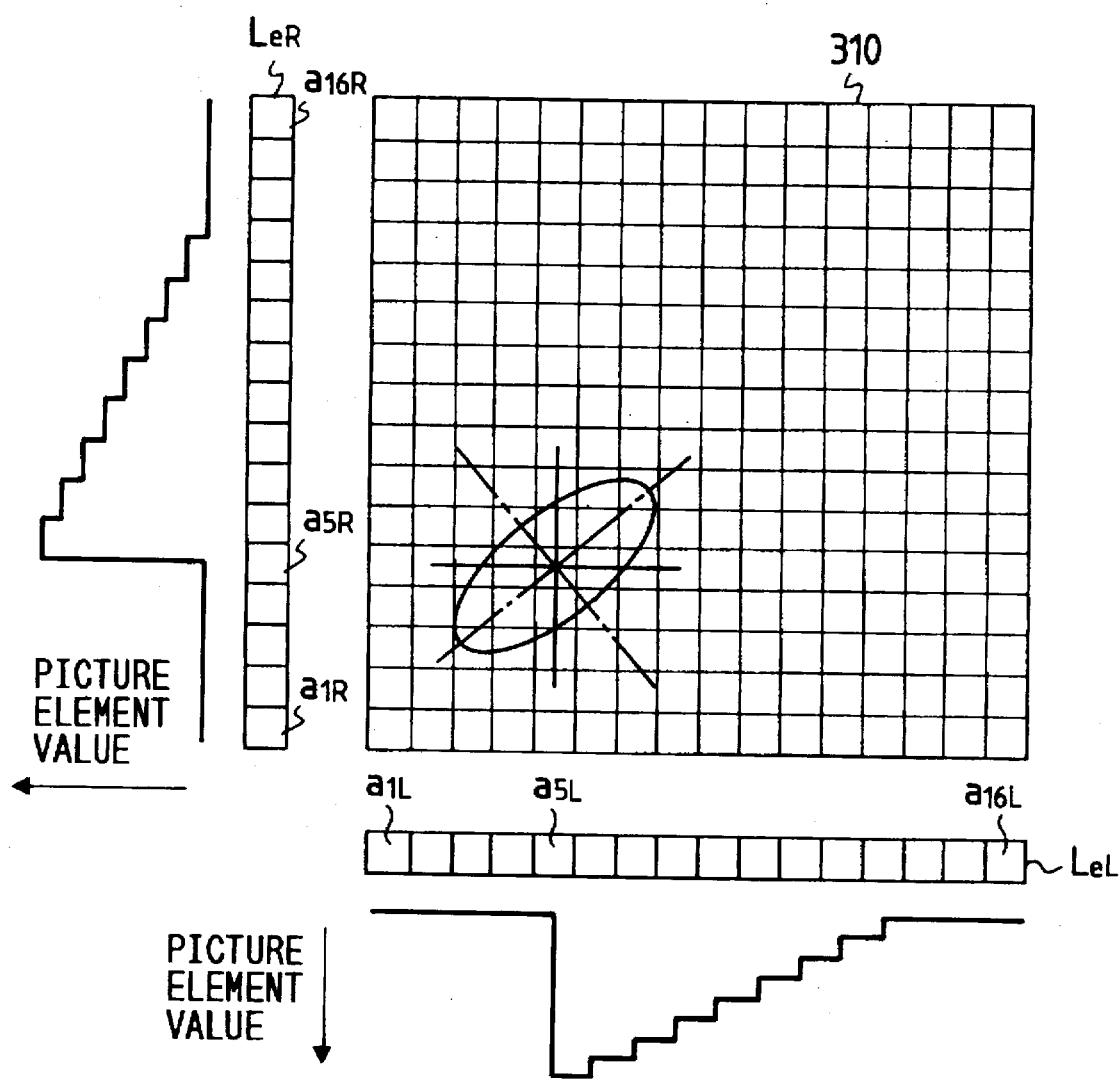
FIG. 32 is a view for explaining the operation in one embodiment of a fourteenth corresponding point extraction method for a plurality of images according to the present invention.

Two variable density images are picked up using a left camera and a right camera, and an arbitrary set of epipolar lines $L_{eL}$, $L_{eR}$ are extracted from two variable density images picked up. Subsequently, a left epipolar line $L_{eL}$ as extracted is arranged in a transverse direction, as illustrated in FIG. 32, with a picture element $a_{1L}$ placed on the left side as shown and a picture element $a_{16L}$ placed on the right side as shown. Also, a right epipolar line $L_{eR}$ as extracted is arranged in a longitudinal direction as illustrated, with a picture element $a_{1R}$ placed on the bottom side as shown and a picture element $a_{16R}$ placed on the top side as shown. Subsequently, an initial screen having the initial values of parallax screen is created as in one embodiment of the first corresponding point extraction method for a plurality of images according to the present invention as previously described. However, the value of the point of intersection between the picture element of left epipolar line $L_{eL}$ corresponding to the actual picture element of variable density image picked up using the left camera and the picture element of right epipolar line $L_{eR}$ corresponding to the actual picture element of variable density image picked up using the right camera uses a value obtained from the above expression (H1).

Subsequently, for each point of intersection on the initial screen as created, local calculation having excitatory combination and inhibitory combination based on actual picture element is performed, wherein the range of excitatory combination based on actual picture element is determined in the following manner.

Figure 33A:
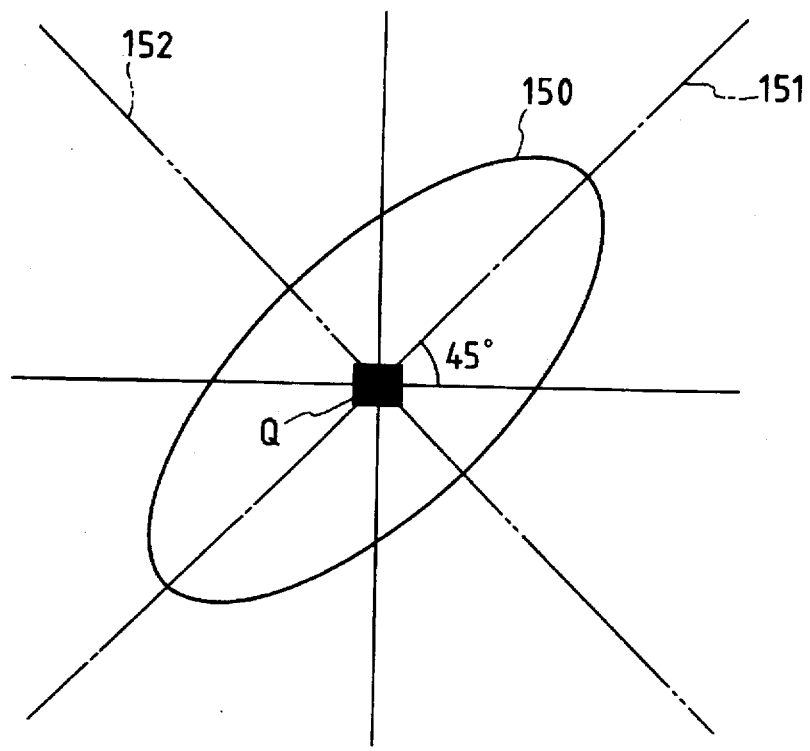
Figure 33B:
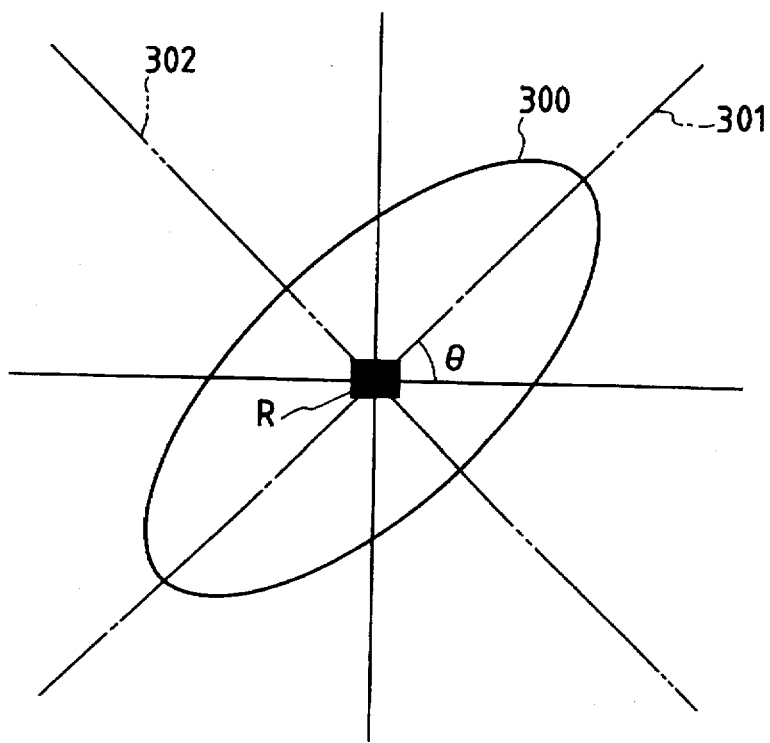

In the conventional cooperative algorithm, an ellipse 150 for determining the range of excitatory combination based on actual picture element was determined as illustrated in FIG. 33A so that its major axis 151 be made at an angle of 45° with respect to the axis for determining the range of inhibitory combination in a transverse direction as shown. On the contrary, in this embodiment, the angle $\theta$ made between the major axis 301 of the ellipse 300 for determining the range of excitatory combination based on actual picture element and the axis for determining the range of inhibitory combination in the transverse direction as shown, is determined, as illustrated in FIG. 33B, from the value S(R) of the point of intersection R on the initial screen (i.e., initial value on the parallax screen) and the picture element value $P_L(R)$, $P_R(R)$ of a picture element of each epipolar line $L_{eL}$, $L_{eR}$ corresponding to the point of intersection R, $$\theta = D_1 \times P_L(R) + D_2 \times P_R(R) + D_3 \quad (S(R) \geq \epsilon) \quad \quad (N1)$$
$$= D_4 \quad (S(R) < \epsilon_0)$$

Where $D_1$ to $D_4$ and $\epsilon_0$ are arbitrary set values.

For example, supposing a state where a screen of object is placed inclinedly, the picture element value of a picture element of each of left and right epipolar lines $L_{eL}$, $L_{eR}$ is deemed as illustrated in FIG. 32. Now, assuming that the picture element value of a fifth picture element $a_{5L}$ from the left end of left epipolar line $L_{eL}$ as shown in the figure is "255", the picture element value of a fifth picture element $a_{5R}$ from the bottom end of right epipolar line $L_{eR}$ as shown in the figure is "200", and $P_0$ in the above expression (H1) is "256", the value $Z_{55}$ of the point of intersection $R_{55}$ between picture element $a_{5L}$ and picture element $a_{5R}$ on the initial screen 310 obtained in accordance with the above expression (H1) from the left and right epipolar lines $L_{eL}$, $L_{eR}$ is $$Z_{55} = 256 - (255 - 200)$$
$$= 201$$

Herein, assuming $D_1=-0.1°$, $D_2=0.1°$, $D_3=45°$ and $\epsilon_0=50$, from the above expression (N1), $$\theta = -0.1 * 255 + 0.1 * 200 + 45$$
$$= 39.5°$$

Therefore, the excitatory combination based on actual picture element at the point of intersection $R_{55}$ is performed within the ellipse having an angle of 39.5° made between the major axis and the axis for determining the range of inhibitory combination in the transverse direction as shown.

In the above way, a new parallax screen is created by performing a predetermined processing using a threshold function of multi-value output 220 as shown in FIG. 31, for each point of intersection in the initial screen 310 to which local calculation having excitatory combination and inhibitory combination based on actual picture element is performed.

Subsequently, a check is made to determine whether or not the creation of new parallax screen is performed a predetermined number, and if not, the same operation is repeated with the created new parallax screen being the initial screen. As a result, a parallax line appears on the new parallax screen finally created, and the extraction of corresponding point can be performed based on this parallax line.

Then, a check is also made to determine whether or not any parallax line is obtained for all the groups of epipolar lines $L_{eL}$, $L_{eR}$ for two variable density images picked up, and the same operation is repeated unless the parallax line is obtained for all the groups.

If the above operation is performed for all the groups of epipolar lines, distance image is created from each parallax line obtained, considering the camera conditions.

Since in this embodiment, the parallax line having a fixed distance to the object as well as the parallax line according to the angle θ determined by the above expression (N1) can be promoted to appear by changing the range of excitatory combination in accordance with the initial values on the parallax screen 310 and the picture element values of epipolar lines $L_{eL}$, $L_{eR}$, this embodiment is effective not only for the smoothness of parallax line of the object placed at fixed distance, but also to the object placed at gradually changing distance, so that the parallax line of high precision can be obtained. Note that the expression for determining the angle θ may be other than the above expression (N1).

O. Fifteenth corresponding point extraction method for a plurality of images according to the invention The first embodiment of the fifteenth corresponding point extraction method for a plurality of images according to the present invention is to extract corresponding points for two binary images by performing local calculation having excitatory combination and inhibitory combination based on the actual picture element for said two binary images at each point of intersection on a parallax screen formed of two epipolar lines extracted respectively from said two binary images to obtain parallax lines, characterized by performing local calculation having excitatory combination and inhibitory combination based on actual picture element over a plurality of parallax screens.

Also, in the local calculation having excitatory combination and inhibitory combination based on actual picture element over a plurality of parallax screens, the range of excitatory combination and the range of inhibitory combination are made smaller for the parallax screen farther away from a central parallax screen.

The operation of this embodiment will be described below.

Two binary images having a parallax such as a Julesz's random dot stereogram as previously described are picked up using a left camera and a right camera, and corresponding left and right epipolar lines $L_{eL}$, $L_{eR}$ are extracted from two binary images picked up. Herein, because the left and right epipolar lines $L_{eL}$, $L_{eR}$ are extracted each N lines if each binary image is constituted of N scanning lines, the left and right epipolar lines $L_{eL}$, $L_{eR}$ as extracted are represented as epipolar lines $L_{eLk}$, $L_{eRk}$ (k indicating the number of scanning line, where k=1 to N), respectively. Subsequently, the initial screens $D_k$ (k=1 to N) having the initial values of parallax screen are respectively created from such extracted left and right epipolar lines $L_{eLk}$, $L_{eRk}$, as in the conventional example. Subsequently, each created initial screen $D_k$ is arranged so that corresponding points of intersection (e.g., black points $Q_{k-1}(i,j)$, $Q_k(i,j)$ and $Q_{k+1}(i,j)$) overlap one another, as illustrated in FIG. 1, and thereafter local calculation having excitatory combination and inhibitory combination based on actual picture element is performed for each of black points on each initial screen $D_k$.

Herein, local calculation having excitatory combination and inhibitory combination based on actual picture element for a black point $Q_k(i,j)$ on an initial screen $D_k$ is performed in the following manner.

(1) For each point of intersection on the initial screen $D_k$, local calculation having excitatory combination and inhibitory combination based on actual picture element is performed as in the conventional example.

Figure 34:
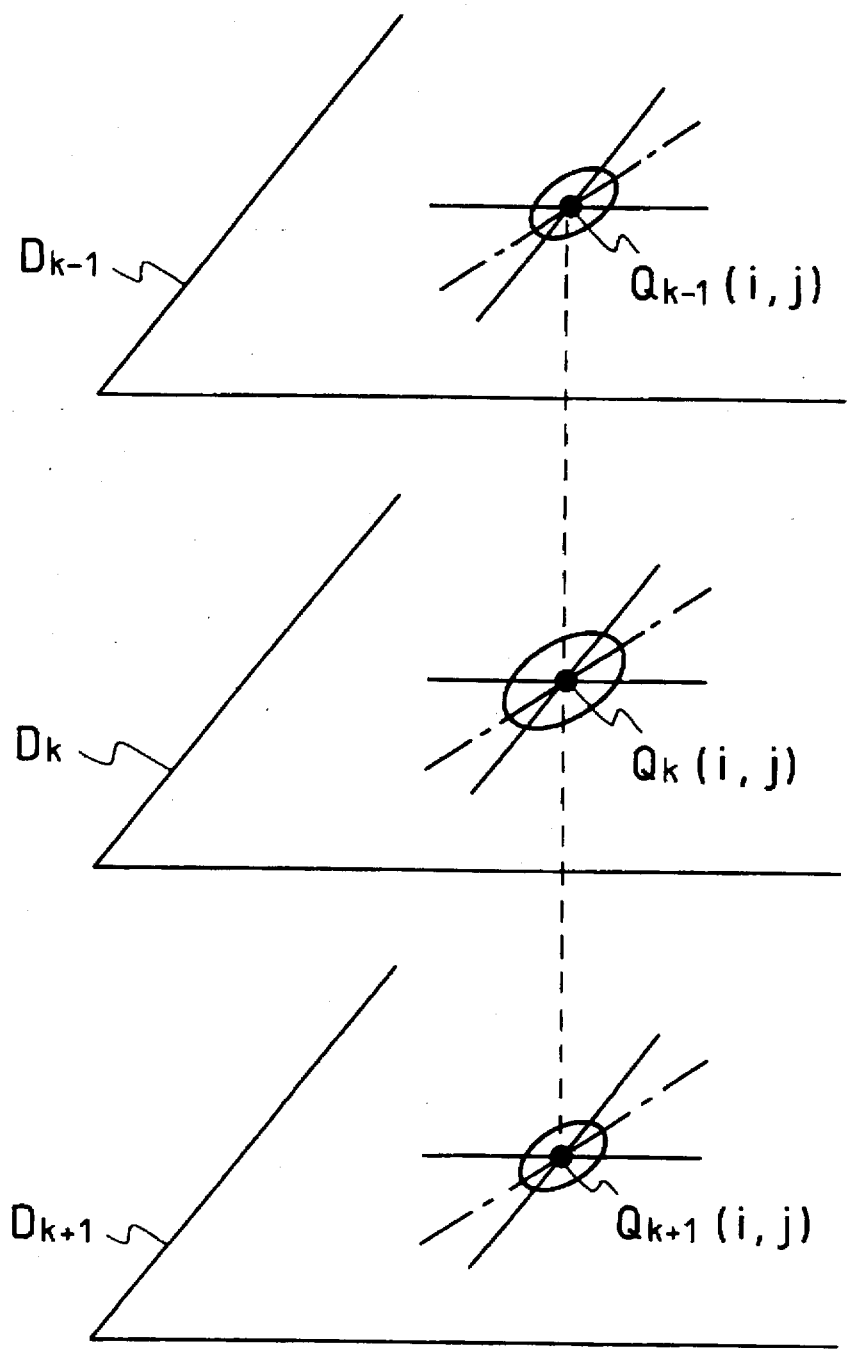
FIG. 34 is a view for explaining a first embodiment of a fifteenth corresponding point extraction method for a plurality of images according present invention.

(2) For each point of intersection on an initial screen $D_{k-1}$ and an initial screen $D_{k+1}$ arranged above and under the initial screen $D_k$ as illustrated in FIG. 34, local calculation having excitatory combination and inhibitory combination based on actual picture element is also performed.

Figure 35A:
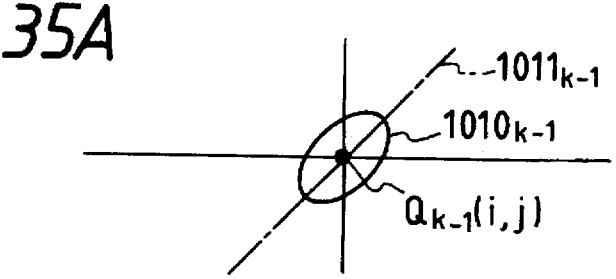
FIGS. 35A to 35C are views for explaining the range of excitatory combination in the first embodiment of the fifteenth corresponding point extraction method for a plurality of images according to the present invention.
Figure 35B:
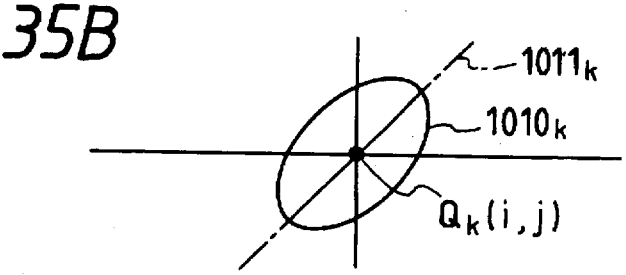
Figure 35C:
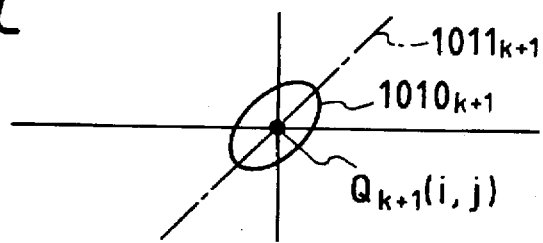
Figure 36:
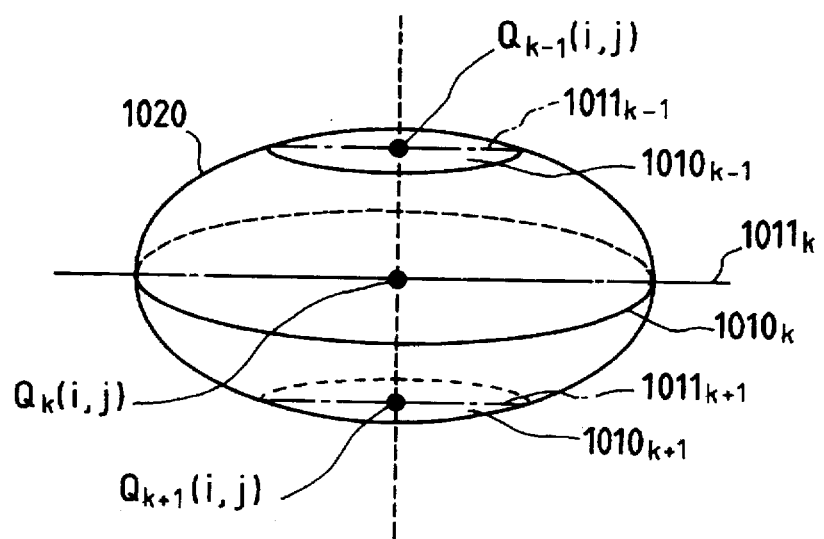
FIG. 36 is a view for explaining the range of excitatory combination in the first embodiment of the fifteenth corresponding point extraction method for a plurality of images according to the present invention.

That is, the range of excitatory combination for black point $Q_k(i,j)$ on the initial screen $D_k$ includes a range as indicated by an ellipse $1010_k$ on initial screen $D_k$ as illustrated in FIG. 35B, a range as indicated by an ellipse $1010_{k-1}$ on initial screen $D_{k-1}$ as illustrated in FIG. 35A and a range as indicated by an ellipse $1010_{k+1}$ on initial screen $D_{k+1}$ as illustrated in FIG. 35C. Herein, the range as indicated by ellipse $1010_{k-1}$ on initial screen $D_{k-1}$ and the range as indicated by ellipse $1010_{k+1}$ on initial screen $D_{k+1}$ are determined as shown in FIG. 36. An ellipsoid 1020 is prepared of which the cross section as cut through the initial screen $D_k$ is a shape of ellipse $1010_k$ on the initial screen $D_k$. The initial screen $D_{k-1}$ and initial screen $D_{k+1}$ are arranged in parallel a predetermined interval away from the initial screen $D_k$, respectively. The range as indicated by ellipse $1010_{k-1}$ on initial screen $D_{k-1}$ is a range of cross section of ellipsoid 1020 as cut through initial screen $D_{k-1}$, and the range as indicated by ellipse $1010_{k+1}$ on initial screen $D_{k+1}$ is a range of cross section of ellipsoid 1020 as cut through initial screen $D_{k+1}$. Note that the major axes $1011_{k-1}$, $1011_k$ and $1011_{k+1}$ of ellipses $1010_{k-1}$, $1010_k$ and $1010_{k+1}$ are made coincident with the direction of constant parallax.

Figure 37A:
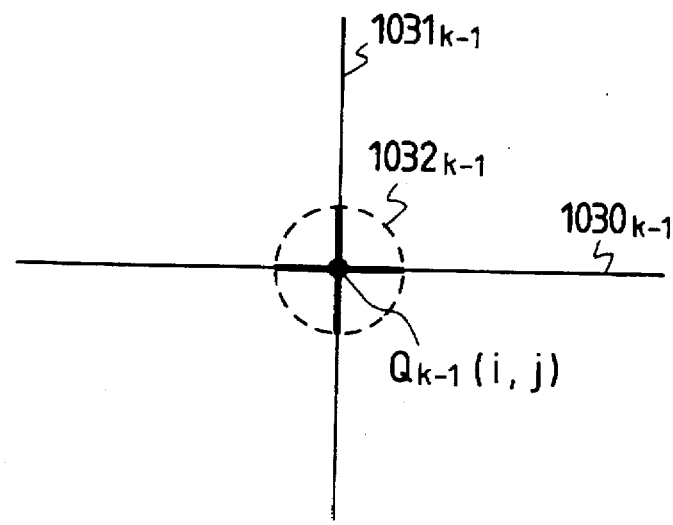
FIGS. 37A to 37C are views for explaining the range of inhibitory combination in the first embodiment of the fifteenth corresponding point extraction method for a plurality of images according to the present invention.
Figure 37B:
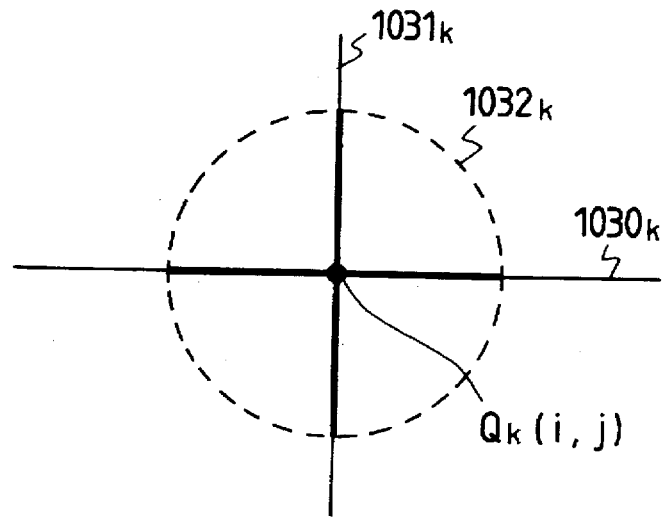
Figure 37C:
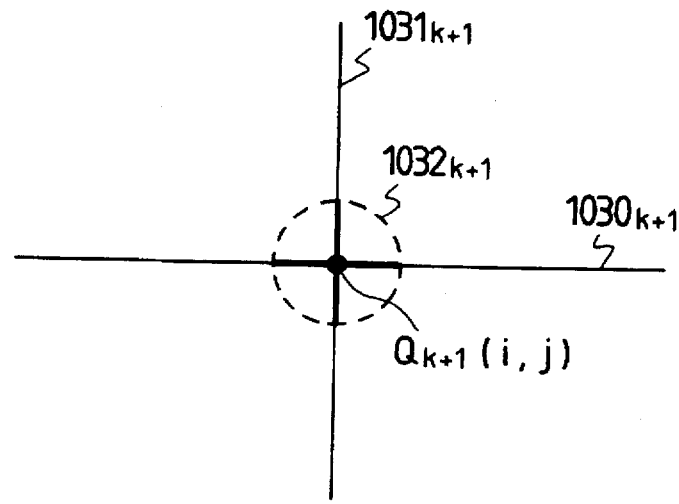
Figure 38:
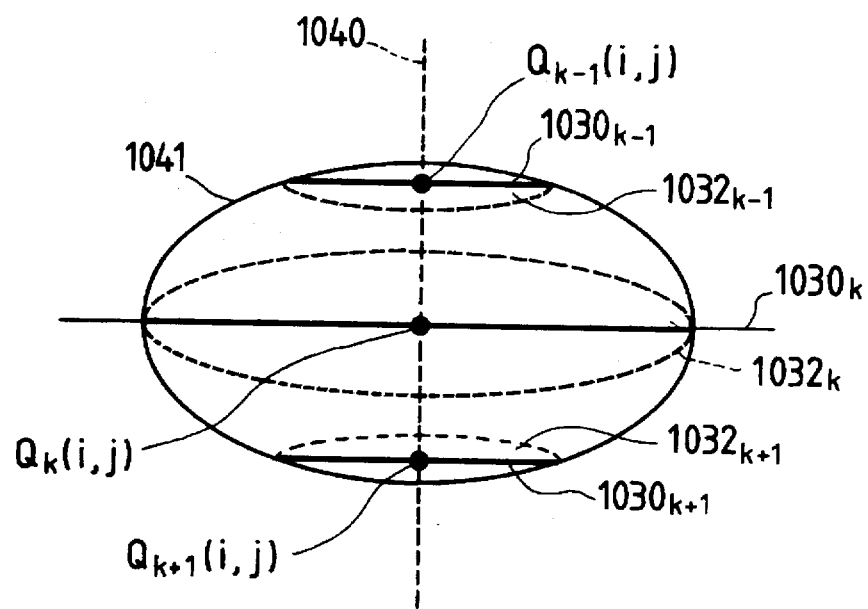
FIG. 38 is a view for explaining the range of inhibitory combination in the first embodiment of the fifteenth corresponding point extraction method for a plurality of images according to the present invention.
Figure 39:
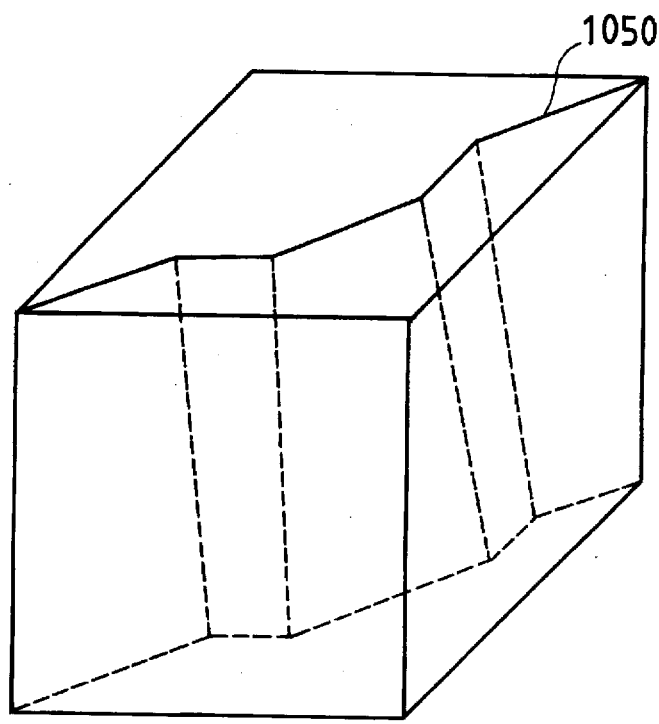
FIG. 39 is a view illustrating an instance of three dimensional parallax line eventually obtained in the first embodiment of the fifteenth corresponding point extraction method for a plurality of images according to the present invention.

Also, the range of inhibitory combination for black point $Q_k(i,j)$ on the initial screen $D_k$ includes a range within a circle $1032_k$ on a horizontal line $1030_k$ and a vertical line $1031_k$ in the initial screen $D_k$ as illustrated (by the bold line) in FIG. 37B, a range within a circle $1032_{k-1}$ on a horizontal line $1030_{k-1}$ and a vertical line $1031_{k-1}$ in the initial screen $D_{k-1}$ as illustrated (by the bold line) in FIG. 37A, and a range within a circle $1032_{k+1}$ on a horizontal line $1030_{k+1}$ and a vertical line $1031_{k+1}$ in the initial screen $D_{k+1}$ as illustrated (by the bold line) in FIG. 37C. Herein, the circle $1032_{k-1}$ on initial screen $D_{k-1}$ and the circle $1032_{k+1}$ on initial screen $D_{k+1}$ are determined as shown in FIG. 38. Namely, as ellipsoid of revolution 1041 is prepared having a center at black point $Q_k(i,j)$ on the initial screen $D_k$ and having a longitudinal axis 1040 (as indicated by the broken line in the figure) as the axis of revolution. The initial screen $D_{k-1}$ and initial screen $D_{k+1}$ are arranged in parallel a predetermined interval away from the initial screen $D_k$, respectively. Circle $1032_{k-1}$ on the initial screen $D_{k-1}$ is a circle which can be determined by the contour of cross section of the ellipsoid of revolution 1041 as cut through the initial screen $D_{k-1}$ and circle $1032_{k+1}$ on the initial screen $D_{k+1}$ is a circle which can be determined by the contour of cross section of the ellipsoid of revolution 1041 as cut through the initial screen $D_{k+1}$.

In the above way, a new parallax screen is created by performing a predetermined processing using a threshold function of binary output 171 as shown in FIG. 68, for each of black points on the initial screen $D_k$ (k=1 to N) to which local calculation having excitatory combination and inhibitory combination based on actual picture element is performed. Subsequently, by repeating local calculation having excitatory combination and inhibitory combination based on actual picture element, as described above, with the created now parallax screen being the initial screen, a three dimensional parallax line 1050, to which the continuity of parallax line respectively obtained on adjacent parallax screens is reflected, can be finally obtained. As a result, edge information above and under the object (in the vertical direction) can be obtained at exact precision.

Figure 40:
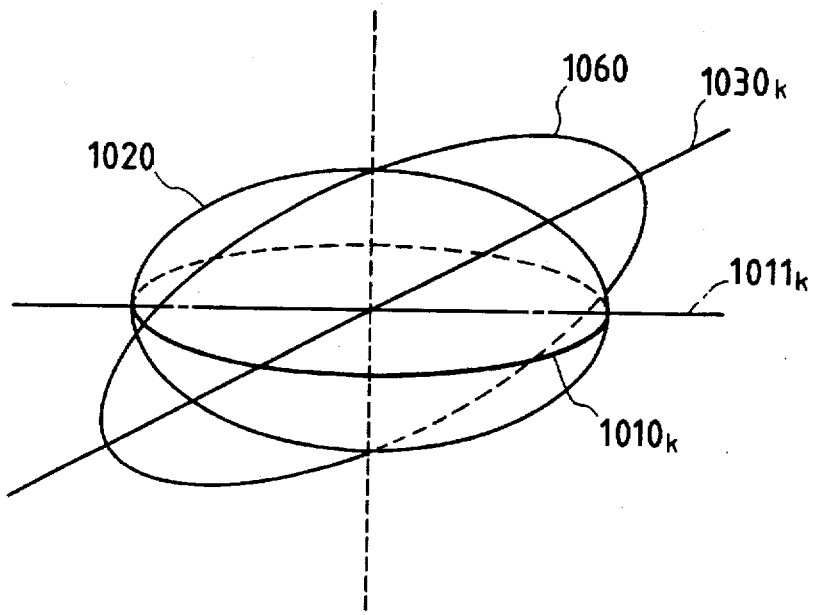
FIG. 40 is a view for exemplifying the shape of an ellipsoid of revolution as illustrated in FIG. 38.

It should be noted that the ellipsoid of revolution 1041 as illustrated in FIG. 38 may be of any shape, and may have a relation as illustrated in FIG. 40 with respect to ellipsoid 1020 as illustrated in FIG. 36, for example. Namely, ellipsoid 1020 may be an ellipsoid of revolution of which the shape of cross section as cut through a plane including each of the horizontal lines $1030_{k-1}$, $1030_k$ and $1030_{k+1}$ is one of ellipse 1060 having a longer major axis than the major axis $1011_k$ of ellipse $1010_k$ and a minor axis equal to the height of ellipsoid 102 in a longitudinal direction as illustrated in FIG. 40.

The second embodiment of the fifteenth corresponding point extraction method for a plurality of images according to the present invention will be described below.

The corresponding point extraction method for a plurality of images in this embodiment is different from that of the first embodiment as described above, in that in the local calculation having excitatory combination and inhibitory combination based on actual picture element over a plurality of parallax screens, the range of excitatory combination and the range of inhibitory combination are not made smaller for the parallax screen father away from a central parallax screen.

Figure 41A:
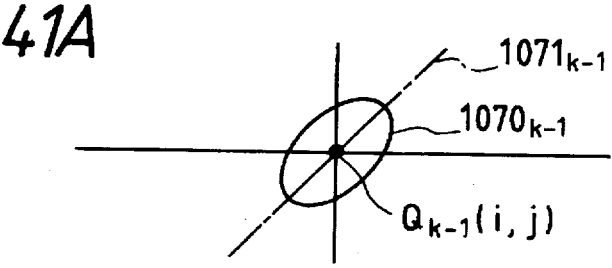
FIGS. 41A to 41C are views for explaining the range of excitatory combination in a second embodiment of the fifteenth corresponding point extraction method for a plurality of images according to the present invention.
Figure 41B:
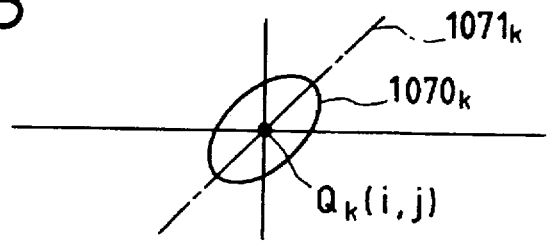
Figure 41C:
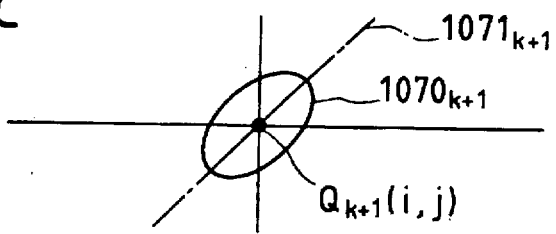
Figure 42:
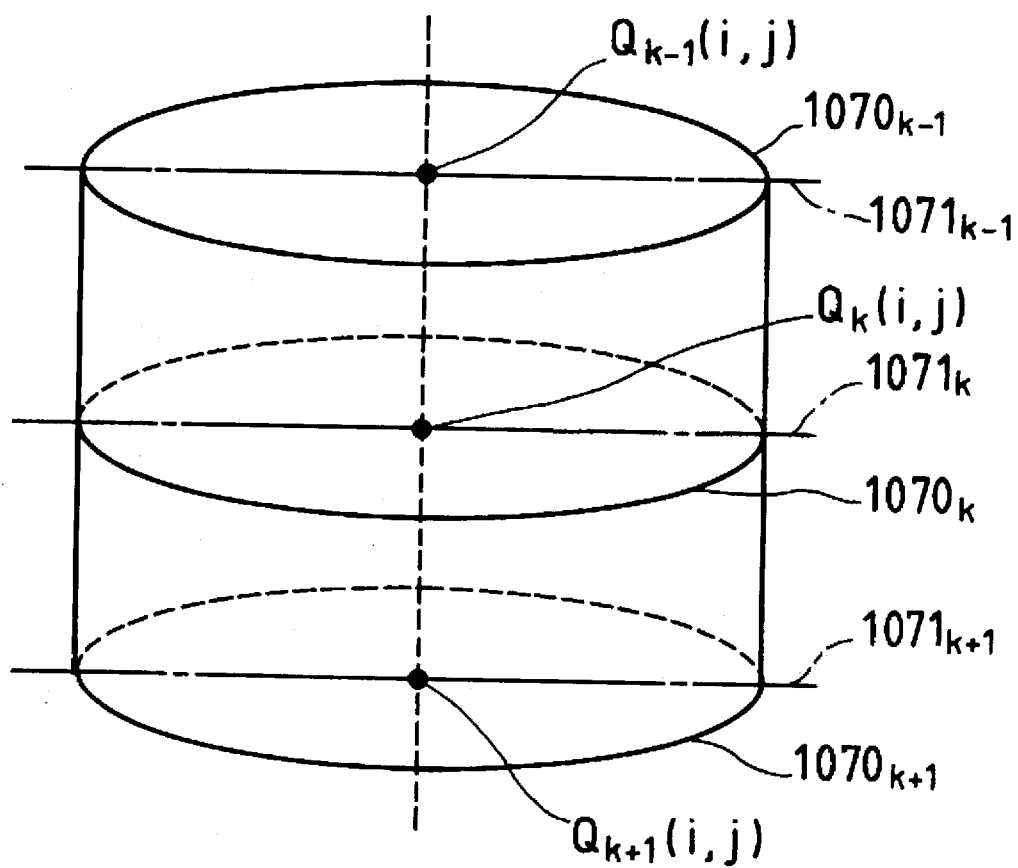
FIG. 42 is a view for explaining the range of excitatory combination in the second embodiment of the fifteenth corresponding point extraction method for a plurality of images according to the present invention.

That is, in the corresponding point extraction method for a plurality of images in this embodiment, the range of excitatory combination for black point $Q_k(i,j)$ on the initial screen $D_k$ includes a range as indicated by an ellipse $1070_k$ on initial screen $D_k$ as illustrated in FIG. 41B, a range as indicated by an ellipse $1070_{k-1}$ on initial screen $D_{k-1}$ as illustrated in FIG. 41A and a range as indicated by an ellipse $1070_{k+1}$ on initial screen $D_{k+1}$ as illustrated in FIG. 41C. Herein, the ellipse $1070_{k-1}$ on initial screen $D_{k-1}$ and the ellipse $1070_{k+1}$ on initial screen $D_{k+1}$ are of the shapes of an ellipse $1070_k$ on initial screen $D_k$ as projected in equal scale onto the initial screen $D_{k-1}$ and the initial screen $D_{k+1}$, respectively, which are arranged in parallel with a predetermined interval spaced away from the initial screen $D_k$, as illustrated in FIG. 42. Note that the major axes $1071_{k-1}$, $1071_k$ and $1071_{k+1}$ of ellipses $1070_{k-1}$, $1070_k$ and $1070_{k+1}$ are made coincident with the direction of constant parallax.

Figure 43A:
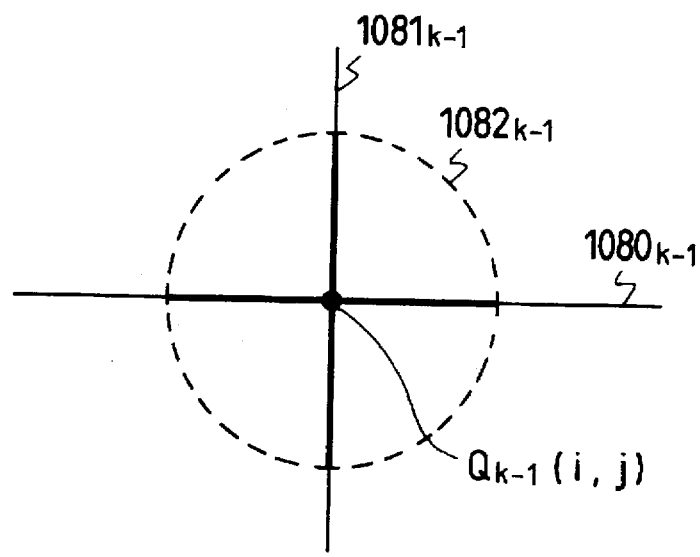
FIGS. 43A to 43C are views for explaining the range of inhibitory combination in the second embodiment of the fifteenth corresponding point extraction method for a plurality of images according to the present invention.
Figure 43B:
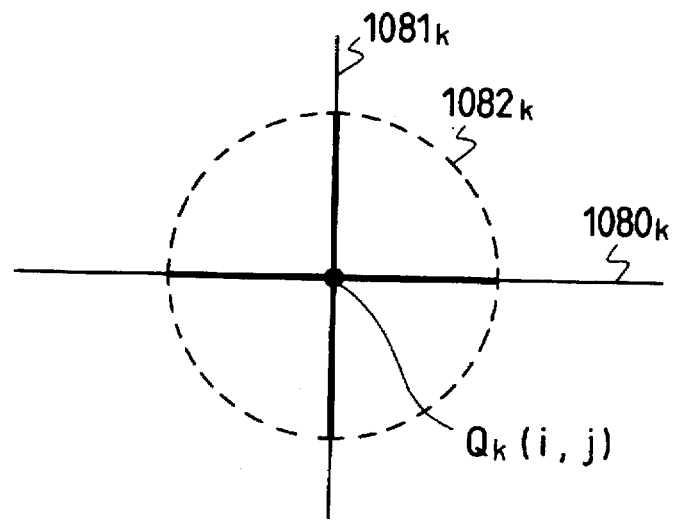
Figure 43C:
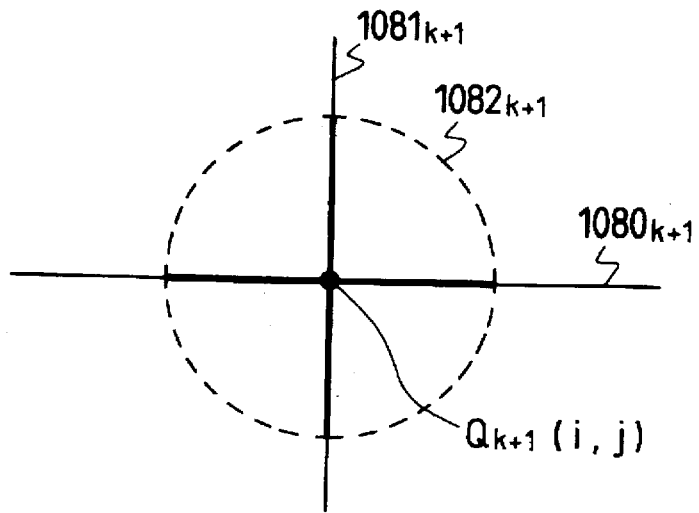

Also, the range of inhibitory combination for black point $Q_k(i,j)$ on the initial screen $D_k$ includes a range within a circle $1082_k$ on a horizontal line $1080_k$ and a vertical line $1081_k$ in the initial screen $D_k$ as illustrated (by the bold line) in FIG. 43B, a range within a circle $1082_{k-1}$ on a horizontal line $1080_{k-1}$ and a vertical line $1081_{k-1}$ in the initial screen $D_{k-1}$ as illustrated (by the bold line) in FIG. 43A, and a range within a circle $1082_{k+1}$ on a horizontal line $1080_{k+1}$ and a vertical line $1081_{k+1}$ in the initial screen $D_{k+1}$ as illustrated (by the bold line) in FIG. 43C. Herein, the circle $1082_{k-1}$ on initial screen $D_{k-1}$, the circle $1082_k$ on initial screen $D_k$ and the circle $1082_{k+1}$ on initial screen $D_{k+1}$ are of equal dimension.

In the above way, a new parallax screen is created by performing a predetermined processing using a threshold function of binary output 171 as shown in FIG. 68, for each of black points on the initial screen $D_k$ (k=1 to N) to which local calculation having excitatory combination and inhibitory combination based on actual picture element is performed. Subsequently, by repeating local calculation having excitatory combination and inhibitory combination based on actual picture element, as described above, with the created new parallax screen being the initial screen, a three dimensional parallax line, to which the continuity of parallax line respectively obtained on adjacent parallax screens is reflected, can be finally obtained. As a result, edge information above and under the object can be obtained at good precision.

It should be noted that in the corresponding point extraction method for a plurality of images in this embodiment, the influence of adjacent parallax screens in stronger than in the first embodiment, the continuity of parallax lines can be further emphasized if the parallax lines obtained respectively on adjacent parallax lines are continuous.

While in the above-described embodiment, local calculation having excitatory combination and inhibitory combination based on actual picture element for black point $Q_k(i,j)$ on initial screen $D_k$ is performed for each point of intersection on two initial screens $D_{k-1}$, $D_{k+1}$ arranged above and under the initial screen $D_k$, it will be understood that local calculation having excitatory combination and inhibitory combination based on actual picture element may be also performed for each point of intersection on two or more initial screens.

P. Sixteenth corresponding point extraction method for a plurality of images according to the invent ion One embodiment of the sixteenth corresponding point extraction method for a plurality of images according to the present invention is to extract corresponding points for two binary images by performing local calculation having excitatory combination and inhibitory combination based on the actual picture element for said two binary images at each point of intersection on a parallax screen formed of two epipolar lines extracted respectively from said two binary images to obtain parallax lines, characterized by providing a virtual picture element indicating the continuity of actual picture elements between adjacent actual picture elements of each binary image in a vertical direction, inserting each virtual parallax screen formed of this virtual picture element between parallax screens, and performing local calculation having excitatory combination and inhibitory combination based on virtual picture element over a plurality of virtual parallax screens in parallel with local calculation having excitatory combination and inhibitory combination based on actual picture element over a plurality of parallax screens.

Note that excitatory combination based on virtual picture element over the plurality of virtual parallax screens is competitive with excitatory combination based on actual picture element over the plurality of parallax screens, and inhibitory combination based on virtual picture element over the plurality of virtual parallax screens is competitive with inhibitory combination based on actual picture element over the plurality of parallax screens.

The operation of this embodiment will be described below.

Two binary images having a parallax such as a Julesz's random dot stereogram as previously described are picked up using a left camera and a right camera, and corresponding left and right epipolar lines $L_{eL}$, $L_{eR}$ are extracted from two binary images picked up. Herein, because the left and right epipolar lines $L_{eL}$, $L_{eR}$ are extracted each N lines if each binary image is constituted of N scanning lines, the left and right epipolar lines $L_{eL}$, $L_{eR}$ as extracted are represented as epipolar lines $L_{eL}k$, $L_{eRk}$ (k indicating the number of scanning line, where k=1 to N), respectively. Subsequently, the initial screens $D_k$ (k=1 to N) having the initial values of parallax screen are respectively created from such extracted left and right epipolar lines $L_{eLk}$, $L_{eRk}$, as in the conventional example.

Figure 44:
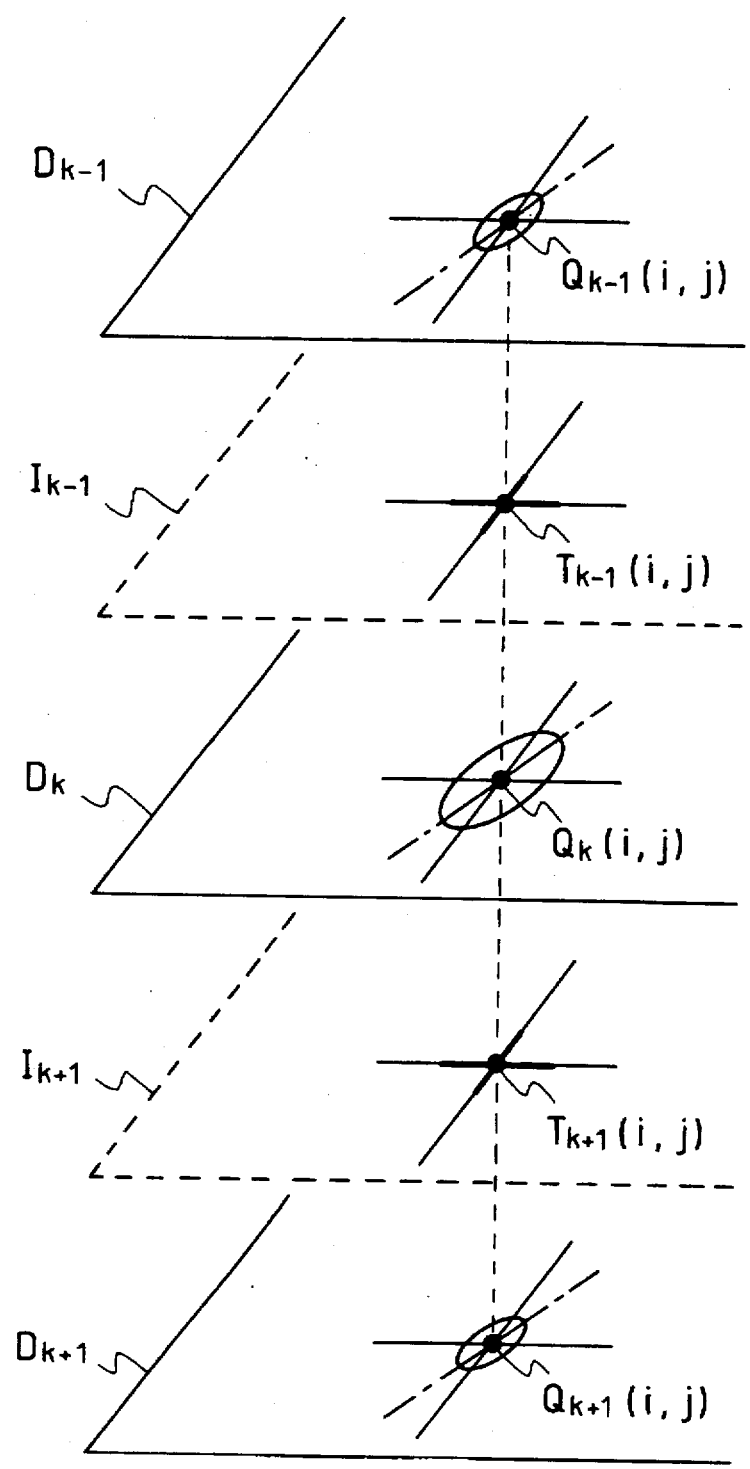
FIG. 44 is a view for explaining one embodiment of a sixteenth corresponding point extraction method for a plurality of images according to the present invention.

Subsequently, each created initial screen $D_k$ is arranged so that corresponding points of intersection (e.g., black points $Q_{k-1}(i,j)$, $Q_k(i,j)$ and $Q_{k+1}(i,j)$) overlap one another, as illustrated in FIG. 44. Subsequently, a virtual initial screen is inserted between adjacent ones of initial screens, such that a virtual initial screen $I_{k-1}$ is inserted between initial screen $D_{k-1}$ and initial screen $D_k$, and a virtual initial screen $I_{k+1}$ is inserted between initial screen $D_k$ and initial screen $D_{k+1}$.

Specific creation methods of virtual initial screen $I_1$ to be inserted between initial screen $D_1$ and $D_2$ may include the following two methods.

(1) First creation method

Figure 45:
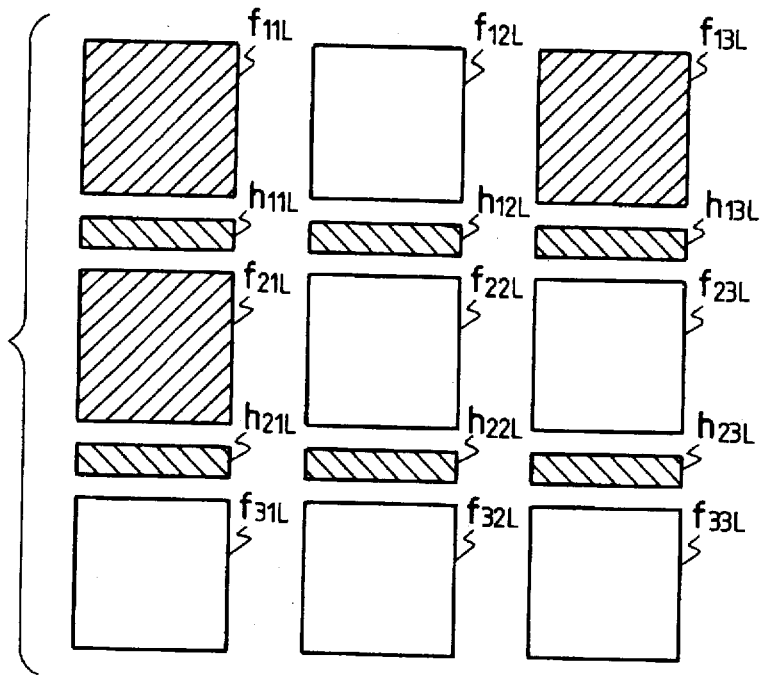
FIG. 45 is a view for explaining a way of creating virtual initial screen in one embodiment of the sixteenth corresponding point extraction method for a plurality of images according to the present invention.

A virtual picture element having the picture element value indicating the continuity of actual picture elements is inserted between adjacent actual picture elements in a vertical direction of binary image picked up by a left camera. For example, a virtual picture element $h_{11L}$ having the picture element value indicating the continuity between actual picture elements $f_{11L}$ and $f_{21L}$ is inserted between adjacent actual picture elements $f_{11L}$ and $f_{21L}$ in the vertical direction, as illustrated in FIG. 45. Herein, the picture element value of each virtual picture element is determined in the following manner.

(a) If actual picture element $f_{11L}$ and $f_{21L}$ are both black (as represented by the slanting lines in the figure) and continuous, the picture element value of virtual picture element $h_{11L}$ is defined as "0".

(b) If actual picture elements $f_{12L}$ and $f_{22L}$ are both white (as represented by the void in the figure) and continuous, the picture element value of virtual picture element $h_{12L}$ is defined as "0".

(c) If actual picture element $f_{13L}$ is black but actual picture element $f_{23L}$ is white and they are discontinuous, the picture element value of virtual picture element $h_{13L}$ is defined as "1". On the contrary, if actual picture element $f_{13L}$ is white but actual picture element $f_{23L}$ is black, the picture element value of virtual picture element $h_{13L}$ is defined as "1".

Subsequently, using each virtual picture element in the first line as illustrated in FIG. 45 (such as virtual picture element $h_{11L}$ to $h_{13L}$), a left virtual epipolar line is extracted in the same manner as extracting an epipolar line $L_{eL1}$ from each actual picture element in the first line as illustrated in FIG. 45 (such as actual picture element $f_{11L}$ to $f_{13L}$). Also, a right virtual epipolar line is likewise extracted from binary image picked up by a right camera. Then, a virtual initial screen $I_1$ is created from extracted left and right virtual epipolar lines by defining the virtual picture element as black point (picture element value "1") only when corresponding picture elements are both "1", or otherwise defining it as white point (picture element value "0").

(2) Second creation method

Figure 46A:
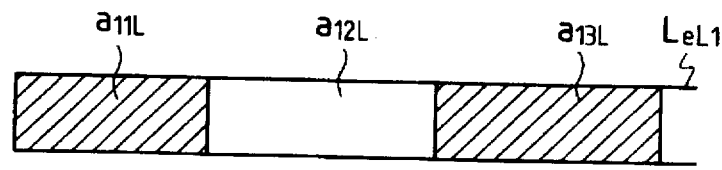
FIGS. 46A to 46C are views for explaining another way of creating virtual initial screen in one embodiment of the sixteenth corresponding point extraction method for a plurality of images according to the present invention.
Figure 46B:
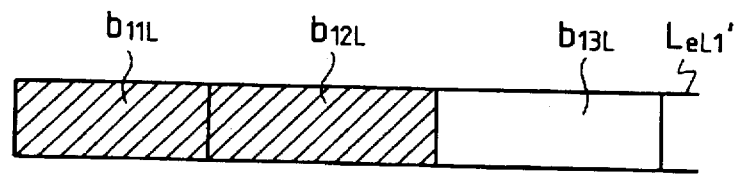
Figure 46C:
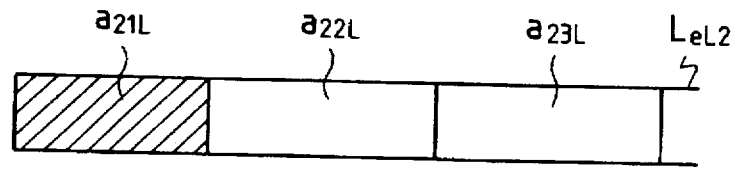

In this creation method, a left virtual epipolar line $L_{eL1}'$ is directly obtained from a left epipolar line $L_{eL1}$ extracted from actual picture elements (such as actual picture elements $f_{11L}$ to $f_{13L}$) in the first line as illustrated in FIG. 45 and a left epipolar line $L_{eL2}$ extracted from actual picture elements (such as actual picture elements $f_{21L}$ to $f_{23L}$) in the second line as illustrated in FIG. 45. Namely, in examples as illustrated in FIGS. 46A to 46C.

(a) If the picture element values of a first picture element $a_{11L}$ in the epipolar line $L_{eL1}$ and a first picture element $a_{21L}$ in the epipolar line $L_{eL2}$ are both "0" (as represented by the slanting lines in the figure), the picture element value of a first picture element $b_{11L}$ in the virtual epipolar line $L_{eL1}'$ is defined as "0".

(b) If the picture element values of a second picture element $a_{12L}$ in the epipolar line $L_{eL1}$ and a second picture element $a_{22L}$ in the epipolar line $L_{eL2}$ are both "1" (as represented by the void in the figure), the picture element value of a second picture element $b_{12L}$ in the virtual epipolar line $L_{eL1}'$ is defined as "0".

(c) If the picture element value of a third picture element $a_{13L}$ in the epipolar line $L_{eL1}$ is "0" and the picture element value of a third picture element $a_{23L}$ in the epipolar line $L_{eL2}$ is "1", the picture element value of a third picture element $b_{13L}$ in the virtual epipolar line $L_{eL1}'$ is defined as "1". On the contrary, if the picture element value of a third picture element $a_{13L}$ in the epipolar line $L_{eL1}$ is "1" and the picture element value of a third picture element $a_{23L}$ in the epipolar line $L_{eL2}$ is "0" the picture element value of a third picture element $b_{13L}$ in the virtual epipolar line $L_{eL1}'$ is defined as "1".

Then, a virtual initial screen $I_1$ is created from a left virtual epipolar line $L_{eL1}'$ as above obtained and a right virtual epipolar line $L_{eR1}'$ as likewise obtained in the same way as the first creation method.

After each virtual initial screen created by the first and second creation methods as above described is provided between each actual initial screen, local calculation having excitatory combination and inhibitory combination based on virtual picture element is performed for each of black points on each initial screen in parallel with local calculation having excitatory combination and inhibitory combination based on actual picture element. For example, local calculation having excitatory combination and inhibitory combination based on actual picture element for black point $Q_k(i,j)$ on the initial screen $D_k$ is performed in the following manner.

(1) For each point of intersection on the initial screen $D_k$, local calculation having excitatory combination and inhibitory combination based on actual picture element is performed as in the conventional example.

(2) For each point of intersection on two initial screens $D_{k-1}$ and $D_{k+1}$ arranged above and under the initial screen $D_k$ as illustrated in FIG. 44, local calculation having excitatory combination and inhibitory combination based on actual picture element is also performed.

Figure 47A:
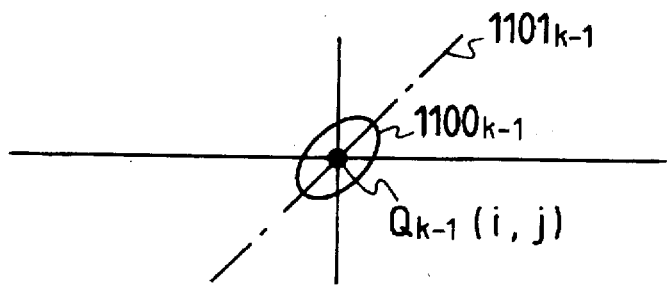
FIGS. 47A to 47E are views for explaining the range of excitatory combination in one embodiment of the sixteenth corresponding point extraction method for a plurality of images according to the present invention.
Figure 47B:
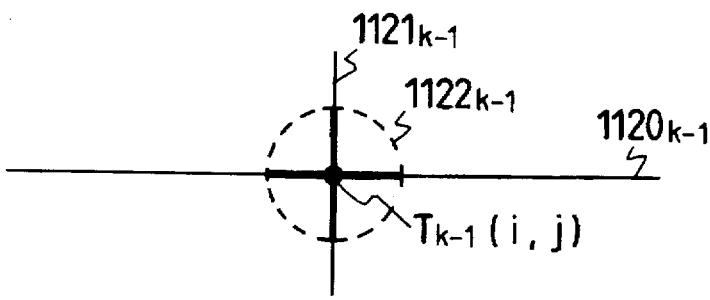
Figure 47C:
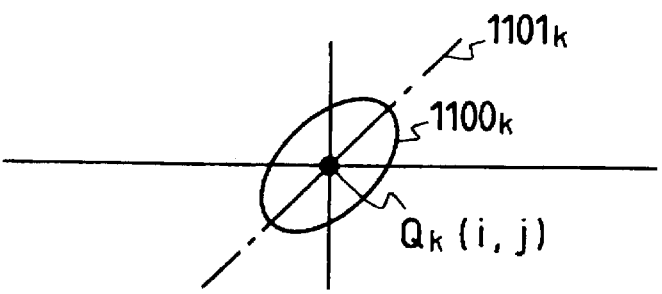
Figure 47D:
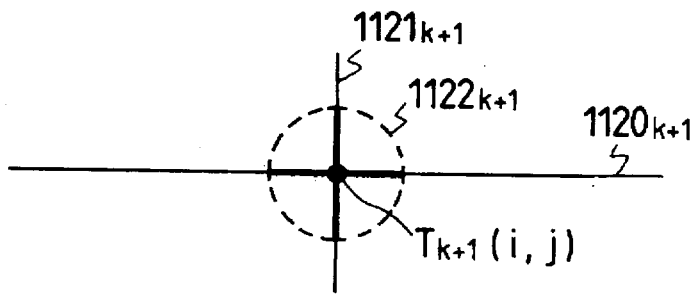
Figure 47E:
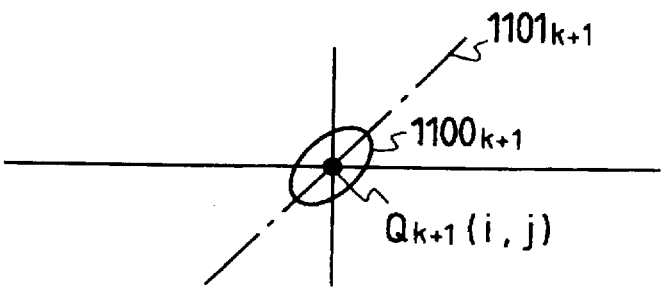

(3) For each point of intersection on two virtual initial screens $I_{k-1}$, $I_{k+1}$ arranged above and under the initial screen $D_k$ as illustrated in FIG. 44 (such as a point of intersection $T_{k-1}(i,j)$ and a point of intersection $T_{k+1}(i,j)$), local calculation having excitatory combination and inhibitory combination based on virtual picture element is performed. That is, the range of excitatory combination for black point $Q_k(i,j)$ on the initial screen $D_k$ includes a range as indicated by an ellipse $1100_k$ on initial screen $D_k$ as illustrated in FIG. 47C, a range as indicated by an ellipse $1100_{k-1}$ on initial screen $D_{k-1}$ as illustrated in FIG. 47A, a range as indicated by an ellipse $1100_{k+1}$ on initial screen $D_{k+1}$ as illustrated in FIG. 47E, a range within a circle $1122_{k-1}$ on a horizontal line $1120_{k-1}$ and a vertical line $1121_{k-1}$ in the virtual initial screen $I_{k-1}$ as illustrated (by the bold line) in FIG. 47B, and a range within a circle $1122_{k+1}$ on a horizontal line $1120_{k+1}$ and a vertical line $1121_{k+1}$ in the virtual initial screen $I_{k+1}$ as illustrated (by the bold line) in FIG. 47D.

Figure 48B:
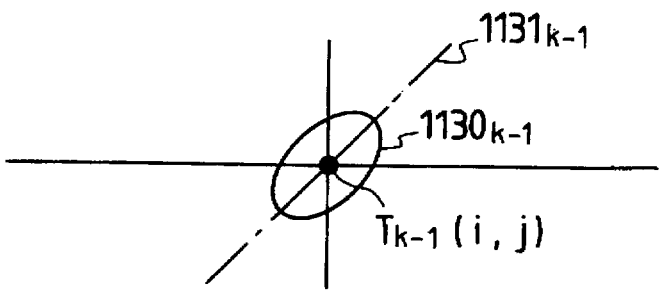
Figure 48C:
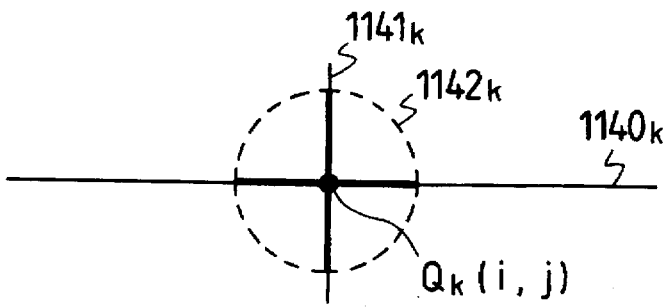
Figure 48D:
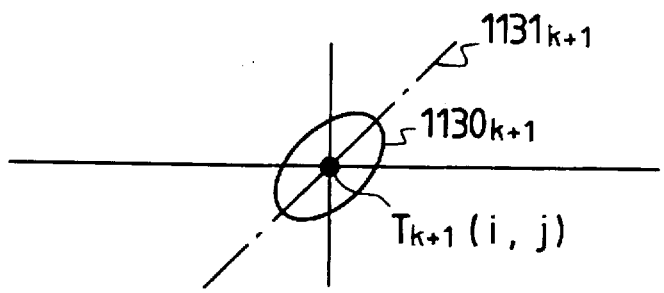
Figure 48E:
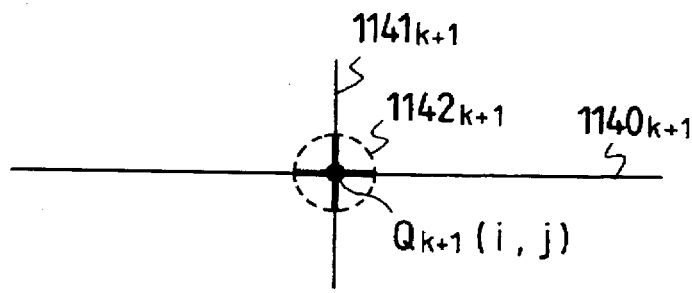

Also, the range of inhibitory combination for black point $Q_k(i,j)$ on the initial screen $D_k$ includes a range within a circle $1142_k$ on a horizontal line $1140_k$ and a vertical line $1140_k$ in the initial screen $D_k$ as illustrated (by the bold line) in FIG. 48B, a range within a circle $1142_{k-1}$ on a horizontal line $1140_{k-1}$ and a vertical line $1141_{k-1}$ in the initial screen $D_{k-1}$ as illustrated (by the bold line) in FIG. 48A, and a range within a circle $1142_{k+1}$ on a horizontal line $1140_{k+1}$ and a vertical line $1140_{k+1}$ in the initial screen $D_{k+1}$ as illustrated (by the bold line) in FIG. 48E, a range as indicated by an ellipse $1130_{k-1}$ on virtual initial screen $I_{k-1}$ as illustrated in FIG. 48B, and a range as indicated by an ellipse $1130_{k+1}$ on virtual initial screen $I_{k+1}$ as illustrated in FIG. 48D.

Herein, it is to be noted that excitatory combination based on virtual picture element over a plurality of virtual parallax screens in competitive with excitatory combination based on actual picture element over a plurality of parallax screens, and inhibitory combination based on virtual picture element over a plurality of virtual parallax screens is competitive with inhibitory combination based on actual picture element over a plurality of parallax screens. That is, the ranges of excitatory combination and inhibitory combination in each virtual initial screen $I_{k-1}$, $I_{k+1}$ for black point $Q_k(i,j)$ on the initial screen $D_k$ are in the reverse relation with respect to the ranges of excitatory combination and inhibitory combination in each initial screen $D_{k-1}$, $D_k$ and $D_{k+1}$ for black point $Q_k(i,j)$ on the initial screen $D_k$.

Herein, the range of ellipse $1100_{k-1}$ on initial screen $D_{k-1}$ and the range of ellipse $1100_{k+1}$ on initial screen $D_{k+1}$ are determined as shown in FIG. 49. An ellipsoid $1150$ is prepared of which the cross section as cut through the initial screen $D_k$ is a shape of ellipse $1100_k$ on the initial screen $D_k$. The initial screen $D_{k-1}$ and initial screen $D_{k+1}$ are arranged in parallel a predetermined interval away from the initial screen $D_k$, respectively. The range as indicated by ellipse $1100_{k-1}$ on initial screen $D_{k-1}$ is a range of cross section of ellipsoid $1150$ as cut through initial screen $D_{k-1}$, and the range as indicated by ellipse $1100_{k+1}$ on initial screen $D_{k+1}$ is a range of cross section of ellipsoid $1150$ as cut through initial screen $D_{k+1}$. Also, the range of ellipse $1130_{k-1}$ on virtual initial screen $I_{k-1}$ and the range of ellipse $1130_{k+1}$ on virtual initial screen $I_{k+1}$ are likewise determined. That is, the virtual initial screen $I_{k-1}$ and virtual initial screen $I_{k+1}$ are arranged in parallel a predetermined interval away from the initial screen $D_k$, respectively. The range as indicated by ellipse $1130_{k-1}$ on virtual initial screen $I_{k-1}$ is a range of cross section of ellipsoid $1150$ as cut through virtual initial screen $I_{k-1}$. The range as indicated by ellipse $1130_{k+1}$ on virtual initial screen $I_{k+1}$ is a range of cross section of ellipsoid $1150$ as cut through virtual initial screen $I_{k+1}$. However, the manner of determining the range of ellipse $1130_{k-1}$ on virtual initial screen $I_{k-1}$ and the range of ellipse $1130_{k+1}$ on virtual initial screen $I_{k+1}$ is not limited thereto. Note that the major axes $1101_{k-1}$, $1101_k$, $1101_{k+1}$, $1131_{k-1}$ and $1131_{k+1}$ of ellipses $1100_{k-1}$, $1100_k$, $1100_{k+1}$, $1130_{k-1}$ and $1130_{k+1}$ are made coincident with the direction of constant parallax.

Circle $1142_{k-1}$ on initial screen $D_{k-1}$ and circle $1142_{k+1}$ on initial screen $D_{k+1}$ are determined as shown in FIG. 17. An ellipsoid of revolution $1161$ having a center at black point $Q_k(i,j)$ on initial screen $D_k$ with a longitudinal axis $1160$ (as indicated by the broken line in the figure) as rotational axis is prepared. The initial screen $D_{k-1}$ and initial screen $D_{k+1}$ are arranged in parallel a predetermined interval away from the initial screen $D_k$, respectively. Circle $1142_{k-1}$ on initial screen $D_{k-1}$ is a circle determined by the contour of cross section of the ellipsoid of revolution $1161$ as cut through initial screen $D_{k-1}$, and circle $1142_{k+1}$ on initial screen $D_{k+1}$ is a circle determined by the contour of cross section of the ellipsoid of revolution $1161$ as cut through initial screen $D_{k+1}$. Also, circle $1122_{k-1}$ on virtual initial screen $I_{k-1}$ and circle $1122_{k+1}$ on virtual initial screen $I_{k+1}$ are likewise determined. That is, the virtual initial screen $I_{k-1}$ and virtual initial screen $I_{k+1}$ are arranged in parallel a predetermined interval away from the initial screen $D_k$, respectively. Circle $1122_{k-1}$ on virtual initial screen $I_{k-1}$ is a circle determined by the contour of cross section of the ellipsoid of revolution $1161$ as cut through virtual initial screen $I_{k-1}$. Also, circle $1122_{k+1}$ on virtual initial screen $I_{k+1}$ is a circle determined by the contour of cross section of the ellipsoid of revolution $1161$ as cut through virtual initial screen $I_{k+1}$. However, the manner of determining the circle $1122_{k-1}$ on virtual initial screen $I_{k-1}$ and the circle $1122_{k+1}$ on virtual initial screen $I_{k+1}$ is not limited thereto.

Figure 51:
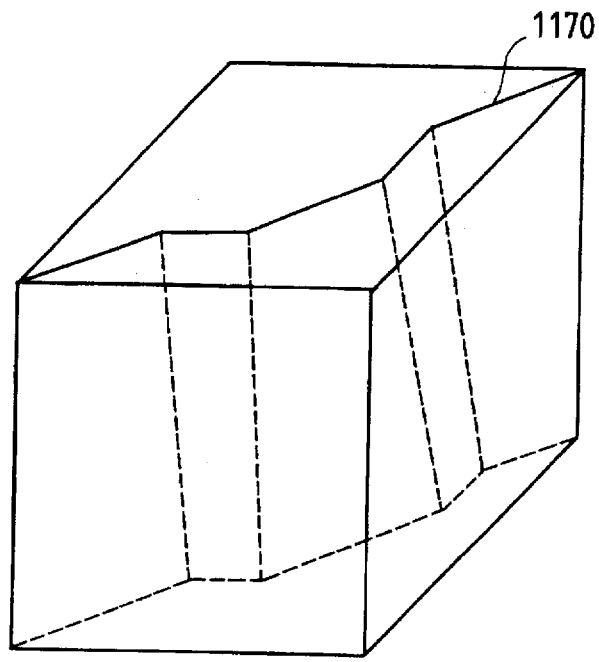
FIG. 51 is a view for exemplifying a three dimensional parallax line eventually obtained in one embodiment of the sixteenth corresponding point extraction method for a plurality of images according to the present invention.

In the above way, a new parallax screen is created by performing a predetermined processing using a threshold function of binary output $171$ as shown in FIG. 68, for each of black points on the initial screen $D_k$ ($k=1$ to $N$) to which local calculation having excitatory combination and inhibitory combination based on actual picture element and local calculation having excitatory combination and inhibitory combination based on virtual picture element are performed. Subsequently, by repeating local calculation having excitatory combination and inhibitory combination based on actual picture element and local calculation having excitatory combination and inhibitory combination based on virtual picture element, as described above, with the created new parallax screen being the initial screen, a three dimensional parallax line $1170$, as illustrated in FIG. 51, to which the continuity of parallax line respectively obtained on adjacent initial screens is reflected, can be finally obtained. As a result, edge information above and under the object can be obtained at good precision.

Figure 50:
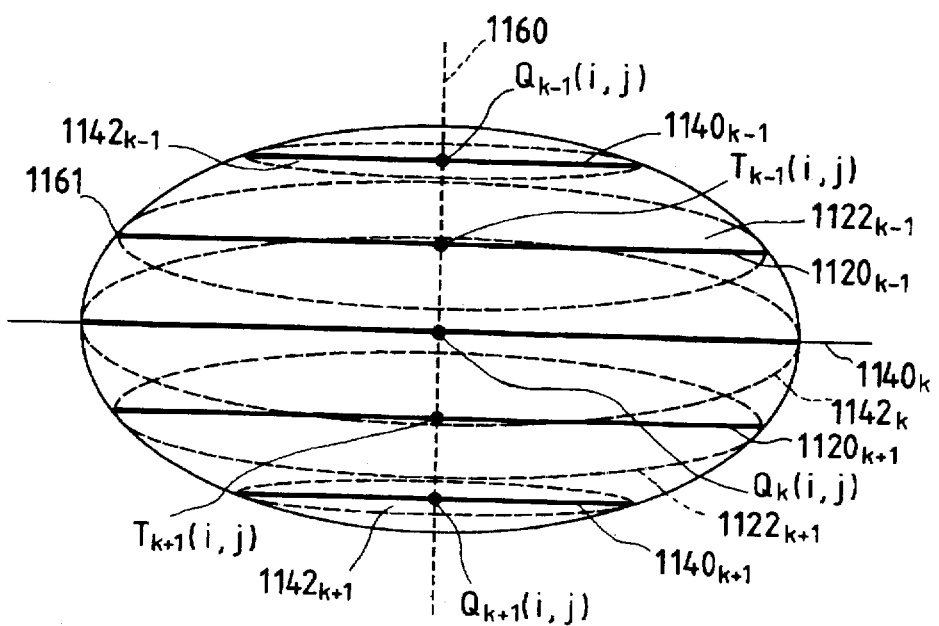
FIG. 50 is a view for exemplifying a way of determining the range of circles as illustrated in FIGS. 47B and 47D, and FIGS. 48A, 48C and 48E.
Figure 52:
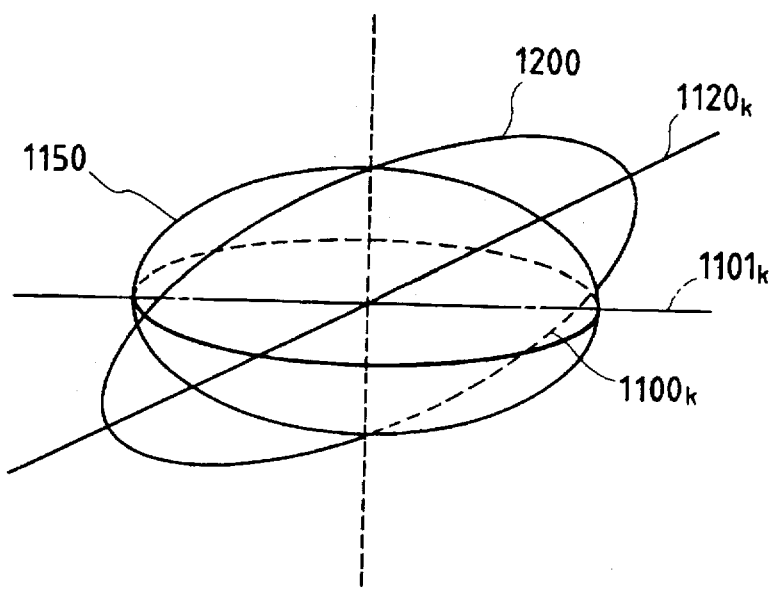
FIG. 52 is a view for exemplifying the shape of an ellipsoid of revolution as illustrated in FIG. 50.
Figure 53:
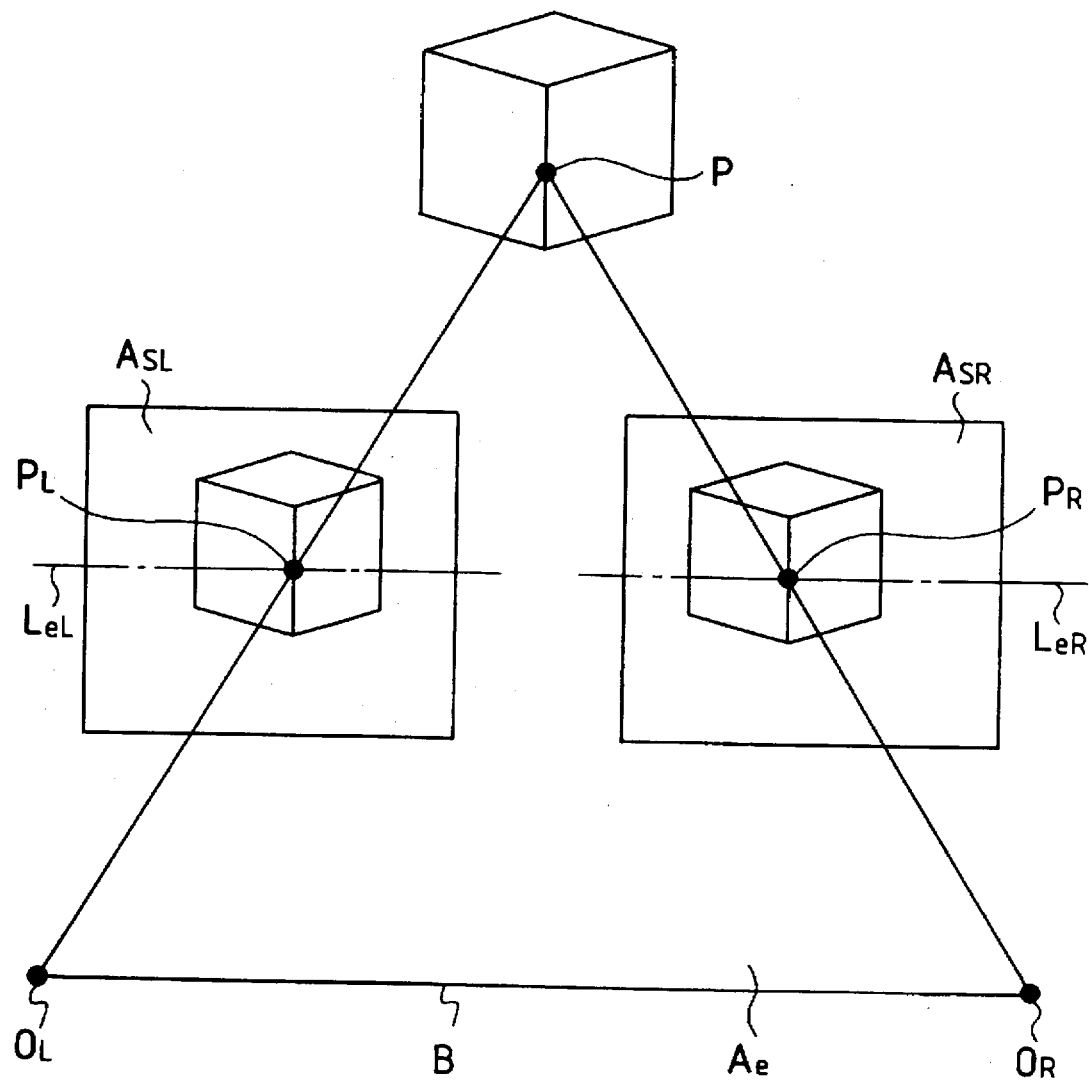
FIG. 53 is a view for explaining the triangulation for use in obtaining distance image.
Figure 54:
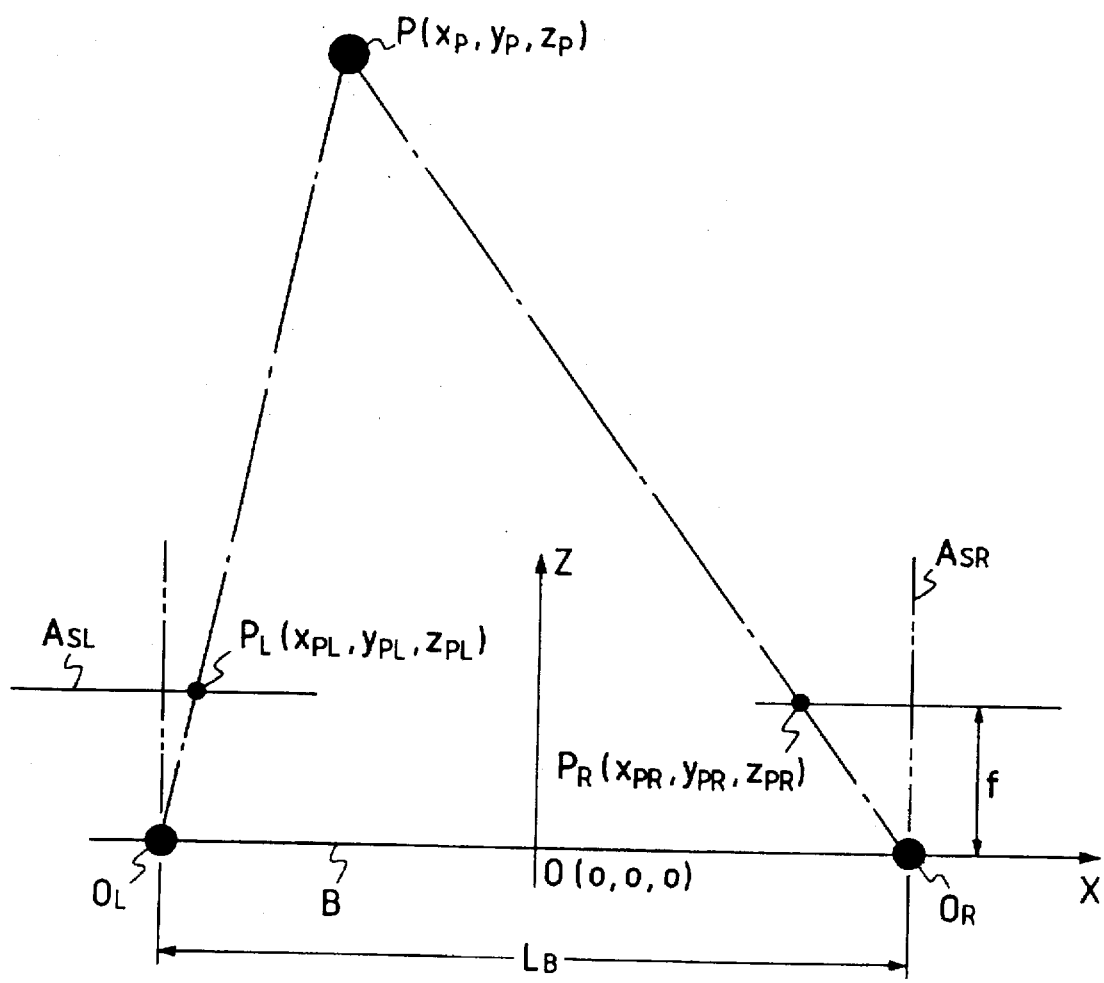
FIG. 54 is a view for explaining the coordinates of a point on a substance when the optical axis of a right camera and the optical axis of a left camera are respectively perpendicular to the baseline in the triangulation as illustrated in FIG. 53.
Figure 55:
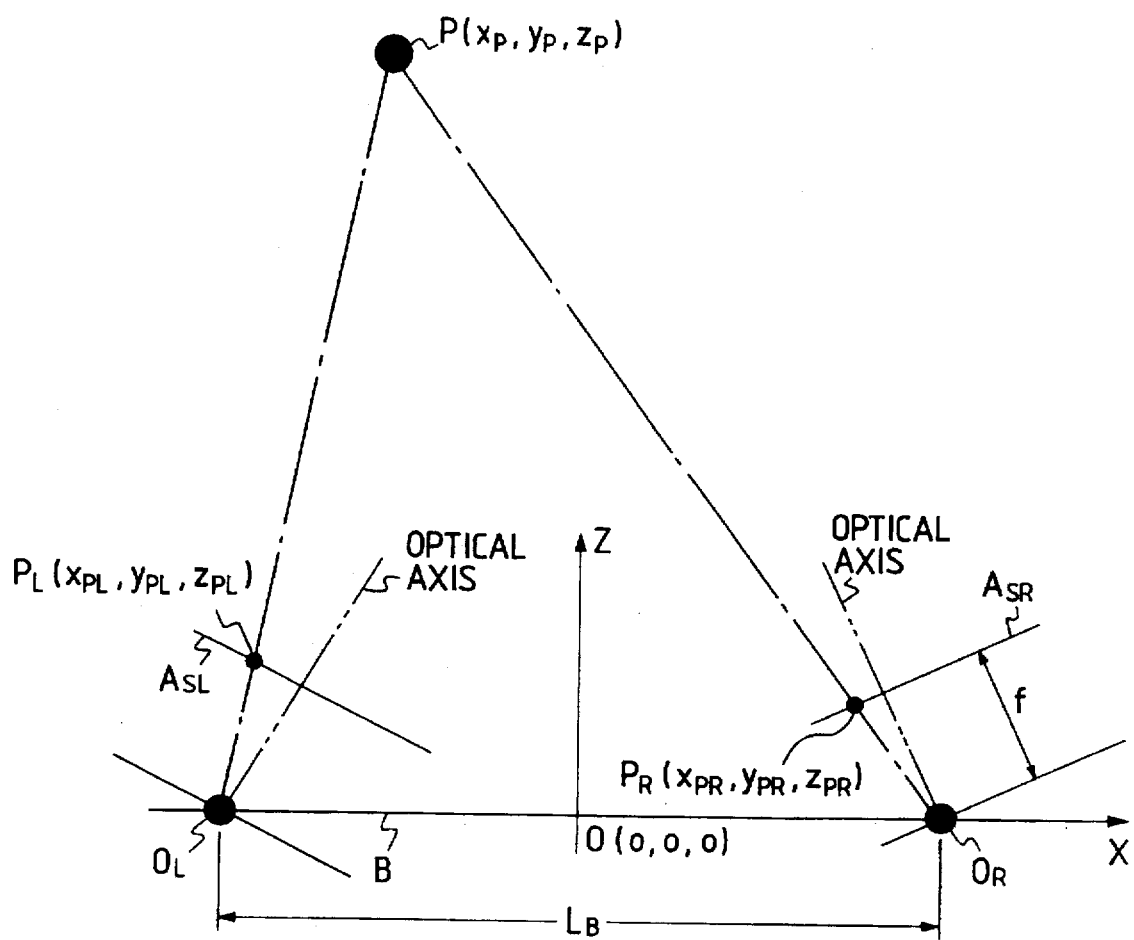
FIG. 55 is a view for explaining the coordinates of a point on a substance when the optical axis of a right camera and the optical axis of a left camera have respective angles (convergence angles) relative to the baseline in the triangulation as illustrated in FIG. 53.
Figure 56A:
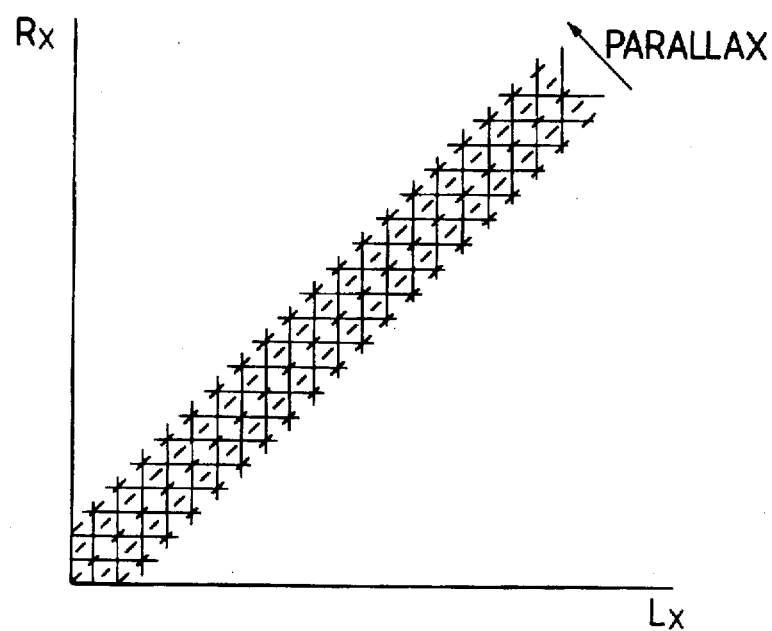
FIGS. 56A to 56C are views for explaining cooperative algorithm.
Figure 56B:
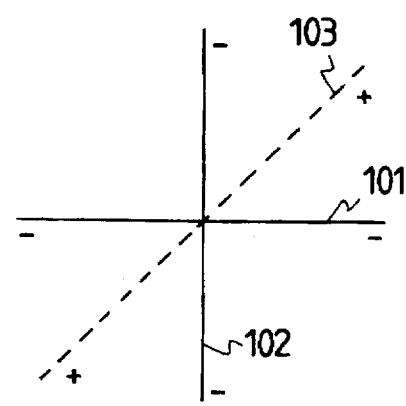
Figure 56C:
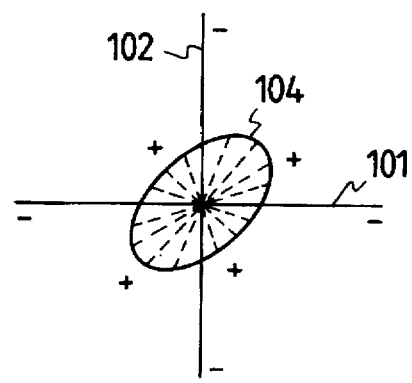
Figure 57:
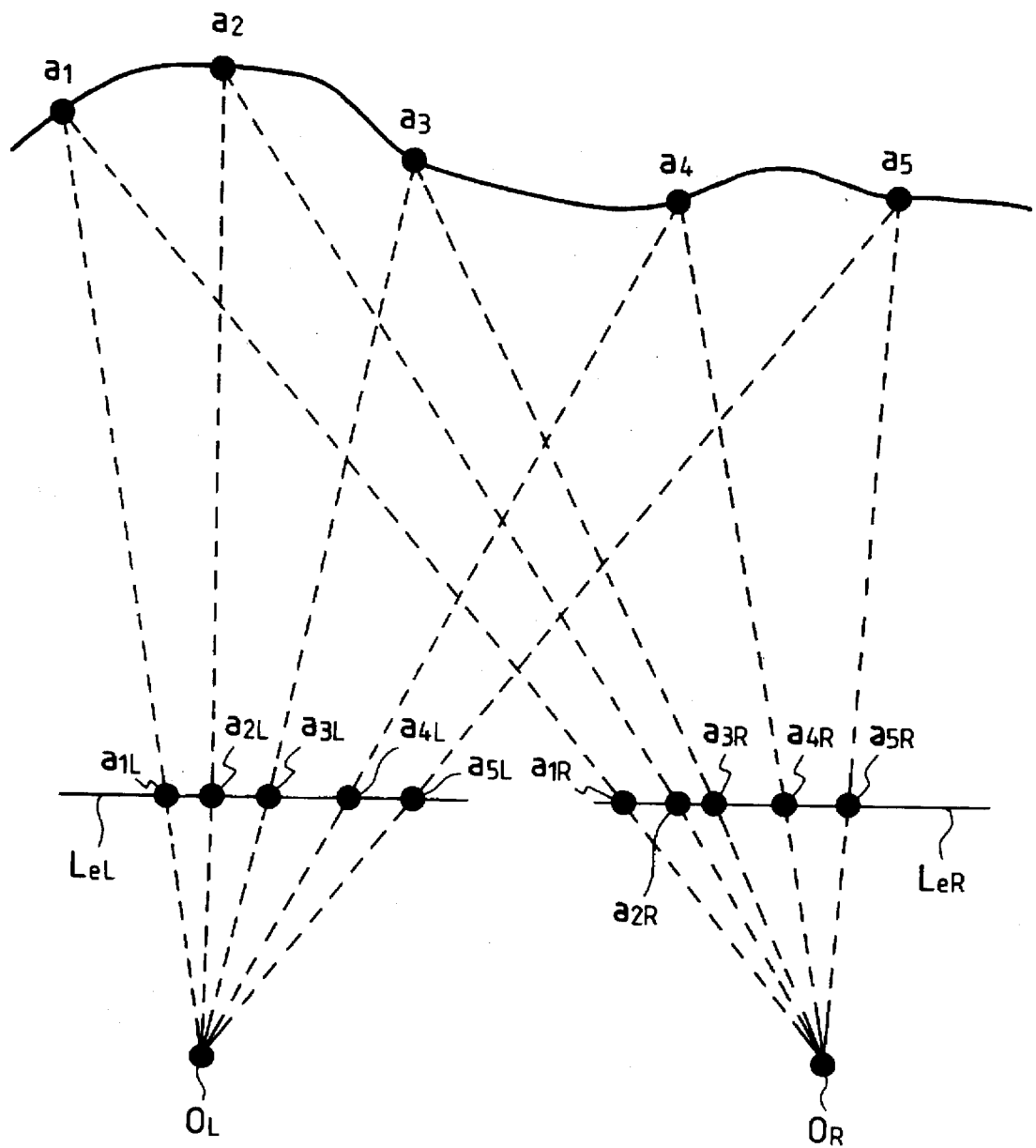
FIG. 57 is a view for explaining parallax line.
Figure 58:
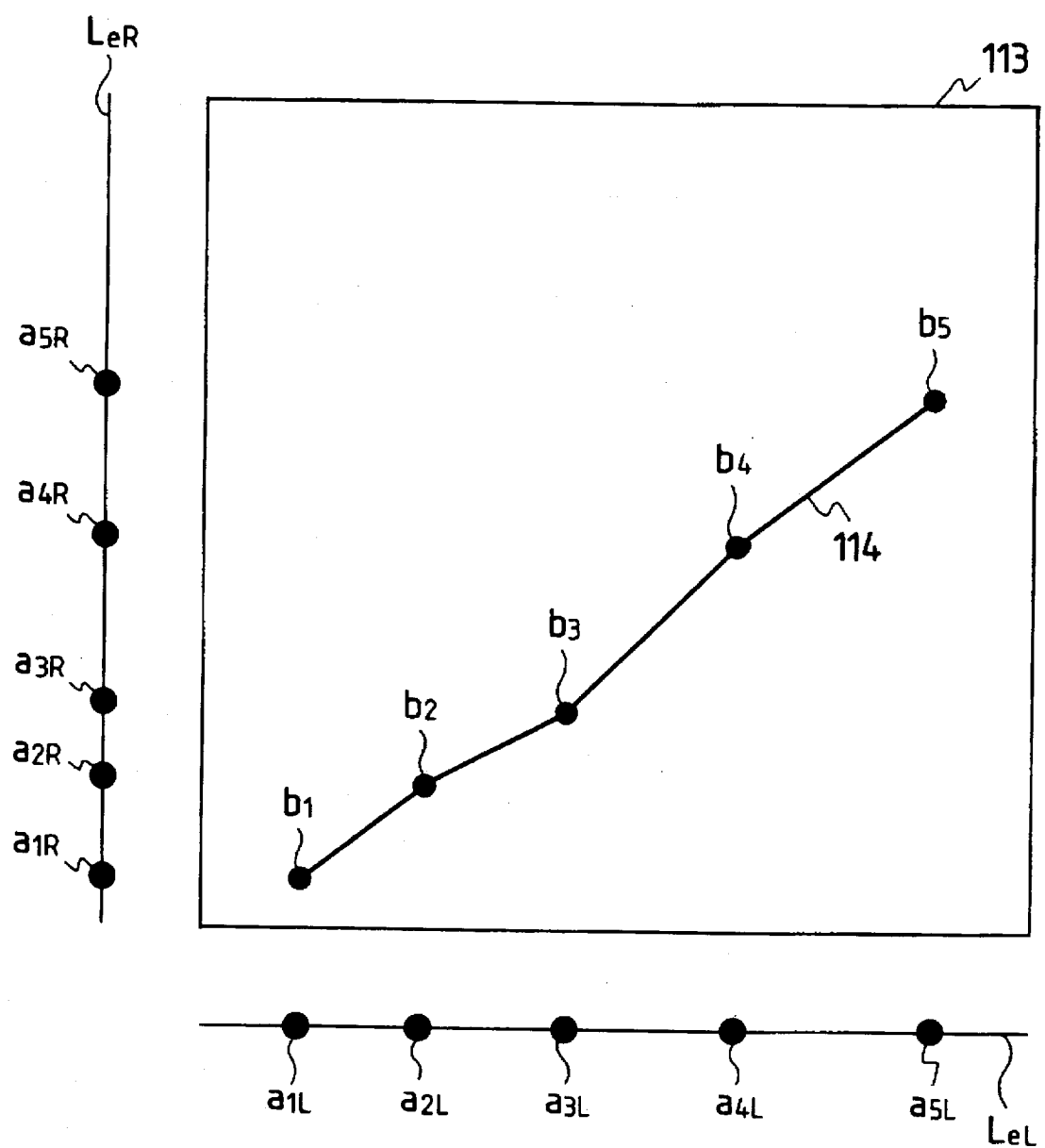
FIG. 58 is a view for explaining parallax line.
Figure 59A:
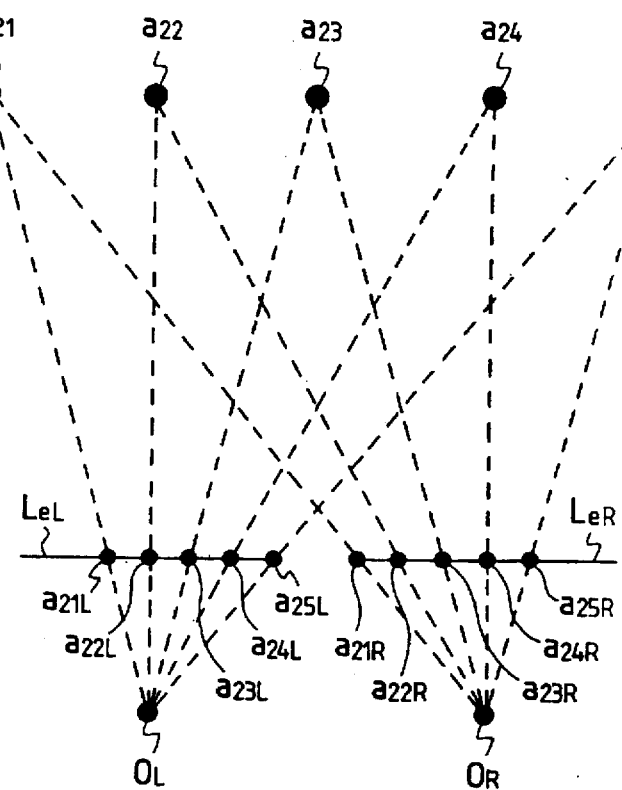
FIGS. 59A and 59B are views for explaining the relation between parallax line and distance.
Figure 59B:
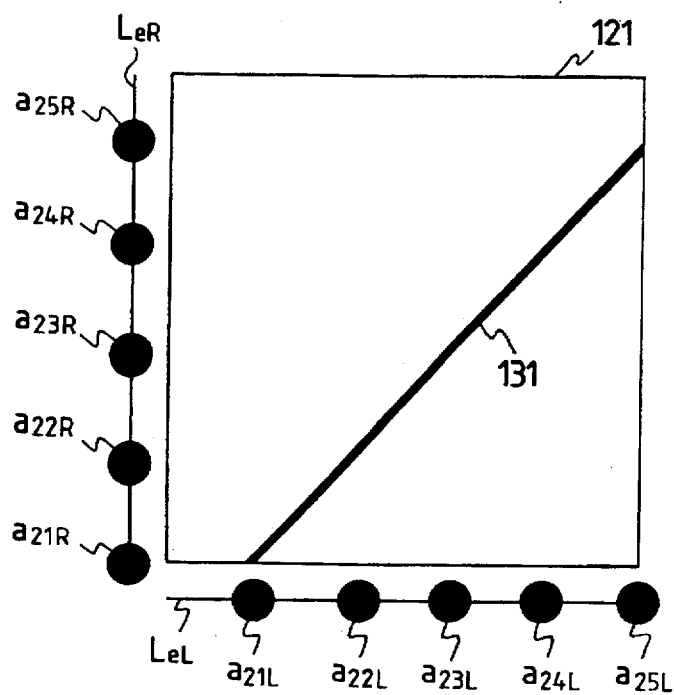
Figure 60A:
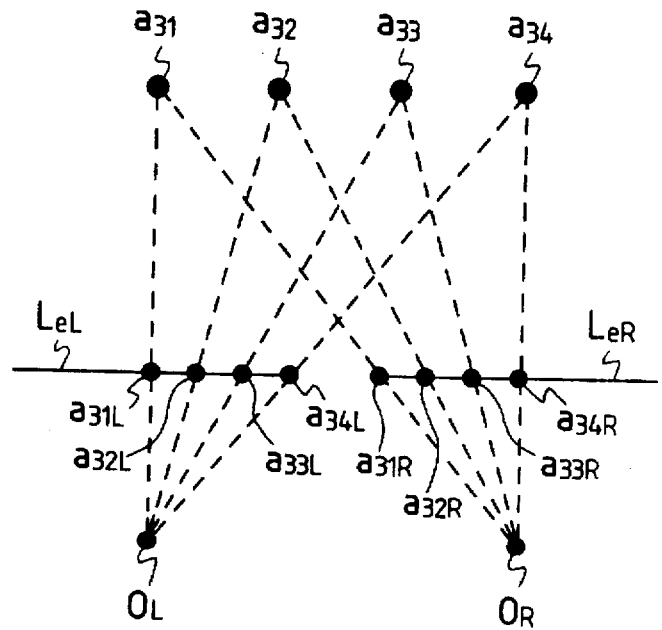
FIGS. 60A and 60B are views for explaining the relation between parallax line and distance.
Figure 60B:
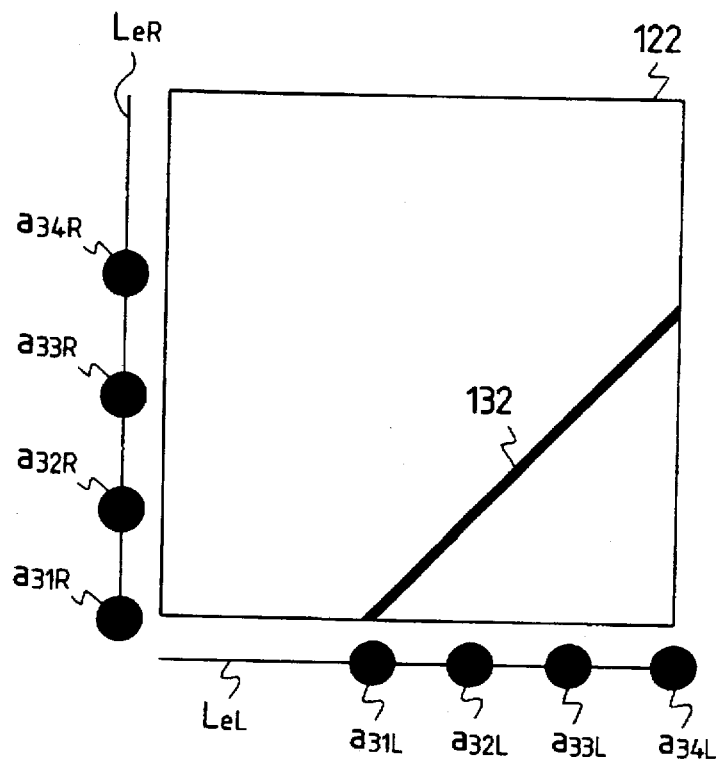
Figure 61A:
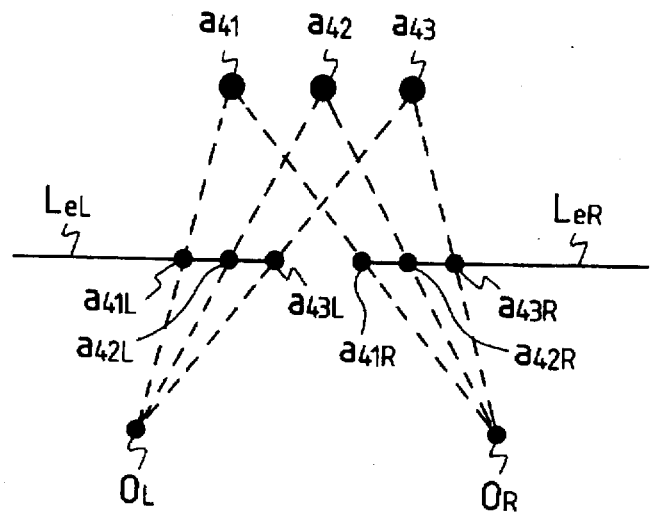
FIGS. 61A and 61B are views for explaining the relation between parallax line and distance.
Figure 61B:
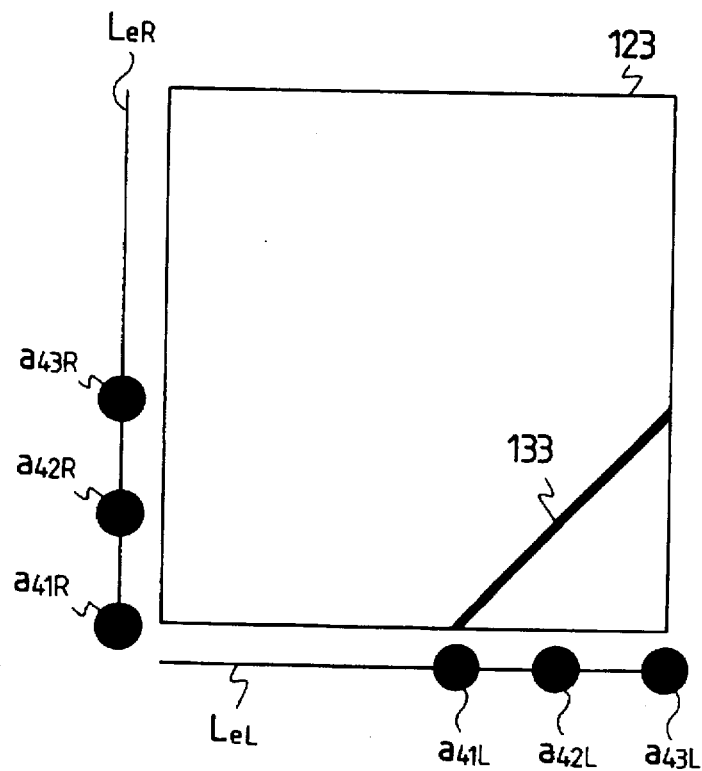
Figure 62A:
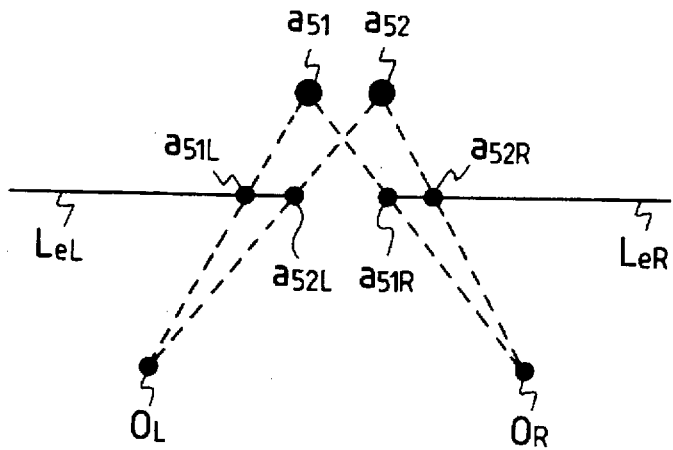
FIGS. 62A and 62B are views for explaining the relation between parallax line and distance.
Figure 62B:
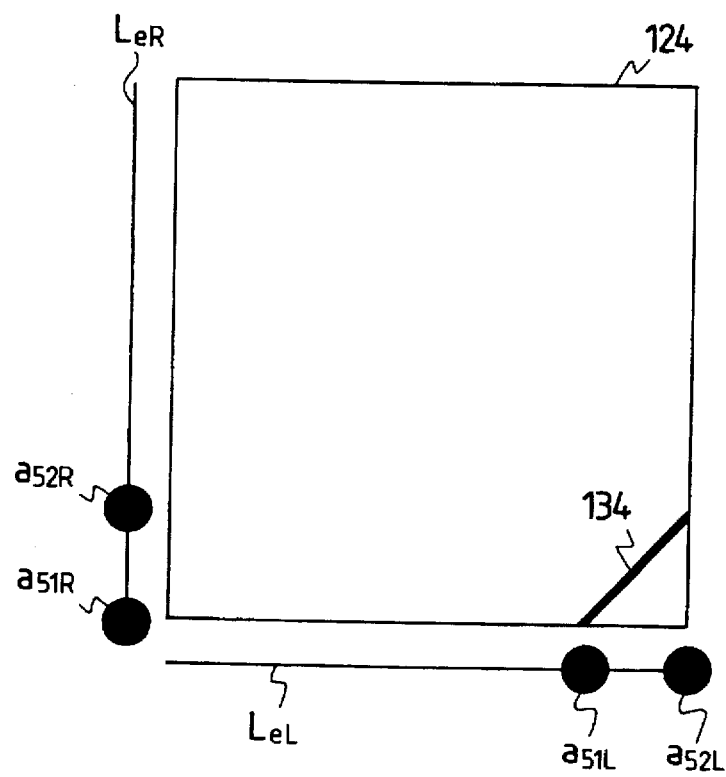

It should be noted that the ellipsoid of revolution $1161$ as illustrated in FIG. 50 may be of any shape. For example, it may have a relation as illustrated in FIG. 52 with respect to ellipsoid $1150$ as illustrated in FIG. 49. Namely, ellipsoid $1150$ may be an ellipsoid of revolution of which the shape of cross section as cut through a plane including each of the horizontal lines $1120_{k-1}$, $1120_k$ and $1120_{k+1}$ is one of ellipse $1200$ having a longer major axis than the major axis $1101_k$ of ellipse $1100_k$ and a minor axis equal to the height of ellipsoid 1150 in a longitudinal direction as illustrated in FIG. 52.

While in the above description, local calculation having excitatory combination and inhibitory combination based on actual picture element over a plurality of parallax screens is performed in such a manner that the range of excitatory combination and the range of inhibitory combination are made smaller for the parallax screen farther away from a central parallax screen, it will be understood that these ranges may be made equal. Also, these ranges may be equal for local calculation having excitatory combination and inhibitory combination based on virtual picture element over a plurality of parallax screens. Also, local calculation having excitatory combination and inhibitory combination based on actual picture element may be performed over two or more parallax screens, and local calculation having excitatory combination and inhibitory combination based on virtual picture element may be performed over two or more virtual parallax screens.

Also, this embodiment may be applied to density image, in combination with a method of defining the picture element value of epipolar line as an intermediate value and defining the value of each point of intersection on the parallax screen as an intermediate value, as described above in another embodiment.

Thus, there have been described from the first corresponding point extraction method for a plurality of images according to the present invention to the sixteenth corresponding point extraction method for a plurality of images according to the present invention, wherein the first to seventh corresponding point extraction methods for a plurality of images according to the present invention and the eighth to fourteenth corresponding point extraction methods for a plurality of images according to the present invention may be utilized in any combinations. Also, the fifteenth and sixteenth corresponding point extraction methods for a plurality of images according to the present invention may be combined therewith.

What is claimed is:

1. A corresponding point extraction method comprising steps of:
   (a) phototaking an image of an object from a first position to obtain a first image;
   (b) phototaking an image of said object from second position different from said first position to obtain a second image, wherein there exists a parallax between said first and second images; and
   (c) processing image data of each of said first and second images by processing means to extract groups of corresponding points between said first and second images;
   the process performed by said processing means comprising the steps of:
   (C-1) extracting a first epipolar line from said first image and extracting a second epipolar line from said second image, wherein there exist a plurality of actual picture elements on each of said first and second epipolar lines and each of said plurality of actual picture elements has picture element data;
   (C-2) forming a coordinate, an axis of abscissa of which is defined by said first epipolar line and an axis of ordinate of which is defined by said second epipolar line, as a parallax image plane;
   (C-3) inserting at least a single virtual picture element into between said actual picture elements on each of said first and second epipolar lines, wherein picture element data according to data of picture elements are provided for said virtual picture element;
   (C-4) providing intersection data for intersection on said parallax image place of each picture element including said actual picture element and said virtual picture element on said first epipolar line and each picture element including said actual picture element and said virtual picture element on said second epipolar line according to picture element data of said picture element;
   (C-5) performing local calculation having excitatory combination and inhibitory combination by using said intersection data to renew said parallax image plane to make a new parallax image plane;
   (C-6) extracting parallax lines by repeating the above step (C-5) by a plurality of numbers of times and further extracting corresponding points between said first and second images by using said parallax lines.

2. A method according to claim 1, wherein excitatory combination with respect to intersections of between virtual picture elements on said first and second epipolar lines is competitive with excitatory combination with respect to intersections of between actual picture elements on said first and second epipolar lines and inhibitory combination with respect to intersections of between virtual picture elements on said first and second epipolar lines is competitive with inhibitory combination with respect to intersections of between actual picture elements on said first and second epipolar lines.

3. A method according to claim 1, wherein said parallax line is extracted by using a parallax image plane obtained after the above step (C-5) is repeated by a predetermined number of times.

4. A method according to claim 1, wherein the above step (C-5) is repeated until a value of each of said intersections on said parallax image plane is converged to a predetermined condition and thereafter said parallax lines are extracted by using the parallax image plane obtained after the repetition.

5. A method according to claim 1, wherein local calculation including excitatory combination and inhibitory combination with respect to intersections of between actual picture elements on said first and second epipolar lines is performed by a plurality of numbers of times after said step (C-2) is performed and thereafter following steps from the step (C-3) are performed with respect to a parallax image plane newly made through the local calculation.

6. A method according to claim 1, wherein said picture element data and said intersection data respectively include multi-value data.

7. A corresponding point extraction method comprising steps of:
   (a) phototaking an image of an object from a first position to obtain a first image;
   (b) phototaking an image of said object from a second position different from said first position to obtain a second image, wherein there exists a parallax between said first and second images; and
   (c) processing image data of each of said first and second images by processing means to extract groups of corresponding points between said first and second images;
   the process performed by said processing means comprising the steps of:
   (C-1) extracting a first epipolar line from said first image and extracting a second epipolar line from said second image, wherein there exist a plurality of actual picture elements on each of said first and second epipolar lines and each of said plurality of actual picture elements has picture element data;

(C-2) forming a coordinate, an axis of abscissa of which is defined by said first epipolar line and an axis of ordinate of which is defined by said second epipolar line, as a parallax image plane, (C-3) providing intersection data for intersections on said parallax image plane of each picture element on said first epipolar line and each picture element on said second epipolar line according to picture element data of each of said picture elements;

(C-4) performing local calculation having excitatory combination and inhibitory combination by using said intersection data to renew said parallax image plane to make a new parallax image plane, wherein intersection data of said new parallax image plane include multi-value data; and (C-5) extracting parallax lines by repeating the above step (C-4) by a plurality of numbers of times and thereafter corresponding points between said first and second images are extracted by using said parallax lines.

8. A method according to claim 7, wherein said picture element data include multi-value dam.

9. A method according to claim 8, wherein said multi-value data are determined by picture element data which the corresponding picture elements have and picture element data which picture elements lying near the corresponding picture elements have.

10. A corresponding point extraction method of comprising the steps of:

(a) phototaking an image of an object from a first position to obtain a first image;

(b) phototaking an image of said object from a second position different from said first position to obtain a second image, wherein there exists a parallax between said first and second images; and (c) processing image data of each of said first and second images by processing means to extract groups of corresponding points between said first and second images;

the process performed by said processing means comprising the steps of:

(C-1) extracting a first epipolar line from said first image and extracting a second epipolar line from said second image, wherein there exist a plurality of actual picture elements on each of said first and second epipolar lines and each of said plurality of actual picture elements has picture element data;

(C-2) forming a coordinate, an axis of abscissa of which is defined by said first epipolar line and an axis of ordinate of which is defined by said second epipolar line, as a parallax image plane;

(C-3) providing intersection data for intersections on said parallax image plane of each picture element on said first epipolar line and each picture element on said second epipolar line according to picture element data of each of said picture elements;

(C-4) performing local calculation having excitatory combination and inhibitory combination of using said intersection data, defining an area where there exist intersections objected for said local calculation to renew said parallax image plane to make new parallax image plane; and (C-5) extracting parallax lines by repeating the above step (4) by a plurality of numbers of times and thereafter corresponding points between said first and second images are extracted by using said parallax lines.

11. A method according to claim 10, wherein said picture element data and said intersection data respectively include multi-value data.

12. A method according to claim 10, wherein local calculation including excitatory combination and inhibitory combination with respect to each of intersections on said parallax image plane is performed after the above step (C-3) and thereafter following steps from the step (C-4) are performed with respect to a parallax image plane newly made through the local calculation.

13. A corresponding point extraction method of comprising the steps of:

(a) phototaking an image of an object from a first position to obtain a first image;

(b) photo taking an image of said object from a second position different from said first position to obtain a second image, wherein there exists a parallax between said first and second images; and (c) processing image data of each of said first and second images by processing means to extract groups of corresponding points between said first and second images;

the process performed by said processing means comprising the steps of:

(C-1) extracting a first epipolar line from said first image and extracting a second epipolar line from said second image, wherein there exist a plurality of actual picture elements on each of said first and second epipolar lines and each of said plurality of actual picture elements has picture element data;

(C-2) forming a coordinate, an axis of abscissa of which is defined by said first epipolar line and an axis of ordinate of which is defined by said second epipolar line, as a parallax image plane;

(C-3) providing intersection data for intersections on said parallax image plane between each picture element on said first epipolar line and each picture element on said second epipolar line according to picture element data of each of said picture elements;

(C-4) performing local calculation having excitatory combination and inhibitory combination by using said intersection data, changing an area where calculation of said excitatory combination is performed to renew said parallax image plane to make a new parallax image plane; and (C-5) extracting parallax lines by repeating the above step (4) by a plurality of numbers of times and thereafter corresponding points between said first and second images are extracted by using said parallax lines.

14. A method according to claim 13, wherein said picture element data and said intersection data respectively include multi-value data.

15. A method according to claim 14, wherein said area of said excitatory combination is changed according to intersection data of the first parallax image plane and said picture element data on said first and second epipolar lines.

16. A corresponding point extraction method of comprising the steps of:

(a) phototaking an image of an object from a first position to obtain a first image;

(b) phototaking an image of said object from a second position different from said first position to obtain a second image, wherein there exists a parallax between said first and second images; and (c) processing image data of each of said first and second images by processing means to extract groups of corresponding points between said first and second images;

the process performed by said processing means comprising the steps of:

(C-1) extracting a first epipolar line from said first image and extracting a second epipolar line from said second image, wherein there exist a plurality of actual picture elements on each of said first and second epipolar lines and each of said plurality of actual picture elements has picture element data;

(C-2) forming a coordinate, an axis of abscissa of which is defined by said first epipolar line and an axis of ordinate of which is defined by said second epipolar line, as a parallax image plane;

(C-3) providing intersection data of multi-values for intersection on said parallax image plane of each picture element on said first epipolar line and each picture element on said second epipolar line according to picture element data of multi-values of each picture element;

(C-4) when local calculation having excitatory combination and inhibitory combination is performed by using said intersection data, said local calculation is performed changing strengths of said excitatory combination and said inhibitory combination within an area of calculation of said excitatory combination and said inhibitory combination, whereby said parallax image plane is renewed to make a new parallax image plane; and (C-5) extracting parallax lines by repeating the above step (4) by a plurality of numbers of times and thereafter corresponding points between said first and second images are extracted by using said parallax lines.

17. A method of claim 16, wherein distribution of degree of affection of said excitatory combination gives said result of said local calculation is expressed by Gaussian line shape.

18. A corresponding point extraction method of comprising the steps of:

(a) phototaking an image of an object from a first position to obtain a first image;

(b) phototaking an image of said object from a second position different from said first position to obtain a second image, wherein there exists a parallax between said first and second images; and (c) processing image data of each of said first and second images by processing means to extract groups of corresponding points between said first and second images;

the process performed by said processing means comprising the steps of:

(C-1) extracting a plurality of groups of epipolar lines from said first and second images, wherein there exist a plurality of actual picture elements on said epipolar line of each of said plurality of groups and each of said plurality of actual picture elements has picture element data;

(C-2) forming a coordinate, an axis of abscissa of which is defined by one epipolar line and an axis of ordinate of which is defined by the other epipolar line by each of said plurality of groups of epipolar lines, as a parallax image plane;

(C-3) providing intersection data according to picture element data of each picture element for intersection on said parallax image plane of each picture element on one epipolar line and each picture element on the other epipolar line by each of said plurality of groups of epipolar lines;

(C-4) performing local calculation having excitatory combination and inhibitory combination by using said intersection data by each parallax image plane to renew said parallax image to make a new parallax image; and (C-5) extracting parallax lines by each parallax image plane by repeating the step (C-4) by a plurality of number of times and thereafter extracting corresponding points between said first and second images by using each of said parallax lines.

19. A method of according to claim 18, wherein the longer a distance from a center portion of a parallax image plane of a plurality of parallax image planes to an area where said calculation is performed for each of said excitatory combination and said inhibitory combination is, the smaller said area for each of said excitatory combination and said inhibitory combinations is.

* * * * *

UNITED STATES PATENT AND TRADEMARK OFFICE
CERTIFICATE OF CORRECTION

PATENT NO. : 5,680,474
DATED : October 21, 1997
INVENTOR(S) : Katsumi Iijima, Katsuhiko Mori It is certified that error appears in the above-identified patent and that said Letters Patent is hereby corrected as shown below:

Abstract, line 13, change "picutre" to -- picture --.

Column 1, line 43, change "PR" to -- $P_R$ --.

Column 2, line 17, change "$Y_{PL}/z_{PL}=Y_{PR}/z_{PR}=Y_P/z_P$" to -- $y_{PL}/z_{PL}=y_{PR}/z_{PR}=y_P/z_P$ --.

Column 7, line 22, change "ere" to -- $e_{Re}$ --.

Column 16, line 20, change "spipolar" to -- epipolar --.

Column 27, line 61, change "wether" to -- whether --.

Column 30, line 9, change "$a_{1L}$" to -- $a_{2L}$ --.

Column 30, line 26, change "FIG. 130" to -- FIG. 13 --.

Column 32, line 9, change "epioplar" to -- epipolar --.

Column 38, line 42, change "tan h" to -- tanh --.

Column 38, line 64, change "tan h" to -- tanh --.

Column 40, line 7, change "all" to -- $a_{1L}$ --.

Column 40, line 17, change "$Z_{ij} = P_0 - ABS\ (P_{iL\text{-}PjR})$" to -- $Z_{ij} = P_0\ ABS\ (P_{iL} - P_{jR})$ --.

Column 55, line 26, change "$L_{eL}k$" to -- $L_{eLk}$ --.

UNITED STATES PATENT AND TRADEMARK OFFICE
CERTIFICATE OF CORRECTION

PATENT NO. : 5,680,474

DATED : October 21, 1997

INVENTOR(S) : Katsumi Iijima, Katsuhiko Mori

It is certified that error appears in the above-identified patent and that said Letters Patent is hereby corrected as shown below:

Column 61, line 25, change "dam" to -- data --.

Signed and Sealed this

Seventh Day of July, 1998

*Attest:*

BRUCE LEHMAN

*Attesting Officer*   *Commissioner of Patents and Trademarks*